United States Patent
Mesnier et al.

(10) Patent No.: US 12,282,683 B2
(45) Date of Patent: Apr. 22, 2025

(54) COMPUTATIONAL DATA STORAGE SYSTEMS

(71) Applicant: Intel Corporation, Santa Clara, CA (US)

(72) Inventors: Michael P. Mesnier, Scappoose, OR (US); John S. Keys, Beaverton, OR (US); Ian F. Adams, Astoria, OR (US); Yi Zou, Portland, OR (US); Luis Carlos Maria Remis, Hillsboro, OR (US); Daniel Robert McLeran, Loveland, CO (US); Mariusz Barczak, woj. Pomorskie (PL); Arun Raghunath, Portland, OR (US); Lay Wai Kong, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 17/430,693

(22) PCT Filed: Mar. 12, 2020

(86) PCT No.: PCT/US2020/022432
§ 371 (c)(1),
(2) Date: Aug. 12, 2021

(87) PCT Pub. No.: WO2020/186081
PCT Pub. Date: Sep. 17, 2020

(65) Prior Publication Data
US 2022/0188028 A1    Jun. 16, 2022

Related U.S. Application Data

(60) Provisional application No. 62/817,510, filed on Mar. 12, 2019.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0656; G06F 3/0659; G06F 3/0604; G06F 3/0679; G06F 3/061; G06F 3/067; G06F 3/0688
See application file for complete search history.

(56) References Cited

U.S. PATENT DOCUMENTS

| | | | |
|---|---|---|---|
| 5,546,558 | A | 8/1996 | Jacobson et al. |
| 6,701,316 | B1 | 3/2004 | Li et al. |

(Continued)

FOREIGN PATENT DOCUMENTS

| | | | |
|---|---|---|---|
| JP | 2006277583 A | 10/2006 | |
| JP | 2010146549 A | 7/2010 | |

(Continued)

OTHER PUBLICATIONS

PCT International Search Report and Written Opinion in PCT International Application Serial No. PCT/US2020/022432 mail on Jul. 6, 2020 (9 pages).

(Continued)

*Primary Examiner* — Ernest Unelus
(74) *Attorney, Agent, or Firm* — Alliance IP, LLC

(57) ABSTRACT

In one embodiment, a system comprises a host processor and a storage system. The storage system comprises one or more storage devices, and each storage device comprises a non-volatile memory and a compute offload controller. The non-volatile memory stores data, and the compute offload controller performs compute tasks on the data based on compute offload commands from the host processor.

28 Claims, 46 Drawing Sheets

(56) References Cited

U.S. PATENT DOCUMENTS

| | | | |
|---|---|---|---|
| 2006/0047897 | A1 | 3/2006 | Thiessen et al. |
| 2012/0079190 | A1 | 3/2012 | Colgrove et al. |
| 2017/0277432 | A1* | 9/2017 | Yun ................... G06F 3/0659 |
| 2018/0341548 | A1 | 11/2018 | Bolkhovitin et al. |
| 2018/0341606 | A1 | 11/2018 | Bolkhovitin et al. |
| 2019/0042093 | A1 | 2/2019 | Adams et al. |
| 2019/0042591 | A1 | 2/2019 | Dayan et al. |
| 2019/0266062 | A1 | 8/2019 | Borlick et al. |
| 2020/0167098 | A1 | 5/2020 | Shah et al. |

FOREIGN PATENT DOCUMENTS

| | | | |
|---|---|---|---|
| JP | 2019028572 | A | 2/2019 |
| KR | 20070024670 | A | 3/2007 |
| WO | 2018217273 | A1 | 11/2018 |
| WO | 2020186081 | A1 | 9/2020 |

OTHER PUBLICATIONS

EPO; Extended European Search Report issued in EP Patent Application No. 20769555.2, dated Nov. 7, 2022; 7 pages.

Adams, et al., "Respecting the block interface—computational storage using virtual objects," Intel Labs (7 pgs.).

Barbalance, Antonio, et al., "blockNDP: Block-storage Near Data Processing," Middleware '20 Industrial Track, Dec. 7-11, 2020, Delft, Netherlands. (8 pages).

LeFevre, Jeff, et al., "Skyhook: Programmable Storage for Databases," USENIX, Feb. 26, 2019. (3 pages).

Mehra, Pankaj, "Scaling Smart: East-West & North-South Scaling of Computation With Data," Samsung Electronics, Nov. 5, 2020. (29 pages).

Mellor, Chris, "At exabyte levels, data gravity exerts an enormous pull. This sucks," Blocks & Files, Jan. 12, 2021. (4 pages).

EPO; Extended European Search Report issued in EP Patent Application No. 22164358.8, dated Jul. 18, 2022; 7 pages.

PCT International Preliminary Report on Patentability issued in PCT/US2020/022432, dated Sep. 23, 2021; 7 pages.

EPO; Office Action issued in European Patent Application No. EP 22164358.8, dated Feb. 21, 2024; 7 pages.

USPTO Non-Final OA for U.S. Appl. No. 17/132,974 received on Feb. 27, 2024 entitled, Technologies for Storage and Processing for Distributed File Systems (6 pages).

Japan Patent Office, Final Rejection issued in JP Patent Application No. 2021-546735, dated Aug. 13, 2024; 6 pages including English translation.

USPTO Final OA for U.S. Appl. No. 17/132,974 received on Aug. 26, 2024 entitled, Technologies for Storage and Processing for Distributed File Systems (9 pages).

Do, Jaeyoung, et al. "Query Processing on Smart SSDs: Opportunities and Challenges." Proceedings of the 2013 ACM SIGMOD International Conference on Management of Data, Association for Computing Machinery, 2013, pp. 1221-1230. ACM Digital Library, https://doi.org/10.1145/2463676.2465295.

Japan Patent Office; Office Action issued for JP Patent Application No. 2021-546735, dated Apr. 2, 2024; 9 pages including English translation.

* cited by examiner

```
[osd.0]
   host = osd0
   public addr = 192.168.1.1
   cluster addr = 193.168.2.1
   target addr = "trtype:RDMA adrfam:IPv4 subnqn:nqn.2018-04.io.test:target1 traddr:198.0.0.101 trsvcid:4420"

[osd.1]
   host = osd1
   public addr = 192.168.1.2
   cluster addr = 193.168.2.2
   target addr = "trtype:RDMA adrfam:IPv4 subnqn:nqn.2018-04.io.test:target2 traddr:198.0.0.102 trsvcid:4420"
```

| EDGE DATA LAKE TLB | |
|---|---|
| VIRTUAL ADDRESS | PHYSICAL ADDRESS |
| 0 | EDGE 1 @ 5 |
| 1 | EDGE 2 @ 3 |
| 2 | EDGE 1 @ 4 |
| 3 | EDGE 1 @ 1 |
| 4 | EDGE 1 @ 2 |
| 5 | EDGE 1 @ 8 |
| 6 | EDGE 3 @ 11 |
| 7 | EDGE 4 @ 4 |
| 8 | EDGE 4 @ 10 |
| 9 | EDGE 2 @ 2 |
| 10 | EDGE 3 @ 7 |
| 11 | EDGE 2 @ 5 |

*FIG. 56*

COMPUTATIONAL DATA STORAGE SYSTEMS

CROSS-REFERENCE TO RELATED APPLICATIONS

This Application is a national stage application under 35 U.S.C. § 371 of PCT International Application Serial No. PCT/US2020/022432, filed on Mar. 12, 2020 and entitled COMPUTATIONAL DATA STORAGE SYSTEMS, which application claims the benefit of the filing date of U.S. Provisional Patent Application Ser. No. 62/817,510 filed on Mar. 12, 2019 and entitled "COMPUTATIONAL DATA STORAGE SYSTEMS". The disclosures of the prior applications are considered part of and are hereby incorporated by reference in their entirety in the disclosure of this application.

FIELD OF THE SPECIFICATION

This disclosure relates in general to the field of computer data storage, and more particularly, though not exclusively, to data storage solutions implemented with computational capabilities.

BACKGROUND

In computing systems, data may be stored in block-based storage, such as non-volatile memory (NVM) in a solid-state drive (SSD), either locally or over a network. For example, the NVM may be NAND flash memory or any other suitable form of stable, persistent storage. As the capacity and internal speed of SSDs increase, the NVM is typically limited by the speed of the input/output (I/O) controllers to which it is attached, and/or the available bandwidth over a local bus or network link.

BRIEF DESCRIPTION OF THE DRAWINGS

FIG. 56 illustrates an edge service page table.

EMBODIMENTS OF THE DISCLOSURE

Figure 1:
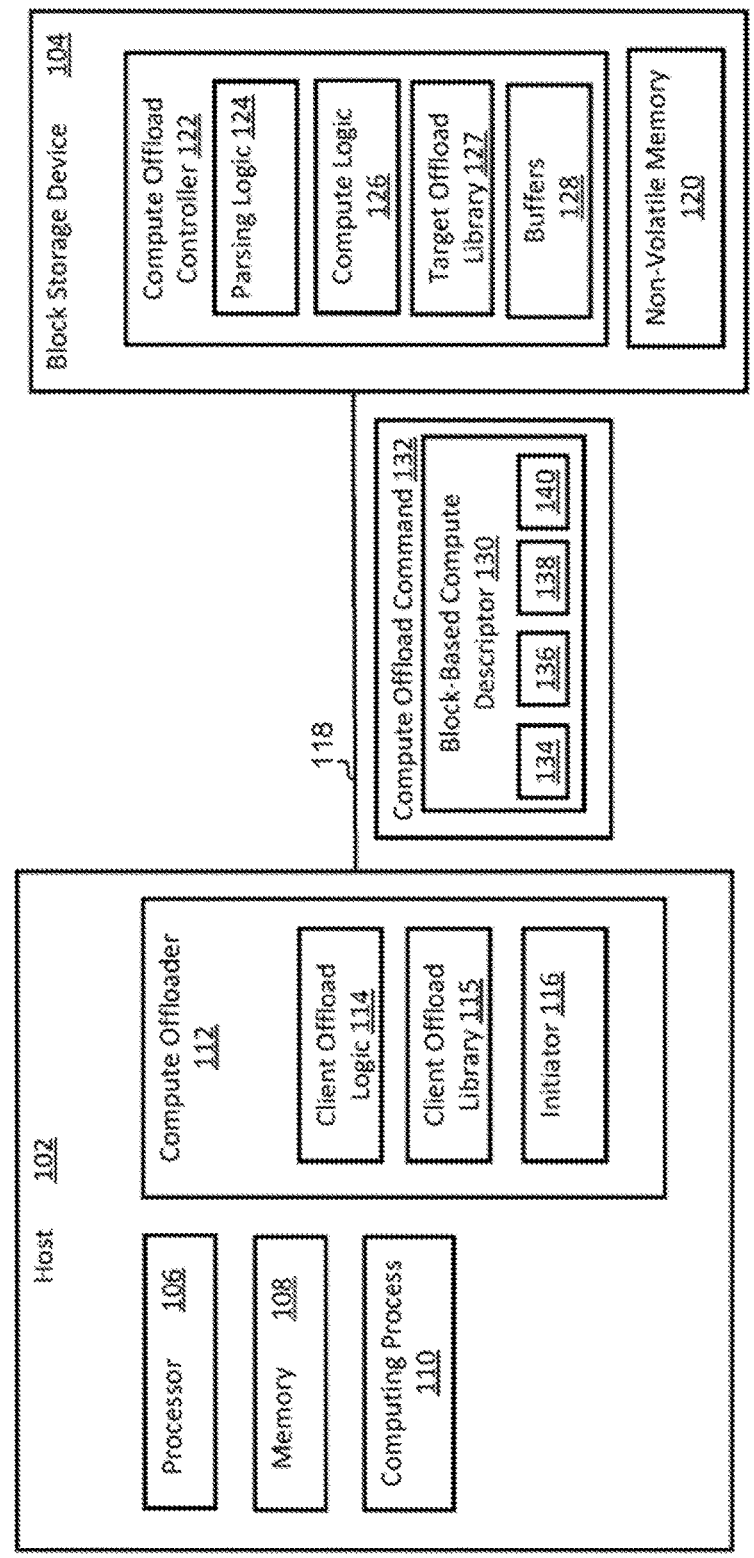
FIG. 1 depicts a block diagram of a computer system that includes a host and a block storage device, in accordance with various embodiments.

This patent application claims the benefit of the filing date of U.S. Provisional Patent Application Ser. No. 62/817,510, filed on Mar. 12, 2019, and entitled "COMPUTATIONAL DATA STORAGE SYSTEMS," the contents of which are hereby expressly incorporated by reference.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

This disclosure presents various embodiments relating to computational storage, or "compute-in-storage," which refers to data storage solutions that are implemented with computational capabilities.

Compute Offloading in Block Storage

FIG. 1 is a block diagram of a computer system 100 that may include a host 102 and a block storage device 104 (e.g., a block-based storage device such as a SSD, a block-based storage server, or any other suitable block-based storage device), in accordance with various embodiments. In some embodiments, the host 102 may include a processor 106 coupled with a memory 108. In various embodiments, a computing process 110 may run on the host 102 (e.g., by processor 106 in memory 108). In some embodiments, the computing process 110 may be an application, a storage middleware, a software storage stack, an operating system, or any other suitable computing process. In various embodiments, the host 102 may further include a compute offloader 112 that may include client offload logic 114 and an initiator 116. In some embodiments, the block storage device 104 may be referred to as a storage target or a compute-enabled storage target. In some embodiments, the client offload logic 114 is referred to as a client offloader.

In some embodiments, the computing process 110 may send a compute offload request to the compute offloader 112. In various embodiments, the compute offload request may specify a higher-level object (e.g., a file) and a desired operation (e.g., a hash function such as an MD5 operation). In some embodiments, the client offload logic 114 may construct a block-based compute descriptor 130 based at least in part on the request and may package the block-based compute descriptor 130 in a compute offload command 132. In various embodiments, the compute offload command 132 may be a vendor-specific command that may contain block-based metadata (e.g., as part of block-based compute descriptor 130). In some embodiments, the client offload logic 114 may generate a virtual input object 134 based at least in part on the higher-level object specified by the compute offload request. In some embodiments, the client offload logic 114 may determine a list of one or more blocks corresponding to where the higher-level object is stored in block-based storage (e.g., NVM) to generate the virtual input object 134.

In various embodiments, the block-based compute descriptor 130 may describe the storage blocks (e.g., as mapped by virtual objects) that are to be input and/or output for computation, a function 138 (e.g., a requested compute operation as identified by a compute type identifier or an operation code) to be executed, and any additional arguments 140 to the function 138 (e.g., a search string). In various embodiments, the additional arguments 140 may also be referred to as parameters. In some embodiments, the compute offloader 112 may include a client offload library 115 that may be used by the client offload logic 114 in creation of the block-based compute descriptor 130. In some embodiments, the client offload library 115 may not be present and/or some or all aspects of the client offload library 115 may be included in the client offload logic 114 (e.g., in an ASIC). In various embodiments, the client offload logic 114 may create virtual input objects 134 and/or virtual output objects 136 (e.g., lists of block extents and object lengths), and may assign an operation code for the desired operation to be performed with these virtual objects. In some embodiments, the compute offload command 132, with the block-based compute descriptor 130, may contain all of the information needed to schedule computation against virtual objects (e.g., virtual input object 134) in the block storage device 104. In various embodiments, the block-based compute descriptor 130 may describe block-based compute operations in a protocol agnostic fashion that may work for any block-based storage device or system. In some embodiments, the virtual input object 134 may include a first set of metadata that maps the virtual input object 134 to a real input object (e.g., a file). In various embodiments, the first set of metadata may include a size of the real input object, a list of blocks composing the real input object, and/or any other metadata that describes the real input object. In some embodiments, the virtual output object 136 may include a second set of metadata that maps the virtual output object 136 to a real output object.

Various embodiments may execute general purpose, file-based computation in block-based storage, and/or may carry all execution context within a single I/O command (e.g., compute offload command 132), which may provide performance advantages over conventional approaches that require multiple roundtrips between (e.g., communication between) the host and target in order to initiate target-side computation and/or conventional approaches that have scheduling overhead that grows (e.g., linearly) with the number of blocks in a file. By carrying all execution context within a single I/O command, various embodiments may provide advantages over conventional approaches that use programmable filters that persist across READ operations and/or require separate initialization and finalization commands (e.g., introduce state tracking overhead to SSD operations). Some embodiments may not require the introduction of an object-based filesystem anywhere on the host, which may reduce complexity in comparison to conventional approaches. Some embodiments may provide a general purpose solution that may be suitable for use with any filesystem, and may function with object-based storage stacks, in contrast with some conventional approaches that require applications to have direct access to block storage and/or that are not suitable for use with a filesystem.

In some embodiments, the initiator 116 may communicate the compute offload command 132 that includes the block-based compute descriptor 130 to the block storage device 104 over a link 118. In some embodiments, the link 118 may be a transport fabric such as an internet small computer system interface (iSCSI), a NVM express over fabrics (NVMeOF) interface, or any other suitable transport fabric. In other embodiments, the link 118 may be a local bus interface such as Peripheral Component Interconnect Express (PCIe), or any other suitable interface.

In various embodiments, the block storage device 104 may include NVM 120 and a compute offload controller 122. In some embodiments, the compute offload controller 122 may be a NVM controller, a SSD controller, a storage server controller, or any other suitable block-based storage controller or portion thereof. Although NVM 120 is shown as single element for clarity, it should be understood that multiple NVM 120 may be present in the block storage device 104 and/or controlled at least in part by the compute offload controller 122 in various embodiments. In some embodiments, the compute offload controller 122 may include parsing logic 124 and compute logic 126. In various embodiments, the parsing logic 124 may parse a compute offload command (e.g., compute offload command 132) and/or compute descriptor (e.g., block-based compute descriptor 130) received from the host 102. In some embodiments, the parsing logic 124 identifies a compute descriptor (e.g., block-based compute descriptor 130) packaged in a compute offload command (e.g., compute offload command 132), and parses the identified compute descriptor to identify a virtual input object (e.g., virtual input object 134), a virtual output object (e.g., virtual output object 136), a requested compute operation (e.g., function 138), and/or other parameters (e.g., a search string specified by additional arguments 140). In various embodiments, the compute logic 126 performs the requested compute operation. In some embodiments, the compute logic 126 may perform the requested compute operation 138 against the virtual input object 134 and may store a result of the requested compute operation in the virtual output object 136. In some embodiments, compute offload controller 122 and/or compute logic 126 may be implemented using a hardware accelerator designed to perform certain compute operations on the data stored on non-volatile memory 120.

In some embodiments, one or more standard operations (e.g., read and write operations) of the NVM 120 may continue to normally occur while the offloaded compute operation is performed. In some embodiments, the compute offload controller 122 may include a target offload library 127 that may be used by the parsing logic 124 in parsing the compute offload command and/or the compute descriptor, and that may be used by the compute logic 126 to perform the requested compute operation. In some embodiments, the target offload library 127 may not be present and/or some or all aspects of the target offload library 127 may be included in the parsing logic 124 and/or the compute logic 126 (e.g., in an ASIC). In some embodiments, if one or more expected items is not included in the descriptor (e.g., a virtual output object), a default value may be used or a default action may be performed if possible. Various embodiments may avoid the problems associated with conventional approaches that add complex object-based devices or object-based filesystems by creating virtual objects in the block storage system and performing computation against the virtual objects. In some embodiments, the parsing logic 124 is referred to as a parser and the compute logic 126 is referred to as an offload executor.

In various embodiments, the virtual input object 134 may include a first list of one or more blocks. In some embodiments, the first list of one or more blocks may include a list of starting addresses and a corresponding list of block lengths to form a first set of block extents. In various embodiments, the virtual output object 136 may include a second list of one or more blocks. In some embodiments, the second list of one or more blocks may include a list of starting addresses and a corresponding list of block lengths to form a second set of block extents. In other embodiments, the first and/or second set of block extents may be specified with a list of starting addresses and a list of ending addresses, and/or may include a total virtual object length (virtual input object length or virtual output object length respectively). In some embodiments, the requested compute operation 138 may be a function (e.g., compression, hashing, searching, image resizing, checksum computation, or any other suitable function) which may be applied to the first list of one or more blocks and written to the second list of one or more blocks. In some embodiments, the blocks associated with the virtual input object 134 and/or the virtual output object 136 may be sectors. In some embodiments, the starting addresses may be logical block addresses (LBAs), the first and second lists one or more blocks may be otherwise identified by LBAs, or the first and/or second lists of one or more blocks may be identified in any other suitable manner. In various embodiments, the virtual input object 134 may specify the block locations in NVM 120 where file data is stored, and/or the virtual output object 136 may specify the block locations in NVM 120 where a result is to be written. In some embodiments, the virtual output object 136 may specify that the result is to be returned to the host 102.

In various embodiments, the parsing logic 124, the compute logic 126, and/or other functions of the compute offload controller 122 may be performed with one or more processors or central processing units (CPUs), one or more field programmable gate arrays (FPGAs), one or more application specific integrated circuits (ASICs), an intelligent storage acceleration library (ISA-L), a data streaming architecture, and/or any other suitable combination of hardware and/or software, not shown for clarity. In some embodiments, the compute offload controller 122 may include one or more buffers 128 that may include input buffers, output buffers, and/or input/output buffers in various embodiments. In some embodiments, one or more components of the compute offload controller 122 (e.g., compute logic 126 and/or parsing logic 124) may use the buffers 128 in read and/or write operations to the NVM 120.

In some embodiments, the block storage device 104 may be a SSD that may be coupled with the host 102 over a local bus such as PCIe, or that may be coupled with the host 102 over a network in various embodiments. In some embodiments, the block storage device 104 may be a storage server that may be part of a disaggregated computing environment. In various embodiments, the host 102 and/or the block storage device 104 may include additional elements, not shown for clarity (e.g., the block storage device 104 may include one or more processors and system memory).

In various embodiments, the NVM 120 may be a memory whose state is determinate even if power is interrupted to the device. In some embodiments, the NVM 120 may include a block addressable mode memory device, such as NAND or NOR technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). In some embodiments, the NVM 120 may include a byte-addressable write-in-place three dimensional crosspoint memory device, or other byte addressable write-in-place NVM devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory.

In various embodiments, offloaded compute operations (e.g., calculation of checksums, bitrot detection) may see accelerated completion times and/or reduced I/O traffic in comparison to legacy approaches.

Figure 2:
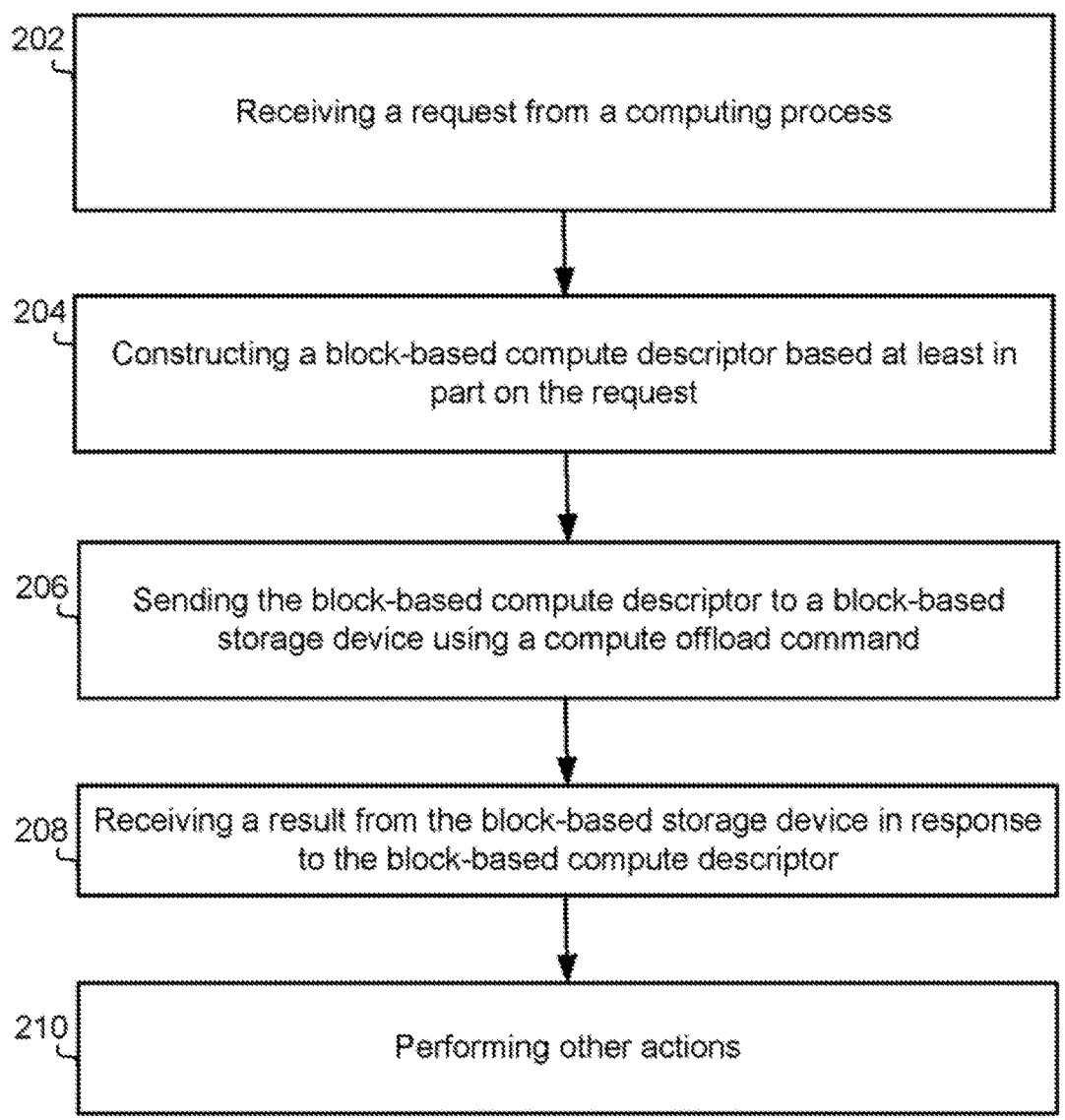
FIG. 2 is a flow diagram of a technique for offloading compute operations to a block storage device, in accordance with various embodiments.

FIG. 2 is a flow diagram of a technique 200 for offloading compute operations to a block storage device, in accordance with various embodiments. In some embodiments, some or all of the technique 200 may be practiced by components shown and/or described with respect to the computer system 100 of FIG. 1 or a portion thereof (e.g., compute offloader 112), the computer device 400 of FIG. 4 or a portion thereof (e.g., compute offloader 450), or some other component shown or described herein with respect to any other Figure.

In some embodiments, at a block 202, the technique 200 may include receiving a request from a computing process (e.g., receiving a request from computing process 110 by compute offloader 112). In various embodiments, the request may include a higher-level object (e.g., a file), a requested operation or computation, and one or more additional parameters (e.g., a search string). However, it should be understood that the request may include any other suitable parameters in other embodiments.

In various embodiments, at a block 204, the technique 200 includes constructing a block-based compute descriptor (e.g., block-based compute descriptor 130) based at least in part on the request. In some embodiments, constructing the block-based compute descriptor may include constructing an extent map (e.g., a block list for a virtual input object) based at least in part on a higher-level object (e.g., a file) included in the request. In some embodiments, the extent map may include a list of LBAs.

In some embodiments, at a block 206, the technique 200 includes sending the block-based compute descriptor to a block-based storage device (e.g., block storage device 104 or block storage device 452) using a compute offload command. In some embodiments, sending the block-based compute descriptor to the block-based storage device may include loading the block-based compute descriptor into a payload (e.g., a compute offload command). In various embodiments, the block-based storage device may be a NVM storage device.

In some embodiments, the compute offload command sent at the block 206 may be a SCSI command transported over a network using an iSCSI transport protocol. In some embodiments, a SCSI command transported over a network using an iSCSI transport protocol may be referred to as an iSCSI command. In some embodiments, the compute offload command sent at the block 206 may be an iSCSI command that may use an operation code (opcode) designated as (0x99). In some embodiments, the (0x99) command may be defined as a bi-directional command that may include an output buffer and an input buffer. In some embodiments, the output buffer of the (0x99) command may be used to contain the compute descriptor and the input buffer of the (0x99) command may be used to contain a result performed in response to an operation described in the compute descriptor. In some embodiments, the (0x99) command may be defined as a vendor-specific command, and/or may be referred to as an EXEC command. In other embodiments, the compute offload command may be a SCSI command defined in similar fashion to the iSCSI command discussed above, but transported directly to an attached device (e.g., over a local bus such as a PCIe bus). It should be understood that the (0x99) command is mentioned for purposes of illustrating an example, and that any suitable opcode designation or other compute offload command identifier may be used in various embodiments.

In some embodiments, the compute offload command sent at the block 206 may include one or more NVMe commands. In some embodiments, the compute offload command may be a fused NVMe command that includes two opcodes. In some embodiments, the fused NVMe command may include a first opcode that may be used to transfer the compute descriptor from a host to a block based storage device, followed by a second opcode that may be used to transfer a result back to the host from the block based storage device. In this fashion, the fused NVMe command may result in a virtual bi-directional command by fusing two unidirectional commands. In some embodiments, the first opcode may be a vendor-specific opcode designated as (0x99) and/or may be referred to as an EXEC_WRITE command. In some embodiments, the second opcode may be a vendor-specific opcode designated as (0x9a) and/or may be referred to as an EXEC_READ command. In some embodiments, the EXEC_WRITE command may be equivalent to a first phase of the iSCSI bi-directional EXEC command discussed above (e.g., contains the compute descriptor) and/or the EXEC_READ command may be equivalent to a second phase of the iSCSI bi-directional EXEC command, discussed above (e.g., returns the result of the operation). In some embodiments, the fused NVMe command may be sent over a network using a NVMeOF transport protocol. In some embodiments, a NVMe command transported over a network using a NVMeOF transport protocol may be referred to as a NVMeOF command. In some embodiments, the fused NVMe command may be transported directly to an attached device (e.g., over a local bus such as a PCIe bus). In some embodiments, an iSCSI or SCSI compute offload command (e.g., EXEC) may be translated to the fused NVMe command discussed above before sending to a NVM storage device. It should be understood that any other suitable compute offload command may be used in other embodiments. It should be understood that the (0x99) and (0x9a) vendor-specific opcodes are mentioned for purposes of illustrating an example, and that any suitable opcode designation(s) or other compute offload command identifier(s) may be used in various embodiments.

In some embodiments, at a block 208, the technique 200 may include receiving a result from the block-based storage device in response to the block-based compute descriptor. In various embodiments, at a block 210, the technique 200 may include performing other actions.

Figure 3:
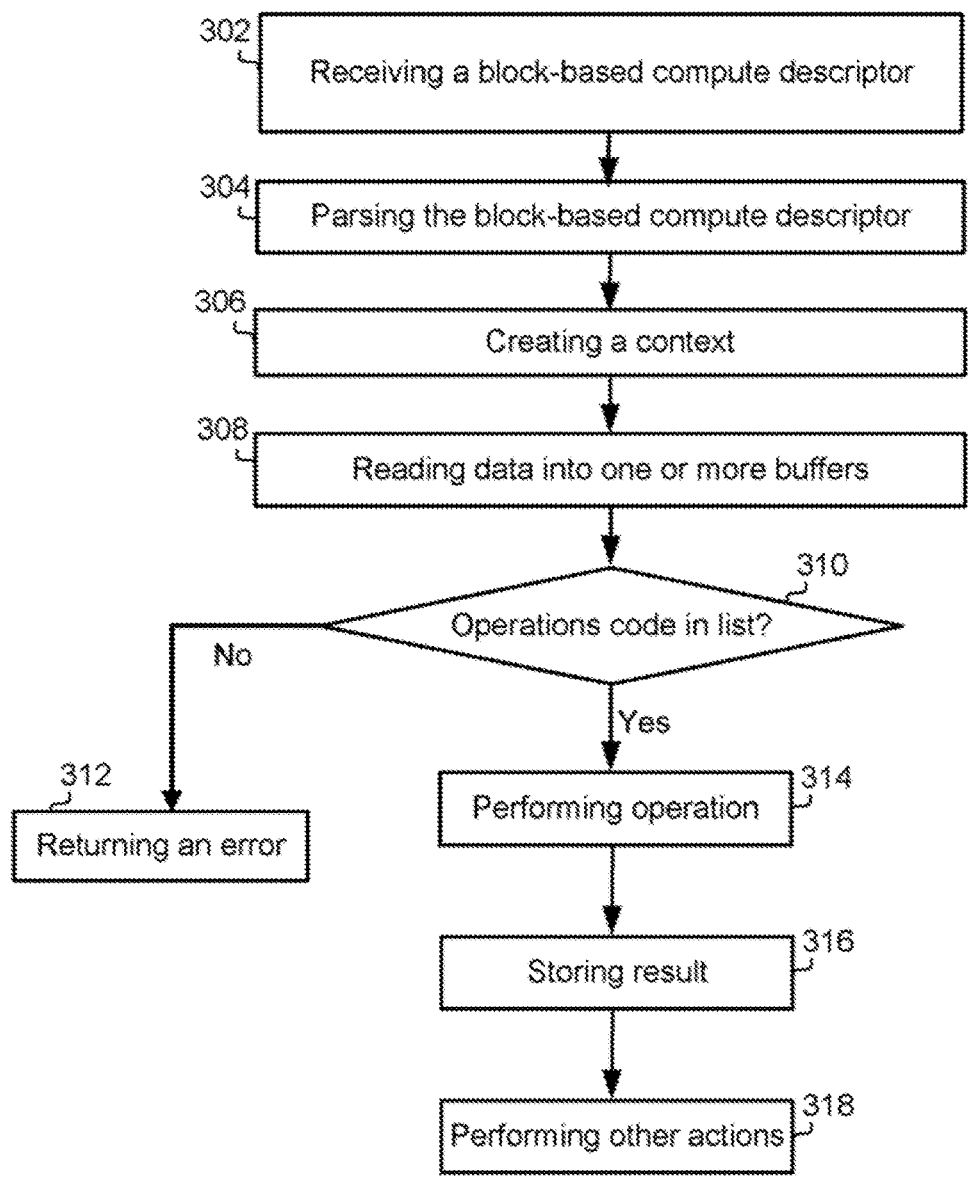
FIG. 3 is a flow diagram of a technique for performing offloaded compute operations with a block storage device, in accordance with various embodiments.

FIG. 3 is a flow diagram of a technique 300 for performing offloaded compute operations with a block storage device, in accordance with various embodiments. In some embodiments, some or all of the technique 300 may be practiced by components shown and/or described with respect to the computer system 100 of FIG. 1 or a portion thereof (e.g., block storage device 104 and/or compute offload controller 122), the computer device 400 of FIG. 4 or a portion thereof (e.g., block storage device 452 and/or compute offload controller 454), or some other component shown or described herein with respect to any other Figure.

In some embodiments, at a block 302, the technique 300 may include receiving a block-based compute descriptor (e.g., receiving block-based compute descriptor 130 at block storage device 104 from compute offloader 112, or at block storage device 452 from compute offloader 450). In various embodiments, at a block 304, the technique 300 may include parsing the block-based compute descriptor (e.g., with parsing logic 124). In some embodiments, at a block 306, the technique 300 may include creating a context. In various embodiments, the parsing logic 124 and/or any other suitable component of the compute offload controller 122 or the compute offload controller 454 may create the context. In some embodiments, the context may include one or more of: an operation to execute (e.g., a text search); one or more arguments for the operation (e.g., a search string); whether the operation can expect data to arrive across multiple calls or requires all data to be input as a single buffer; and/or any additional operation specific state information (e.g., a current status of a checksum calculation for chunked inputs). In some embodiments, whether the operation can expect data to arrive across multiple calls may be opaque to a calling application (e.g., computing process 110), but may be relevant for performing the operation, which may require reading multiple block extents for a particular virtual object. In some embodiments, the context may be an operation context that may provide temporary space for the input and results of an operation.

In various embodiments, at a block 308, the technique 300 may include reading data into one or more buffers (e.g., an input buffer of buffers 128). In some embodiments, reading data into the one or more buffers may include performing a check to determine whether sufficient data has been read into the one or more buffers for execution of a requested operation before proceeding to the decision block 310. In some embodiments, at a decision block 310, the technique 300 may include determining whether an operations code from the block-based compute descriptor is in a list of available operations. If, at the decision block 310, it is determined that the operations code is not in the list of available operations, the technique 300 may include returning an error at a block 312. If, at the decision block 310, it is determined that the operations code is in the list of available operations, the technique 300 may include performing an operation based at least in part on the operations code at a block 314. In some embodiments (e.g., where an operation may be performed on subsets of data, rather than the entire data set), the technique 300 may include looping through the actions performed at the block 308 and the block 314 to perform the operation on subsets of a virtual input object, until the entire virtual input object has been processed.

In some embodiments, at a block 316, the technique 300 may include storing a result of the operation performed at the block 314. In various embodiments, the result may be stored at a virtual output object location and/or may be returned to a host (e.g., host 102). In some embodiments, returning the result to a host may include copying result data into a return payload of a compute offload command. In some embodiments, at a block 318, the technique 300 may include performing other actions. In various embodiments, one or more of the actions performed with the technique 300 may be specified in hardware, fixed as a static library, dynamically loaded at run time, or may be implemented with any suitable combination of hardware and/or software. In some embodiments, one or more actions described with respect to the technique 300 may be performed in a different order (e.g., determining whether the operations code is in the list at the block 310 may be performed before reading data into one or more buffers at the block 308, so an error may be returned before reading data into a buffer if the operations code is not in the list).

Figure 4:
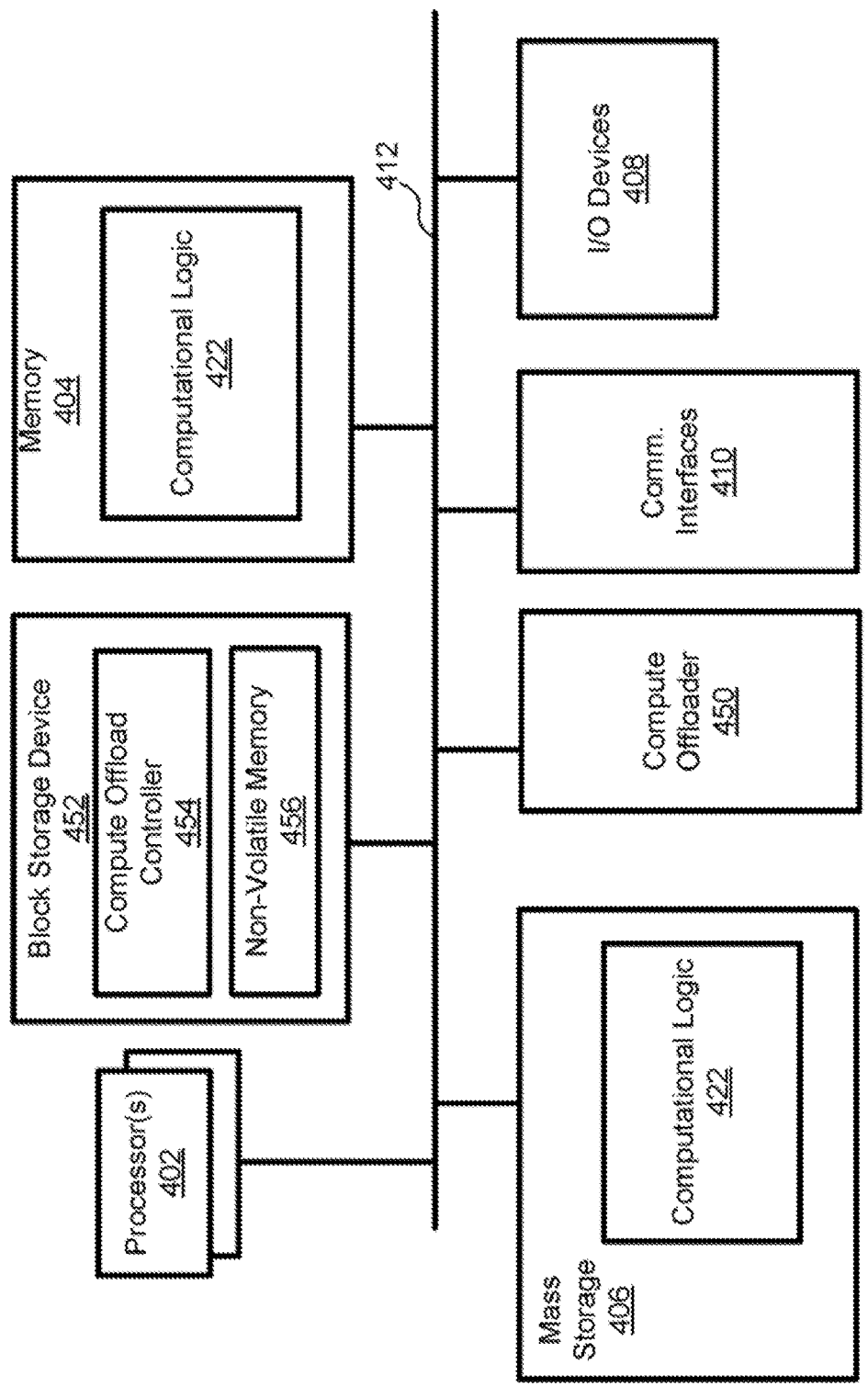
FIG. 4 schematically illustrates an example computing device that includes a block storage device with a non-volatile memory controller as described herein, in accordance with various embodiments.

FIG. 4 illustrates a block diagram of an example computing device 400 that may be suitable for use with various components of FIG. 1, the technique 200 of FIG. 2, and/or the technique 300 of FIG. 3, in accordance with various embodiments.

As shown, computing device 400 may include one or more processors or processor cores 402 and system memory 404. For the purpose of this application, including the claims, the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. In some embodiments, processors 402, in addition to cores, may further include hardware accelerators, e.g., hardware accelerators implemented with Field Programmable Gate Arrays (FPGA). The computing device 400 may include mass storage devices 406 (such as diskette, hard drive, non-volatile memory (NVM) (e.g., compact disc read-only memory (CD-ROM), digital versatile disk (DVD), any other type of suitable NVM, and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth. In some embodiments, the mass storage devices 406 may include the NVM 120 described with respect to FIG. 1.

The computing device 400 may further include I/O devices 408 (such as a display (e.g., a touchscreen display), keyboard, cursor control, remote control, gaming controller, image capture device, and so forth) and communication interfaces 410 (such as network interface cards, modems, infrared receivers, radio receivers (e.g., Bluetooth), and so forth), one or more antennas, and/or any other suitable component.

The communication interfaces 410 may include communication chips (not shown for clarity) that may be configured to operate the computing device 400 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

In various embodiments, computing device 400 may include a block storage device 452 that may include a compute offload controller 454 and/or a NVM 456. In some embodiments, the block storage device 452 or components thereof may be coupled with other components of the computing device 400. In some embodiments, the block storage device 452 may include a different number of components (e.g., NVM 456 may be located in mass storage 406) or may include additional components of computing device 400 (e.g., processor 402 and/or memory 404 may be a part of block storage device 452). In some embodiments, the compute offload controller 454 may be configured in similar fashion to the compute offload controller 122 described with respect to FIG. 1. In some embodiments, for example, compute offload controller 454 may include a hardware accelerator designed to perform certain compute operations on the data stored on non-volatile memory 456.

In various embodiments, the computing device 400 may include a compute offloader 450. In some embodiments, the compute offloader 450 may be configured in similar fashion to the compute offloader 112 described with respect to FIG. 1. In some embodiments, the computing device 400 may include both the compute offloader 450 and the block storage device 452 (e.g., as an SSD), and the compute offloader 450 may send compute offload commands (e.g., NVMe or SCSI) that contain a compute descriptor to the block storage device 452 over a local bus. In other embodiments, a first computing device 400 may include the compute offloader 450, a second computing device 400 may include the block storage device 452, and the compute offloader 450 may send compute offload commands (e.g., iSCSI or NVMeOF) to the block storage device 452 over a network (e.g., via communications interfaces 410). In some embodiments, the first computing device 400 and the second computing device 400 may be components of a disaggregated computing environment, where the second computing device 400 with the block storage device 452 is a storage server that may include a compute-in-storage capability provided by the block storage device 452.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions for the operation of various components of computing device 400, including but not limited to an operating system of computing device 400, one or more applications, operations associated with computing device 400, operations associated with the block storage device 452, and/or operations associated with the compute offloader 450, collectively denoted as computational logic 422. The various elements may be implemented by assembler instructions supported by processor(s) 402 or high-level languages that may be compiled into such instructions. In some embodiments, the computing device 400 may be implemented as a fixed function ASIC, a FPGA, or any other suitable device with or without programmability or configuration options.

The permanent copy of the programming instructions may be placed into mass storage devices 406 in the factory, or in the field through, for example, a distribution medium (not shown), such as a compact disc (CD), or through communication interface 410 (from a distribution server (not shown)). That is, one or more distribution media having an implementation of the agent program may be employed to distribute the agent and to program various computing devices.

The number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 402 may be packaged together with computational logic 422 configured to practice aspects of embodiments described herein to form a System in Package (SiP) or a System on Chip (SoC).

In various implementations, the computing device 400 may comprise one or more components of a data center, a laptop, a netbook, a notebook, an ultrabook, a smartphone, a tablet, an ultra mobile PC, or a mobile phone. In some embodiments, the computing device 400 may include one or more components of a server. In further implementations, the computing device 400 may be any other electronic device that processes data.

Figure 5:
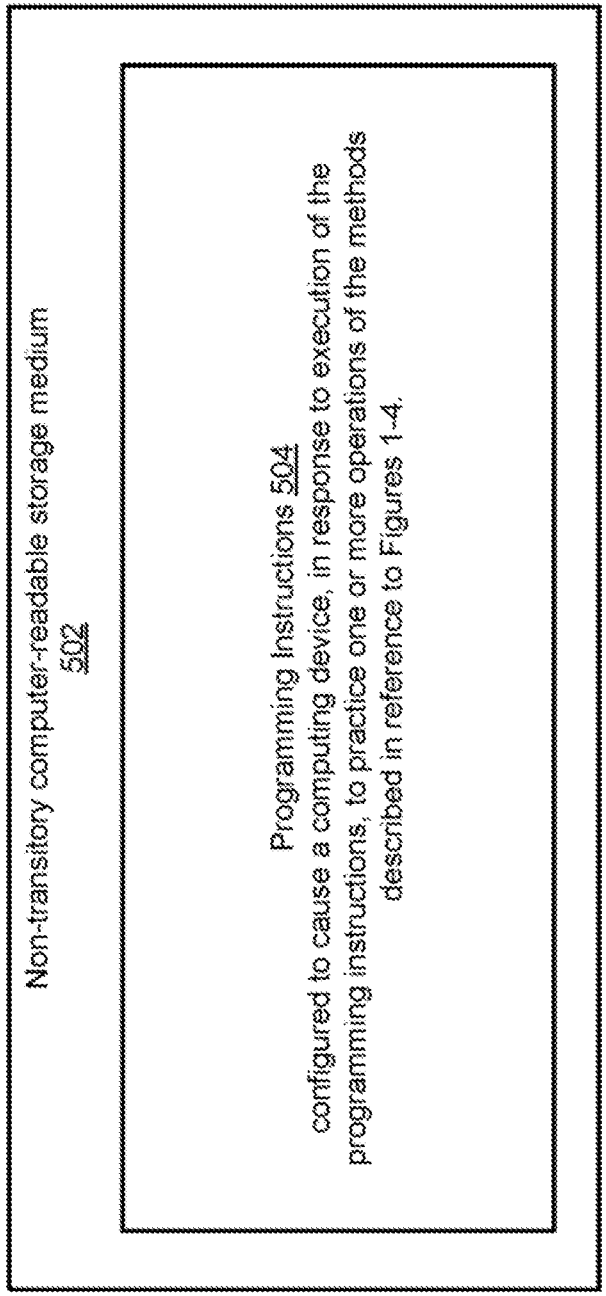
FIG. 5 illustrates an example storage medium with instructions configured to enable an apparatus to practice various aspects of the present disclosure, in accordance with various embodiments.

FIG. 5 illustrates an example computer-readable storage medium 502 having instructions configured to practice all or selected ones of the operations associated with the computing device 400, earlier described with respect to FIG. 4; the computer system 100, compute offload controller 122, and/or the compute offloader 112 described with respect to FIG. 1; the technique 200 described with respect to FIG. 2; and/or the technique 300 of FIG. 3, in accordance with various embodiments.

As illustrated, computer-readable storage medium 502 may include a number of programming instructions 504. The storage medium 502 may represent a broad range of non-transitory persistent storage medium known in the art, including but not limited to flash memory, dynamic random access memory, static random access memory, an optical disk, a magnetic disk, etc. Programming instructions 504 may be configured to enable a device, e.g., part or all of the computer system 100 and/or the computing device 400, such as the compute offload controller 122, the compute offloader 112, and/or other components of the computer system 100, in response to execution of the programming instructions 504, to perform, e.g., but not limited to, various operations described for the compute offload controller 122, the parsing logic 124, the compute logic 126, the compute offloader 112, the client offload logic 114, the initiator 116, the block storage device 452 and/or the compute offloader 450 of FIG. 4, the technique 200 described with respect to FIG. 2, and/or the technique 300 of FIG. 3. In alternate embodiments, programming instructions 504 may be disposed on multiple computer-readable storage media 502. In an alternate embodiment, storage medium 502 may be transitory, e.g., signals encoded with programming instructions 504.

Referring back to FIG. 4, for an embodiment, at least one of processors 402 may be packaged together with memory having all or portions of computational logic 422 configured to practice aspects shown or described for the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3. For an embodiment, at least one of processors 402 may be packaged together with memory having all or portions of computational logic 422 configured to practice aspects described for the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3 to form a System in Package (SiP). For an embodiment, at least one of processors 402 may be integrated on the same die with memory having all or portions of computational logic 422 configured to practice aspects described for the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3. For an embodiment, at least one of processors 402 may be packaged together with memory having all or portions of computational logic 422 configured to practice aspects of the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3 to form a System on Chip (SoC).

Computational Storage Using Virtual Objects

Computational storage has been an elusive goal. Though minimizing data movement by placing computation close to storage is technically sound, many of the previous attempts failed, as they required storage devices to first evolve from a block protocol to a more computationally-friendly, object or key-value protocol. This evolution has yet to happen.

However, a change to the block protocol is not necessarily required in order to achieve the performance benefits of computational storage. For example, the following section introduces a block-based (and therefore legacy compatible) computational storage design based on virtual objects. Similar to a "real" object (e.g., a file), a "virtual" object contains the metadata that is needed to process the underlying data, and thus numerous offloads are possible for existing block storage systems. As one end-to-end example, a 99% network traffic reduction can be achieved by offloading bitrot detection in an object store.

Advances in storage technology are leading to extremely fast devices. In particular, we are seeing various forms of non-volatile memory being used for solid-state disks, notably NAND and persistent memory. However, I/O speeds are not keeping pace, and this is resulting in more time needed to transfer data between storage devices and CPUs. The available bandwidth from these fast devices is being governed by the I/O stack, which includes a variety of legacy software and hardware. Though improvements to the I/O path are underway and ongoing, they will never address the fundamental problem—moving data takes time.

Consider a modern-day storage server. An SSD today can deliver about 3.0 GB/sec (or 24 Gb/sec), while commodity Ethernet speeds are limited to 100 Gb/sec. In building a storage server with around 16 to 32 drives, this network bottleneck becomes immediately obvious, and trade-offs need to be made. Unfortunately, this often means that the parallel bandwidth of all drives within a storage server will not be available. The same problem exists within a single SSD, as the internal NAND bandwidth exceeds that of the storage controller.

Computational storage is an oft-attempted approach to addressing the data movement problem. By keeping computation physically close to its data, costly I/O can otherwise be avoided.

Various designs have been pursued previously, but the benefits have never been enough to justify a new storage protocol. In particular, with respect to the previous approaches to computational storage, there is a near-ubiquitous requirement for a new object storage protocol. These approaches not only introduce too great of a disruption in the computer-storage industry (e.g., the object-based storage device SCSI standard in T10), but they ignore the large existing deployments of block storage.

For this reason, a block-based approach to computational storage is described below, which enables numerous different computational offloads without any changes to the block protocol. This is particularly beneficial in view of the growing trend toward disaggregated block storage (e.g., iSCSI and NVMeOF).

Rather than start with an object-based solution, instead a block-based solution is used and additional pieces are added, such as metadata. For example, the metadata that a block storage system needs to make sense of an unordered group of sectors can be leveraged to define a "virtual object." After all, an object is simply a collection of blocks, a length, and other metadata such as timestamps and ownership. Such metadata is small, can very easily be shared with a block storage system, and it allows the storage to read the object into memory for subsequent processing.

The virtual object is wrapped into a construct referred to as a "compute descriptor," along with any additional information that is needed to process the object data (e.g., the method to be executed and its arguments). The compute descriptor is then sent from host to target using a new SCSI or NVMe command, which is referred to throughout this discussion as the "execute" (EXEC) command. The data returned by the EXEC command is the result of the requested computation.

A client-side library manages the creation of the virtual objects, the compute descriptors, and the issuing of the EXEC commands. There are no changes to the block READ and block WRITE commands, and legacy applications can continue to operate with the otherwise unmodified block storage.

This approach can be implemented using both iSCSI and NVMeOF, and it enables a variety of possible compute offloads (e.g., word count, search, compress, checksum, video transcoding, image transformation, sorting, merging). The same techniques can be applied to other forms of block storage, including disk drives, solid-state drives, disk arrays, and clustered storage systems (e.g., Amazon's Elastic Block Storage).

Figure 6:
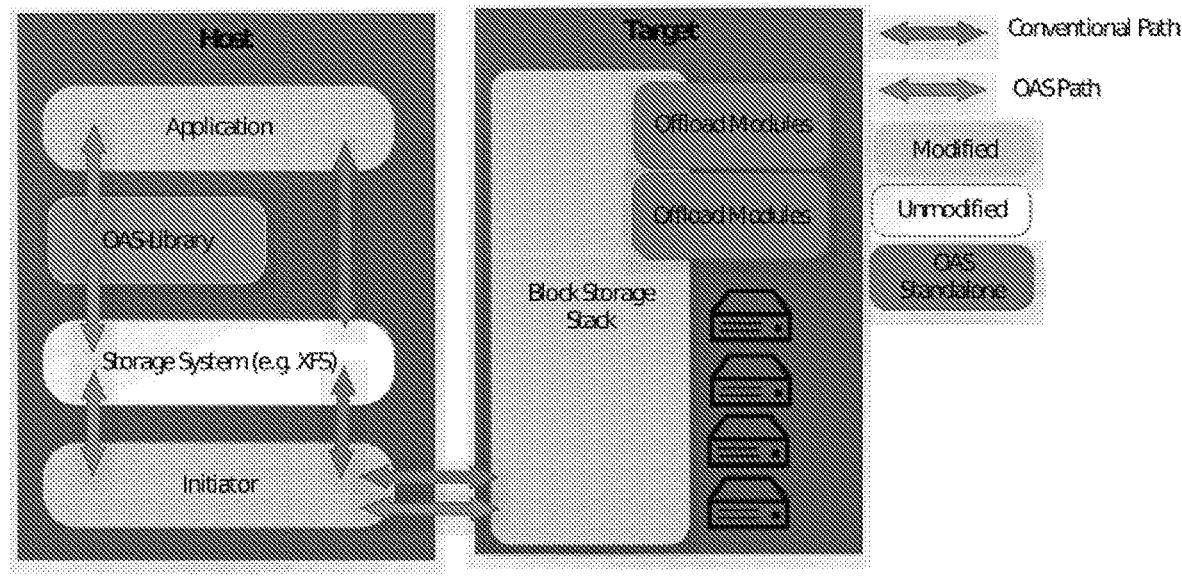
FIG. 6 illustrates a high-level architecture and data flow for a compute-in-storage stack using block-based storage.

FIG. 6 illustrates a high-level architecture and data flow for a compute-in-storage stack using block-based storage. As a simple yet illustrative example of the architecture in FIG. 6, consider a word count application. Word count is an ideal example use case for compute-in-storage, as it has a large data input, but a small output, thus maximizing traffic reductions. On the host, an application uses a client object aware storage (OAS) library to create the virtual object and compute descriptor, and to send the command to the initiator for transport. The transport sends an EXEC command—a vendor specific command noting that the payload is a compute descriptor—to the target. The target then interprets the EXEC command, and hands it to the specified offload module, in this case word count, for processing. The result of the word count is returned to the host over the transport as a payload, and then returned to calling application as a simple memory buffer.

Figure 7:
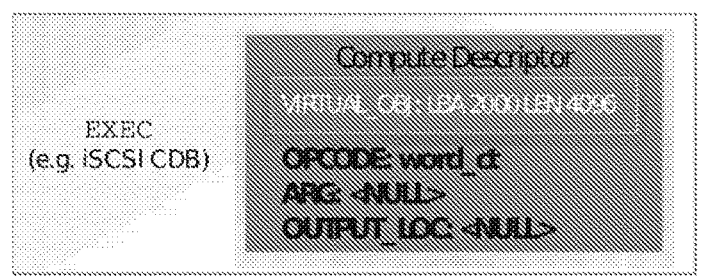
FIG. 7 illustrates an example compute descriptor for a wordcount operation.

This solution is built around a new EXEC command for block storage stacks. The EXEC command is simple to integrate into existing stacks, and it leaves the basic transport protocols completely unchanged. The EXEC command contains the virtual object and compute descriptor. The virtual object is a mapping of blocks and a data length, describing the object to be operated on, which is embedded in the compute descriptor. The compute descriptor in turn tells the target what operations to run on the virtual object, any function arguments, and how/where to output results. To illustrate, FIG. 7 illustrates an example compute descriptor for a wordcount operation. The arguments and output are null since they are unneeded for this operation, and the result can be directly returned to the host.

The host side of this computational storage approach is concerned primarily with creating the compute descriptor, and (potentially) pre-allocating files to store output results. This is mostly abstracted away from the underlying application using the OAS library.

The virtual object creation is handled "under the hood" using a combination of fiemap and stat. Operations and arguments are defined with simple opcodes and strings inside the compute descriptor. A pre-allocated file can be created for output. Once the compute descriptor is created and embedded as a payload into the desired transport protocol, it is sent as an ioctl (e.g., an input/output control system call) to the initiator.

This solution can be implemented using either iSCSI or NVMeOF (among other examples), and in either case, the low-level transport protocol remains unmodified. In the case of iSCSI, the host side uses existing bidirectional commands, while for NVMeOF, fused commands may be leveraged, such as a combined write and read. The write contains the compute descriptor, while the read returns the result of the operation.

When the target receives an EXEC command and its compute descriptor, an operation context is created. This context stores state and instructions that are understood by the target-side compute library and its associated offload modules. The offload modules do the actual computation on the data specified by the virtual object.

Results are either stored directly in the context and then returned to the caller, or written to the locations in the compute descriptor. Results that are smaller than the pre-allocated location are noted in the return and can be truncated host-side, though care must be taken to with regards to caches to ensure host-target consistency.

All legacy commands can be passed through as they normally would, which means existing applications can operate as usual without any modifications.

To illustrate the performance of this compute-in-storage architecture, a performance evaluation using bitrot detection is provided as an example. Bitrot detection, which is sometimes referred to as auditing or fixity checking, is a process where object data is hashed and compared against a previously-computed hash to detect corruption. This corruption may come from a variety of sources, such as software bugs, or latent sector errors.

In traditional object storage with smaller, directly attached storage devices, the overhead for bitrot detection is relatively minimal. However, two trends are making this common operation increasingly painful. First, storage devices are becoming increasingly large, requiring more and more throughput to effectively catch object corruption. Second, there is a growing move towards not just disaggregated storage in the form of object storage systems such as Ceph and Swift, but a further layer of disaggregation occurring at the block-level, leading to "diskless" deployments of object storage systems. These types of deployments are appealing for applications and environments that need private object storage, but are not large enough to warrant full "bare metal" deployments. This trend, however, means that bitrot detection, traditionally a purely local operation, now incurs network traffic, which can contend with more useful application traffic.

The experimental setup used for this evaluation is a simple two-box setup. The target system is populated with 8 Intel P4600 1.6 TB SSDs, with dual Xeon Gold 6140s. The host/initiator system has dual Intel Xeon E52699s. Both systems run the described compute-in-storage stack using NVMeOF on Ubuntu Linux 16.04, with a modified 4.13.2 kernel. The host and target are connected via a 40 GbE link using Chelsio T580-LP-CR cards.

A custom benchmarking utility is used to compare conventional operations—such as reading data over the network and performing the computing host-side—with offloaded operations, which are computed in-situ on the block storage target, with the result returned as an NVMe payload.

For these experiments, 100 16 MB files are placed on each SSD, which are exposed as devices to the underlying NVMeOF compute-in-storage stack. Moreover, for all experiments, there are 48 worker threads. This evaluation performs single runs, pulls data from 1 to 8 devices, and measures the conventional and offloaded throughput for the specified operations. All conventional operations are measured with a cold-page cache forcing SSD reads, and offloaded operations read directly from the SSD(s).

Figure 8:
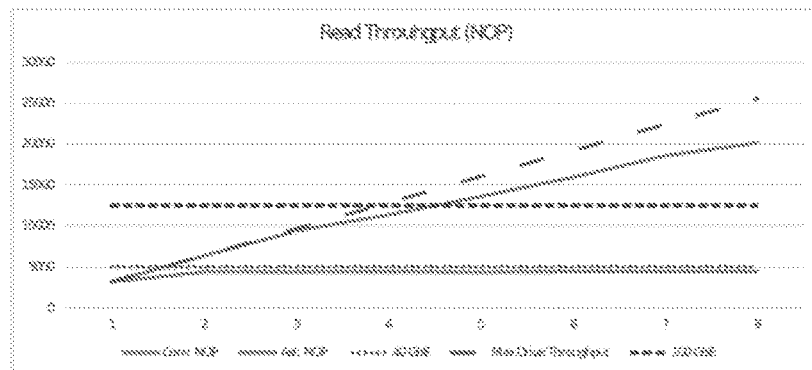
FIG. 8 illustrates the read throughput for this compute-in-storage solution using conventional and offload paths.

The first set of experiments focuses on read performance (NOP) to understand the compute-in-storage stack performance. FIG. 8 illustrates the read throughput for this compute-in-storage solution using conventional and offload paths. Dotted lines refer to theoretical maximum throughput of network and SSDs. Moreover, because the offload is done purely on the target, it is not gated by the network. As shown in FIG. 8, conventional performance is rapidly gated by the 40 GbE link, as expected. Offloaded reads scale with the number of SSDs being read from, even at 8 devices reaching over 80% of the maximum possible throughput of 3200 MBPS per SSD with over 20 GBPS. This exceeds what could be expected of even a 100 GbE link.

Figure 9:
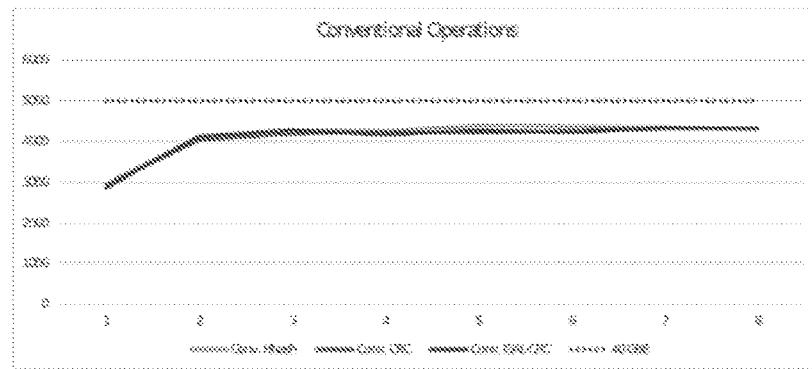
FIG. 9 illustrates conventional access throughput for checksums.
Figure 10:
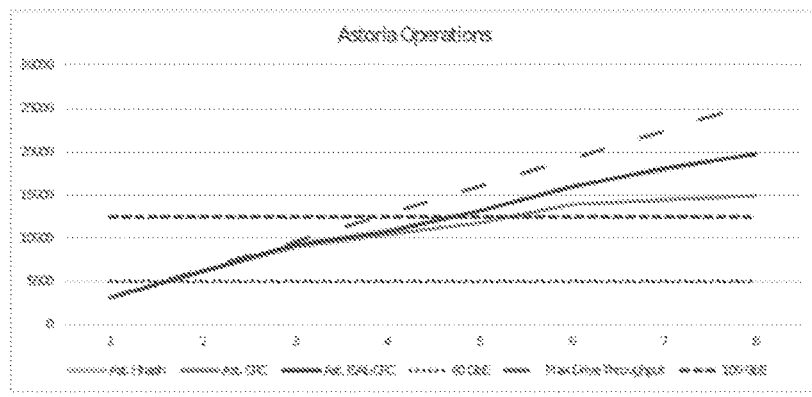
FIG. 10 illustrates offload throughput for checksums.

Next, FIG. 9 illustrates conventional access throughput for checksums, while FIG. 10 illustrates offload throughput for checksums (dotted lines refer to theoretical maximum throughput of network and SSDs). For example, in FIG. 9, conventional accesses are evaluated with a pure software CRC-32C, an ISA-L accelerated CRC, and an AVX accelerated HighwayHash, all of which are representative of hashes used for bitrot detection. Unsurprisingly, as shown in FIG. 9, the conventional accesses are almost immediately bottlenecked by the 40 GbE link. As shown in FIG. 10, however, the offloaded checksums scale with the number of devices being read from, bypassing not just the 40 GbE link but also the hypothetical 100 GbE link. The non-accelerated CRC eventually lags behind a bit, but that is an issue with its implementation. HighwayHash and ISA-L CRC are computed at near SSD speeds. As a result, these bitrot checks not only avoid consuming the limited network resources that are available, but they actually run faster, which means they can be run more efficiently and frequently, thus reducing the risk of data loss.

Further, although not shown by these figures, the offloaded checksums reduce network traffic by over 99%, which is due to the simple fact that instead of moving bulky data from the target to host, the digested results are simply being returned.

In order to demonstrate the solution end-to-end, the checksum offload can also be integrated into object storage solutions, such as the Ceph, Minio, and Swift stacks. In addition to the traffic reductions noted above (upwards of 99%), there is a 2× improvement in bitrot checking throughput. Further, integrating this computational storage approach into these solutions is relatively simple. For example, using the tools and libraries described above, the integration can be achieved using less than 20-30 lines of code in many cases, and it may also lead to the bitrot check functions shrinking in size due to some of their complexity being removed.

While the above performance evaluation focuses on bitrot detection as an example use case, there is a limitless universe of compute functions that can be offloaded onto storage using this solution. These range from application-specific use cases such as log-structured merge-tree (LSM tree) compaction for key-value stores and image resize for classifiers (e.g., achieving a 90% storage traffic reduction in a Caffe pipeline), to more general tools like word count, sort, compression, and so forth. The performance improvements achieved by this solution are significant and its modular architecture makes adding new use cases simple.

The described solution can also address various challenges associated with computational storage, such as handling striped data, such as data with erasure codes. As described further below, striped data can be handled by recognizing that many types of datasets (e.g., CSVs) have inherent structure. Thus, the offload modules can easily recognize this structure and identify when they have complete records to work with, or when they need to coordinate with the host or another target to reassemble a record.

Another challenge is handling large results, as well as "chaining" operations, where one output is immediately input to another operation. As described further below, these challenges can be handled using pools of pre-allocated storage. This simplifies host-target consistency issues, such as page-cache consistency, and amortizes the cost of allocating space for results over many computations.

Further, scheduling and work placement logic can be leveraged to further improve performance. For example, not all operations are appropriate for computational storage, and there are times where applications can coordinate with computational storage to maximize their throughput by selectively offloading some operations, thus minimizing resource contention while maximizing throughput.

The described solution can also provide various security improvements for computational storage. While modern transport protocols provide a base level of security, additional protection can be provided to ensure computational storage does not leak information, including by using encryption. Moreover, an interesting additional benefit of computational storage is that it can reduce the amount of data "in flight," which in turn reduces the risk of data leakage.

The growing I/O gap between storage and networks, as well as the increased capacity of storage devices themselves, means the only way to truly take advantage of modern storage performance is to put computations closer to the data. The described solution leverages the existing momentum behind block-based storage, uses virtual objects that do not interfere with legacy block storage applications, and is easy to integrate into applications using a simple library. I/O traffic can be reduced by up to 99% for a variety of operations, all while transparently coexisting with existing legacy applications.

Additional Embodiments Relating to Computational Storage are Described in the Following Sections.

Parallel and Concurrent Storage Offload for Replicated Data in a Distributed Storage System Data replication is commonly used in scale-out software-defined distributed storage systems, either in open source solutions such as Ceph from Red Hat, Swift from Open Stack, or private solutions such as Pangu from Alibaba. Making sure data is stored reliably is a requirement for all cloud service providers (CSPs), where sometimes users can choose the number of replica at the cost of extra capacity. While using replication costs more capacity, it is in many times preferred for better read latency as well as easier recovery since there is no reassembly or reconstruction cost as compared to erasure coded approaches. Meanwhile, in view of the industry trend of moving to disaggregated storage to achieve better resource modularity and independent scalability, it is appealing to adopt compute-in-storage or near-data-compute technologies, such as those described throughout this disclosure.

Figure 11:
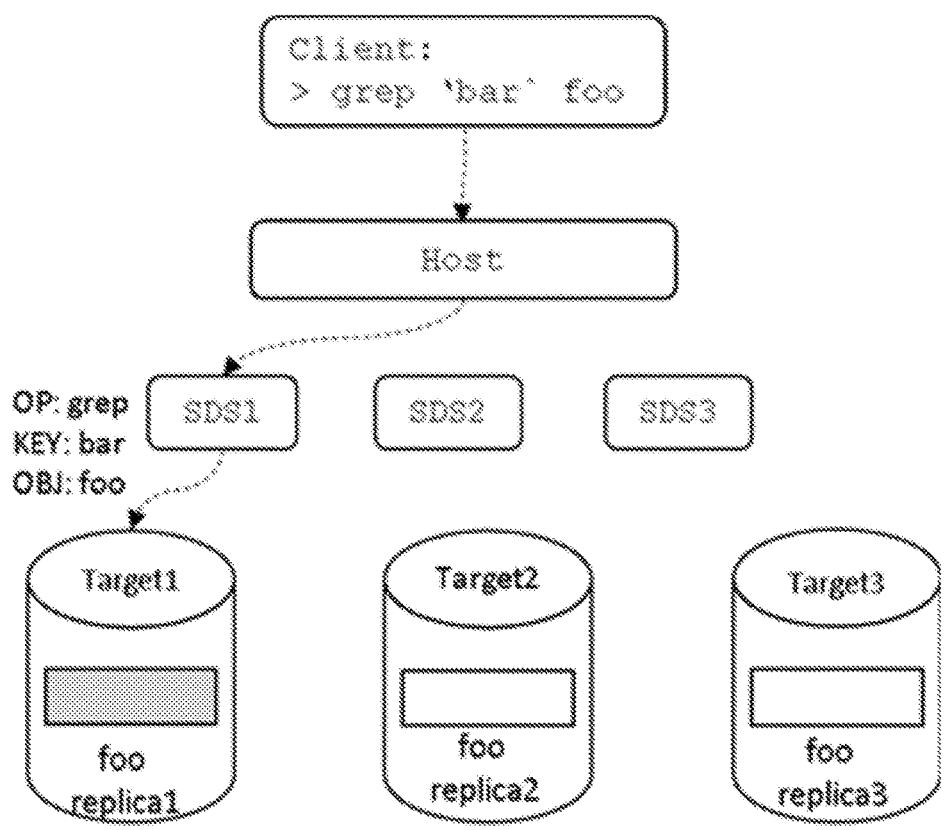
FIG. 11 illustrates a typical distributed storage with data stored using 3-way replication.

FIG. 11 is a simple illustration of a typical distributed storage with data stored using 3-way replication. In the illustrated example, the compute offload is always designated to a full copy of the target object file 'foo' residing in one of the replica nodes, such as the left-most node.

To understand FIG. 11, the following terminologies are defined below and further referenced throughout this section:

Client: This is where the application is running that uses storage services, such as an S3 API based application to get from and put files onto the storage. In the case of compute-offload capable storage, it is also assumed that the client is able to issue commands to perform the offloaded tasks, such as 'grep' in this example.

Host: This is where the storage service interface is provided to the client. The client request to get, put, or compute will be translated into corresponding storage implementation specific protocol related requests. For Ceph, the 'Host' is normally the RADOS Gateway, VMM Host with RBD (e.g., QEMU), or Ceph FS driver. For Swift, this is normally the Swift Proxy server.

SDS: The software-defined storage (SDS) node. This is normally the core entity in a distributed storage system responsible for actually placing and retrieving client data based on required policies such as replication or erasure coding. In Ceph, this is called the OSD Node, where in Swift this is called the Storage Node.

Target: This refers commonly to the NVMeOF target for NVMeOF fabrics or SCSI target in SCSI over Fiber Channel fabrics. These are the entities where actual storage devices reside in disaggregated storage.

Compute-in-storage architectures move selected host computation to storage nodes. Examples may include higher-level functions (like Hadoop's map-reduce), simple FS operations (like search) and low-level storage system operations (like CRC-32C integrity checks). In FIG. 11, as an example, assume we have to search a given string 'bar' from the target object file 'foo', e.g., the 'grep' command in Linux, where 'foo' resides in a 3-way replicated distributed storage. Using compute-in-storage, the compute offload would involve building up an operation compute descriptor, generally a tuple defined below as compute offload descriptor: =<op, key, object>. As in this example, we have desc=<op: grep, key: bar, obj: foo>.

Since 'foo' has three full replicas, any of the replica storage target nodes can be used for this operation. However, these architectures' offloading generally works to a single replica holder (e.g., primary), leaving the other replica-holding storage nodes idle. This is a lost opportunity in terms of achieving concurrent and parallel performance.

Figure 12:
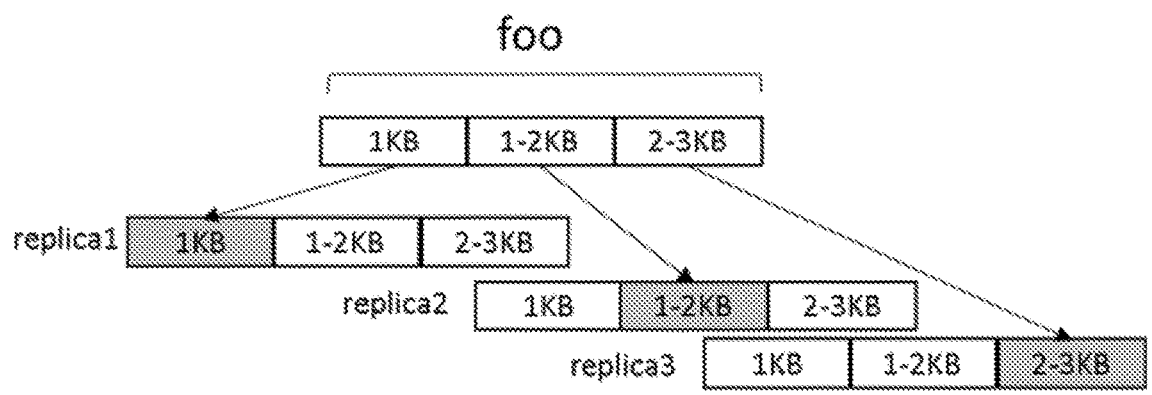
FIG. 12 illustrates an example of searching a 3-way replicated file using multiple compute-in-storage nodes in parallel.

Without loss of generality, FIG. 12 gives a simple example of the 3-way replicated file 'foo' of a total size 3 KB, where the previous search can be performed concurrently in parallel among all 3 data replicas of 'foo', leaving no compute-in-storage or near-data-compute capable storage nodes idle, as well as shorter response time since each replica node has a much smaller problem space to work on.

This invention takes advantage of the existing native data parallelism from data replication to achieve parallel and concurrent compute offload in distributed storage systems using data replication. It is built on top of, as well as transparent to, any prior generic compute offload mechanism, with the flexibility of optimal parallelism adapted to the actual input parameters to the compute offload task.

There are several existing compute offload solutions (e.g., Eideticom, NGD Systems) that are created with FPGA or on-disk solutions for compute offload. These solutions all target data within a single disk. Amazon's S3 Select storage functionality seems to indicate there is some offload capability to allow users to filter out data at the S3 side rather than pulling data over to the user. Existing map-reduce frameworks, such as Hadoop and Spark, are designed to make use of the parallelism for their compute tasks independent of whether there is data parallelism on their storage backend. None of these existing solutions, however, can perform concurrent and parallel compute offload on replication based distributed storage. For example, many existing offload solutions (e.g., those from Eideticom and NGD Systems) only focus on offloads to a single disk. Amazon's S3 Select fails to provide offloading that takes the data parallelism at the storage system level into consideration. Existing map-reduce frameworks do not consider compute offloads in their overall architecture, and thus none of them are able to take advantage of the data parallelism at the storage backend.

This invention takes advantage of the existing native data parallelism from data replication to achieve parallel and concurrent compute offload in distributed storage systems using data replication. It is built on top of, as well as transparent to, any prior generic compute offload mechanisms. It introduces the Parallel Compute Offload Descriptor as an extension to prior compute offload descriptors. It also defines an algorithm involving a Range Adjustment function and a Parallelism Factor function to achieve optimal parallel offload that is adapted to the input data of interest. It is also immune to the storage system being in degraded mode where one or multiple of the replica nodes are not in service.

There several unique advantages from this solution, including:

(1) Enabling Compute-in-storage for Disaggregated Storage: It is strategically important to establish leadership for NVMeOF based disaggregated architectures, using datacenter platform architectures and non-volatile storage products. In particular, this solution enables compute-in-storage based on platforms and storage products at scale for NVMeOF-based disaggregated storage. More precisely, it is extremely important to be able to do parallel compute-in-storage for adoption of high-density high-capacity SSDs.

(2) Scaling out Compute-in-storage: A unique aspect of this invention is the fact that it is able to take advantage of the existing native data parallelism in most distributed storage systems using data replication. This unique feature allows the compute-in-storage to scale along with the distributed storage system itself.

(3) Resilient to Degraded Storage: Another unique feature from this disclosure is that it aims to depend on an adaptive parallelism factor dynamically, and thus it is immune to the storage system running in degraded modes with some replica nodes offline. This allows the compute offload capability to be fully utilized in parallel as much as possible, even when the storage system runs in degraded mode.

(4) Better Total Cost of Ownership (TCO): Furthermore, this invention enables improved resource usage efficiency in compute-in-storage enabled distributed storage systems where data replication is commonly adopted. In other words, this invention amortizes the unavoidable cost from data replication. This TCO reduction will be greatly appreciated by entities such as cloud service providers (CSPs), Telcos, and so forth, as it lowers the cost of their data centers and consequentially lowers the cost to their customers.

In some embodiments, a first precondition relating to an input length limitation (precondition 1) is used. For example, as a pre-condition, compute-in-storage offload capability is only invoked if the following condition is met:

$$\text{Len(object)} >= \text{Len(key)} \qquad (1),$$

where object is the input target object file that the compute task is designated to, and key is the input parameter for the compute task to use, such as object='foo' and key='bar' in the string search example shown in FIG. 11. Len( ) is a length function to calculate the total length in the unit of a datum independent of any character coding scheme such as ASCII or UTF. In the earlier example, the length for object 'foo' is 3 KB and length for key 'bar' is 3. This allows the boundary to be calculated without worrying about a potential mismatch between the data on the disk and the data in the input from the client side. The length function can be measured as C/C++ strlen( ) and can also be customized depending on the actual compute task.

Moreover, in some embodiments, a second precondition relating to active replica nodes (precondition 2) is also used. This precondition is on the replication factor. For example, assume R is the set of replica SDS nodes for a given input object. The common replication factor for the object is then given by r=|R|. For example, in FIG. 11, we have R(object='foo')={SDS1, SDS2, SDS3} and r=3. In the case of the real example of Red Hat Ceph, the following gives an example output for an object file 'foo':

>ceph osd map test foo
osdmap e260 pool 'test' (4) object 'foo'→up [2,1,3], acting [2,1,3]

The above shows 'foo' has 3 replication SDS nodes '1, 2, 3' where '2' is the primary Ceph OSD SDS node. Let $R_a$ be the Active Replica Set that indicates the set of nodes for a given input object. Obviously when the storage system is operating normally, $R=R_a$. When the storage system is running in degraded mode where some nodes are failing and have to be taken offline while recovery is taking place, $R_a$ will vary depending on the actual input object. Since the host in FIG. 11 is aware of the health of the running distributed storage system, the information of the current active set of replica nodes $R_a$ is always readily available to the host. The active replica factor $|R_a|$ is used as the input replication factor r for the parallel compute offload mechanism described in the following sections, as shown by the following equation:

$$r=|R_a| \qquad (2).$$

The above enables a solution to be built that is immune to the number of replica nodes available, making the parallel compute offload more resilient to the storage system being in degraded mode.

The basic idea behind this solution involves a divide and conquer approach. In particular, this solution leverages the existing data parallelism via a divide and conquer approach over the target file.

FIG. 12 illustrates the divide and conquer on an example 3 KB file 'foo' with 3 replicas. The computation work on the target file 'foo' can be divided evenly based on the replication factor, which is 3 in this case, where each storage replica node is responsible for performing the computation task over ⅓ of the target file 'foo'.

For example, assume the target file 'foo' has a 3 KB size, as shown in FIG. 12. Since all replica nodes have the same exact copy of the file 'foo', the solution essentially makes use of the inherent data parallelism with a factor of 3 by evenly distributing the total file 'foo' among its 3 replication nodes. In other words, the target file 'foo' can be divided into 3 chunks and the 3 replica nodes can concurrently perform the same computation task in parallel over ⅓ of the total file 'foo.' This effectively reduces the total computation time to at least a factor of r, where r is the active replication factor introduced earlier.

As described above, a compute offload descriptor can be generalized as the following tuple:

$$\text{Compute Offload Descriptor or desc:=<op,key,object>} \qquad (3),$$

where in FIG. 11, we have desc=<op: grep, key: bar, obj: foo>. Further, the above compute offload descriptor can be extended to create a Parallel Compute Offload Descriptor as:

$$\text{Parallel Compute Offload Descriptor: desc<op,key, object,range>} \qquad (4),$$

where the new range parameter indicates byte-based starting and ending offsets of the target object, where the compute task op is to be carried based on the input parameter key.

Figure 13:
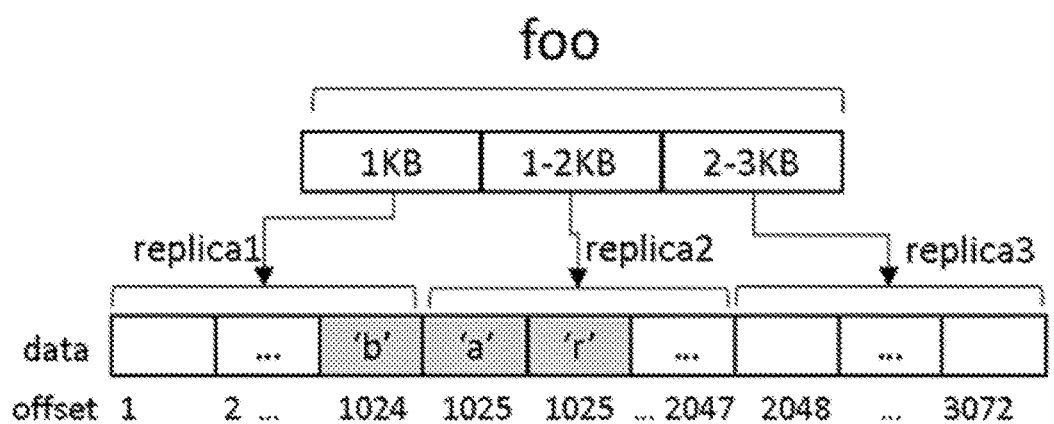
FIG. 13 illustrates an example input parameter appearing at the boundary of neighboring chunks of multiple replicated storage nodes.

After the target file 'foo' has been divided into r chunks among r replica nodes, i.e., r=3 in FIG. 12, care must be taken for the data spreading across the boundaries of neighboring chunks, e.g., [1 KB−d, 1 KB+d] (where d>0), between the compute task on the replica1 node and the compute task on the replica2 node. More precisely, the actual range assigned to the replica node should consider the possibility of the input parameter appearing across the boundary of the neighboring chunks, as shown in FIG. 13, which illustrates the input parameter 'bar' appearing at the boundary of neighboring chunks assigned to the replica1 node and the replica2 node. In FIG. 13, for example, the string 'bar' occupies byte offset 1024, 1025, and 1026 (1-based address).

Therefore, this solution also adds a range adjustment mechanism based on the input parameter length. The range adjustment is defined based on the following range adjustment (RA) function:

$$RA(\text{input})=\text{minimum length required if input is located at the chunk boundary} \qquad (5).$$

The output of this function is denoted as d. In the example of FIG. 13, we have:

$$d=RA(\text{'bar'})=\text{strlen('bar')}-1=2 \qquad (6).$$

Note that depending on the nature of the compute task, the definition of function RA( ) can vary and can be made configurable at runtime. However, in most cases, the length of the target input data will be general enough to handle most common scenarios. Also note that the RA function can be done either at the host side or the target side. When done at the host side, the host would translate the client compute offload request to initiate the parallel compute offload requests to the storage nodes, where the storage nodes create the compute offload descriptor accordingly. When done at the storage node side, the storage node will take the compute to do RA( ) and apply it on the fly when constructing the parallel compute offload descriptor.

Assume the replication factor is r for a given object file, we want to be able to take full advantage of the existing data parallelism. However, whether we are able to achieve the maximum parallelism as replication factor r depends on the size of the input parameter 'key'. We define p as the parallelism factor as:

$$p = \begin{cases} r, & \text{when } Len(\text{key}) \le \dfrac{Len(\text{object})}{r} \\ Len(\text{object})\backslash Len(\text{key}) + 1, & \text{when } Len(\text{key}) > \dfrac{Len(\text{object})}{r} \end{cases} \quad (7)$$

In Equation (7), the '\' is an integer division operator. From Equation (7), we have the following implications. First, when p=r, we achieve full parallelism from all available r replica if the input parameter 'key' is relatively small comparing with each r chunk of the target object file. In other words, the 'range' parameter in the parallel compute offload descriptor should not exceed the length data of each chunked replica node. Secondly, when this happens, i.e., when Len(key)>Len(object)/r, we fall into Partial Parallelism, where p<r. Lastly, when the input parameter 'key' is really big, i.e., Len(key)>Len(object), we will get c=0, which means there is no parallelism we can take advantage of, therefore, we fall back to the original offload case as depicted in FIG. 11, where we send the offload request to a single target node to operate on the full copy of the input object, i.e., 'foo'.

Since the parallelism factor p<=r, the exact number of replica nodes involved in this parallel compute offload should also be equal to p. Let $R_p$ be the Parallel Compute Replica Set for a given input object, where obviously we have $R_p$ is a subset of R(object) and $|R_p|$=p. In many cases we can use the full replication factor rasp, when p<r, the host must perform an operation to select a subset of SDS nodes of size p out of the existing set of all replica SDS nodes with size r. The selection can be simply the first p out of r. Alternatively, the host can add a counter as how many on-going compute offload tasks are in progress for each SDS node, then choose p out of r that are the least occupied.

After $R_p$ has been generated, each SDS node in $R_p$ is given an index i=1, . . . , p, where the i-th SDS node is responsible for the i-th range of Len(object)/p. For example, as in FIG. 11, we will have $R_p$[1]=SDS1, range[1]=[1.1 KB]; $R_p$[2]=SDS2, range[2]=[1 KB, 2 KB]; $R_p$[3]=SDS3, range[3]=[2 KB, 3 KB]. Note that the host will send the Range Adjustment function output d together with the above calculated ranges to the SDS nodes in $R_p$, where each selected SDS node will apply the range adjustment d on top of the received range to construct the parallel compute offload descriptor correctly for its target accordingly.

In an existing non-parallel compute offload case, the response would go back from the target to SDS node (storage node), then to the Host server. In this invention, the SDS nodes involved in parallel compute will all respond to the Host who is responsible for initiating the compute offload requests to these SDS nodes originally. The response would include the result of the compute task as well as where in the object file the result has been derived from. This is required such that when multiple results are found in the overlapped boundary area, i.e., d from Equation (2), a comparison of addresses (where multiple results are found) will allow these results to be aggregated correctly.

Figure 14:
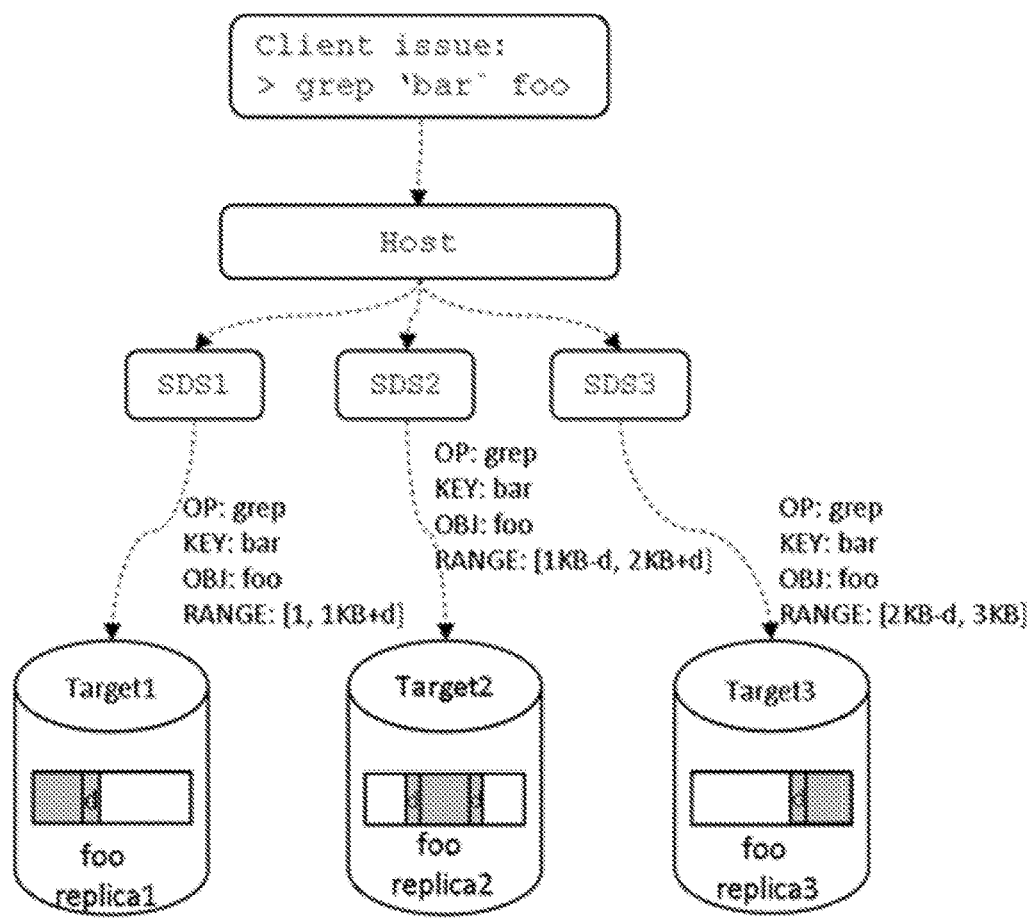
FIG. 14 illustrates an end-to-end parallel compute offload architecture.
Figure 15:
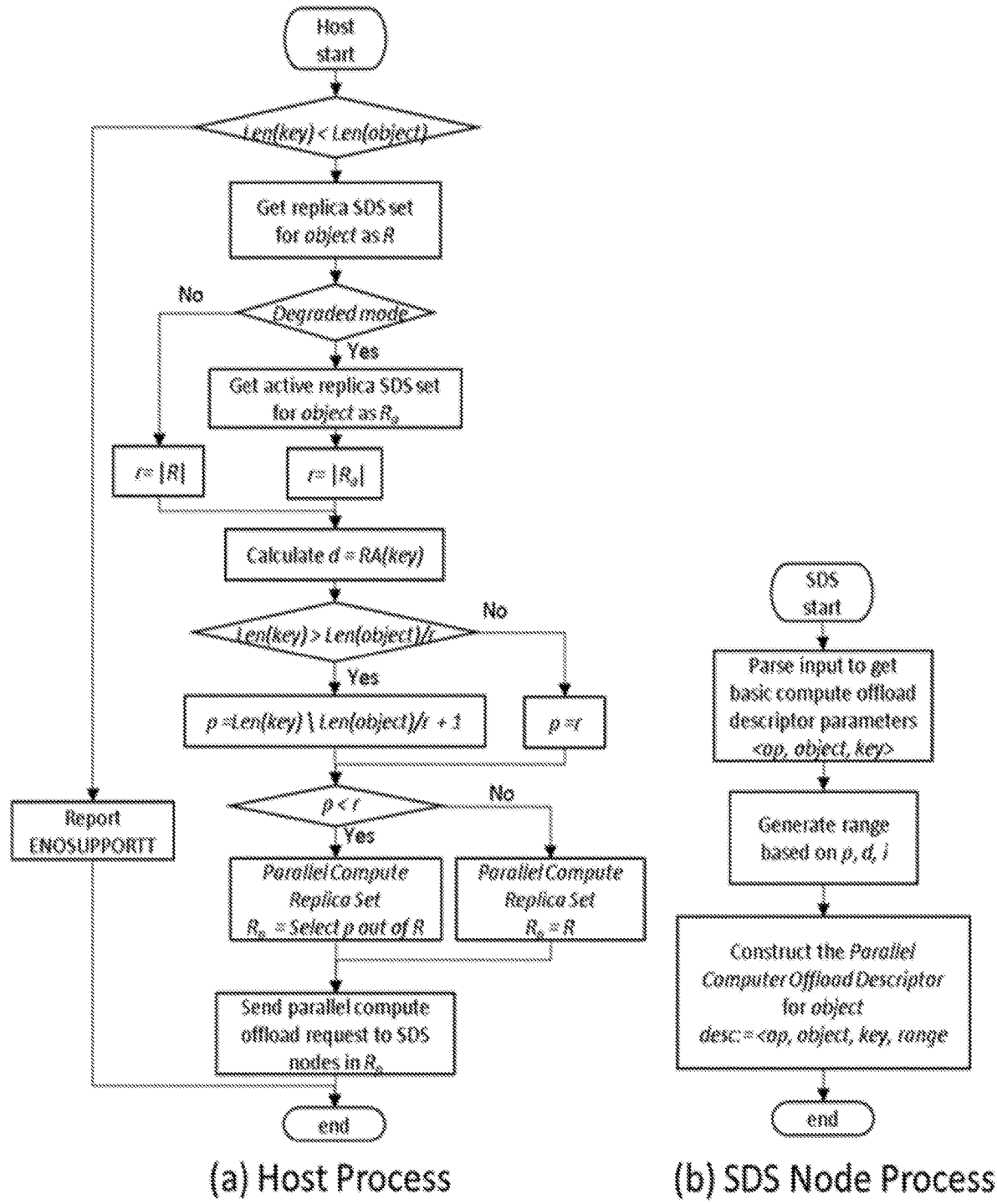
FIG. 15 illustrates a flowchart for the parallel compute offload operations on the host process and the SDS node process.

FIG. 14 illustrates an end-to-end parallel compute offload architecture. In particular, FIG. 14 offers an architecture view of the operation flow from the client application to the disaggregated targets. FIG. 15 illustrates a flowchart for the parallel compute offload operations on the host process and the SDS node process.

Note that some embodiments can potentially consolidate the requests from the host to the storage SDS nodes via multicasting the request from the host. In this case, concurrency can be further improved. For multicasting such requests, the range parameter needs to be modified as a range list, where each SDS node will pick up its own range from the list accordingly.

Figure 16:
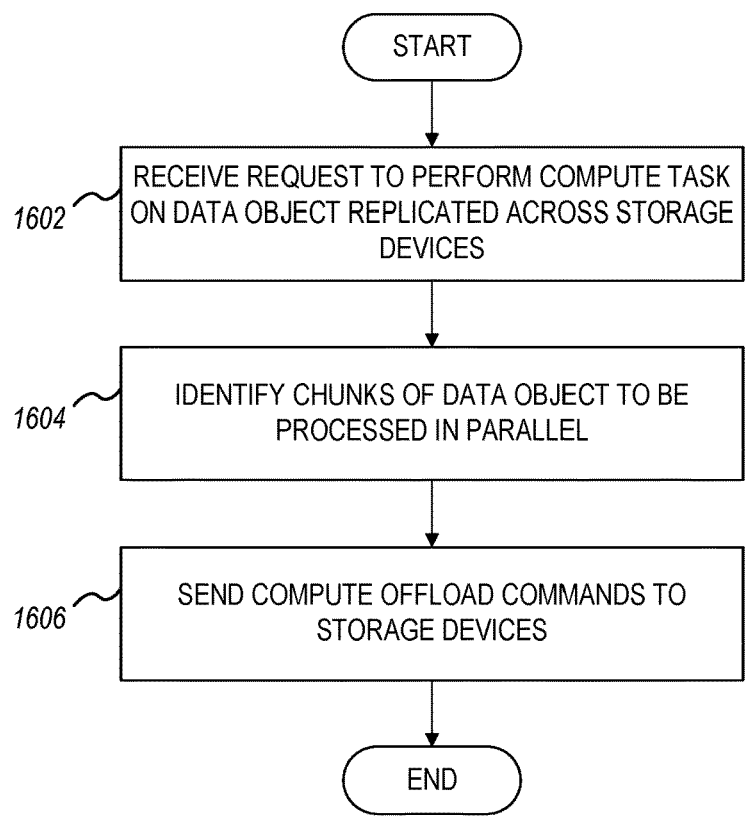
FIG. 16 illustrates a flowchart for performing compute tasks on data stored using replicated data storage.

FIG. 16 illustrates a flowchart 1600 for performing compute tasks on data stored using replicated data storage. In various embodiments, flowchart 1600 may be implemented using the embodiments and functionality described throughout this disclosure.

The flowchart begins at block 1602, where a request is received to perform a compute task on a data object stored on a storage system, wherein the data object is replicated on each storage device in the storage system.

The flowchart then proceeds to block 1604 to identify a plurality of chunks of the data object to be processed in parallel on the storage system, wherein the compute task is to be performed on the plurality of chunks by the plurality of storage devices.

The flowchart then proceeds to block 1606 to send a plurality of compute offload commands to the plurality of storage devices, wherein each compute offload command is to instruct a corresponding storage device to perform the compute task on a corresponding chunk of the plurality of chunks.

At this point, the flowchart may be complete. In some embodiments, however, the flowchart may restart and/or certain blocks may be repeated. For example, in some embodiments, the flowchart may restart at block 1602 to continue receiving and processing requests to perform compute tasks on data objects stored in the replicated storage system.

Offloading Computation to Striped Distributed Storage

Computation in storage is an appealing method for reducing I/O bottlenecks, as operations can be run "close to" the data, as opposed to pulling it over a constrained I/O link (e.g., a network). A host server connected to a target storage server using NVMeOF (NVMe over fabrics) is one example, where moving compute from the host to the target becomes desirable.

However, current compute-in-storage designs assume that all data is either perfectly discretized into easily interpretable chunks or replicas, is wholly collocated on the same logical device (e.g., Hadoop+HDFS), or has a centralized authority that collates data from multiple locations, thus paying a high network cost. For example, to offload a "search" operation to a target storage server, existing solutions assume that the storage server has access to the entire file or object and can, therefore, perform the search close to the storage and simply return the matching result to the host. Such solutions will obviously not work with erasure-coded storage for example, where the storage systems (e.g., servers or individual devices) only see a portion of the data.

Because many storage systems stripe data across multiple locations for performance or reliability reasons, particularly those built upon block storage, we must devise a new mechanism for offloading computation to individual shards, or portions of a data object. For example, in a striped storage system, a data object may be partitioned into stripes, or smaller units of data, that are distributed across the collection of storage devices in the striped storage system. Thus, a "shard" of the data object may refer to a contiguous portion of the data object that is stored adjacently or contiguously on a particular storage device in the striped storage system.

This solution enables systems that distribute data across multiple locations to glean much of the same advantage that purely replicated or single copy storage achieves from compute-in-storage, while minimizing the needed coordination between distinct storage locations. It leverages the structure inherent to most data, and only returns partial residual data elements that may straddle storage targets, along with the desired results. Stated differently, although a large file may be distributed (striped) across n storage targets, where each storage target sees $1/n^{th}$ of the total file, we can offload computation separately to each piece and collect the results and residuals.

For example, consider a word count use case, where each target server counts the words in their shard and returns the result to the host. The host can then add the word counts across shards to get the total for the file. Words that straddle storage serves are "residuals," which are returned to the calling host and reassembled into full words for final counts. These residuals are easy to identify as simply a string that begins or ends at a boundary without a space, so it is trivial to determine whether or not it is the end of the word.

Figure 17:
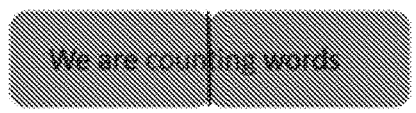
FIG. 17 illustrates an example of a residual for word count.

FIG. 17 illustrates an example of a residual for word count. The word "counting" straddles a boundary, and the left chunk sees "coun" and no space after it, so it can independently identify it as a residual, similar to "ting" on the right chunk with no leading space.

An additional benefit that is gained from this distributed computation is performance speedups, as data can be operated in parallel by leveraging the distributed nature of the data storage.

This solution recognizes that many datasets, while logically stored as a single entity (e.g., a CSV file), are comprised of many smaller, well-structured elements, such as individual lines or records in a CSV file. We leverage this structure to run computation over distributed data, as individual data elements can be computed over, and those that span target server boundaries can be returned to the client and re-assembled and queried there. This allows the solution to realize most of the benefits of compute-in-storage (reduction in data movement) without requiring that data be fully centralized.

This opens more doors to compute-in-storage applications, which can leverage a variety of hardware ranging from generic CPUs and FPGAs, to specialized hardware and accelerators, such as neural network hardware. In particular, this solution enables compute-in-storage to be leveraged for erasure-coded data.

To begin, we define the following vocabulary for generically describing distributed storage:
  A data object (e.g., a file) is made up of multiple chunks.
    These chunks are usually distributed across multiple machines for reliability and performance purposes.
    These chunks may be erasure coded (e.g., distributed with parity), although this is not required. Note, since this solution does not depend on the presence of parity data, such data is not included in the example figures for this solution.
  Groups of chunks are organized into stripes.
    This logical arrangement allows the parity of erasure codes to be easily calculated, performing parallel reading, and so forth.
  Blocks are linear groupings of data that span chunks across a full stripe.
    If data does not fill up a block, it is padded.
    Blocks may vary in size, but this does not impact the solution as long as their sizes are known.
    Note, these "blocks" are distinct from the blocks presented on a block-based device like an SSD. Unless otherwise specified, the term "blocks" in the following discussion refers to the higher-level abstraction described here.
  The portion of a block that resides inside of a chunk is a sub-block.
  A boundary is the location where a piece of data transitions to a chunk in a separate location.

Figure 18:
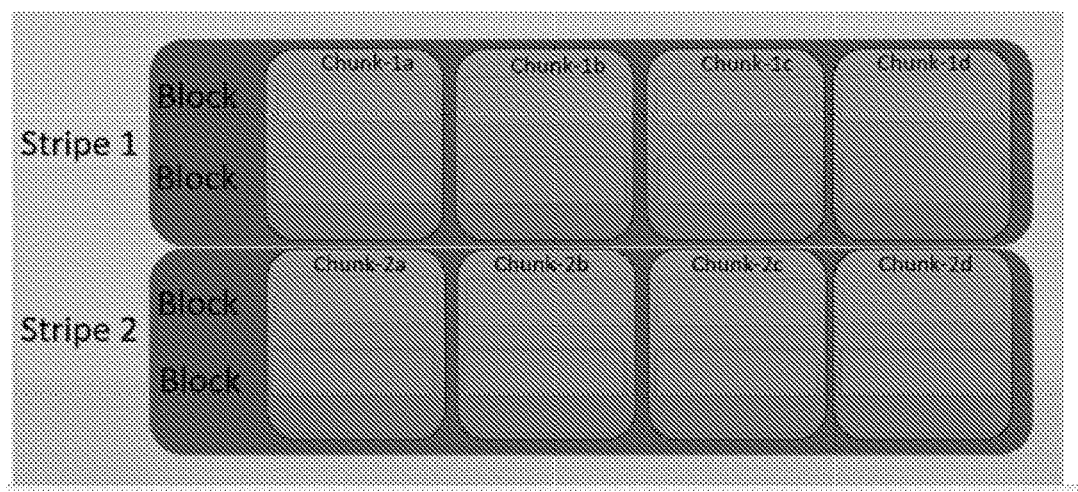
FIG. 18 illustrates an example data layout with 2 stripes and 4 chunks per stripe.

A simple example is shown in FIG. 18. FIG. 18 illustrates an example data layout comprised of 2 stripes of 4 chunks per stripe. Each stripe has 2 blocks, and each block has 4 sub-blocks. Potential data blocks and chunks are not shown, as we are only interested in the plaintext data.

The prototype and layout work is based on the Minio system, but with more generic vocabulary. The principles and terms also apply without loss of generality to other storage systems, such as Ceph and Swift.

This solution also leverages block-based compute-in-storage systems (e.g., object-aware storage and virtual objects), which enables arbitrary computations to be performed in block-based storage.

The gist of the solution is to examine each chunk and its constituent sub-blocks independently, and return the desired data. Any residual data element parts that may be straddling boundaries are returned to the caller (e.g., the host server) to be combined and checked, thus reducing data movement while still exploring the entire object.

Figure 19:
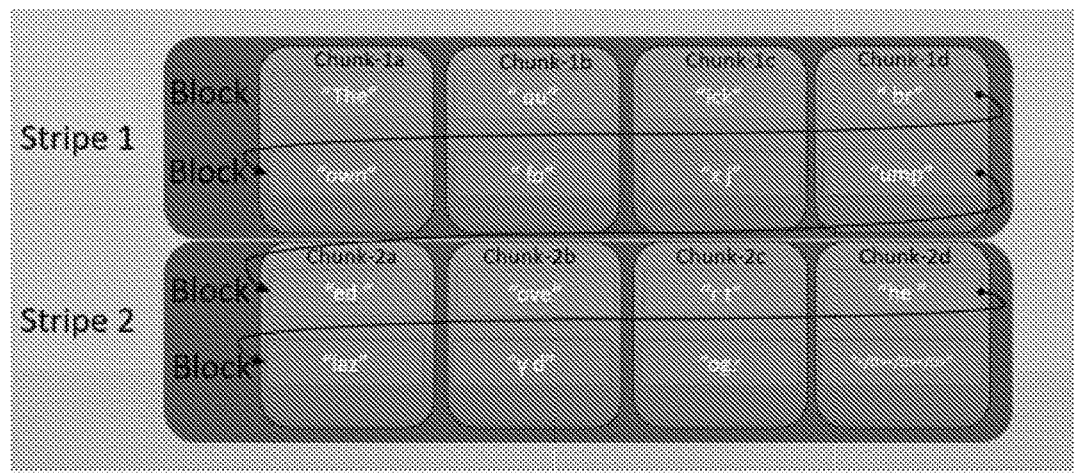
FIG. 19 illustrates an example data layout with 2 stripes and 4 chunks per stripe, a block size of 12 and a sub-block size of 3, and example data.

As an illustrative example to highlight how the solution works, consider the same layout from FIG. 18, with a block size of 12 characters and a sub-block size of 3, as shown by the example in FIG. 19. For example, the following sentence is stored in the object shown in FIG. 19: "The quick brown fox jumped over the lazy dog." In this example, the second block of chunk-2d contains padding, and the word "fox" straddles chunk boundaries (e.g., the boundaries of the second blocks in chunks 1b and 1c).

The chosen layout is representative of several object storage systems, whereby data is written out block-by-block in a pattern like words across a page. This is often done so the systems do not have to buffer large amounts of data before persisting it to storage.

In conventional systems, a search for the word "fox" would require that all data be centralized and then the reconstructed string be scanned for the particular word. Naively distributing the search would miss the search string, as "fox" straddles the boundaries of chunks 1b and 1c. The described solution, however, informs the compute-in-storage system of where the boundaries are, and the maximum size of any possible data element. In this example, it is a string of length 3, for the word "fox."

Figure 20:
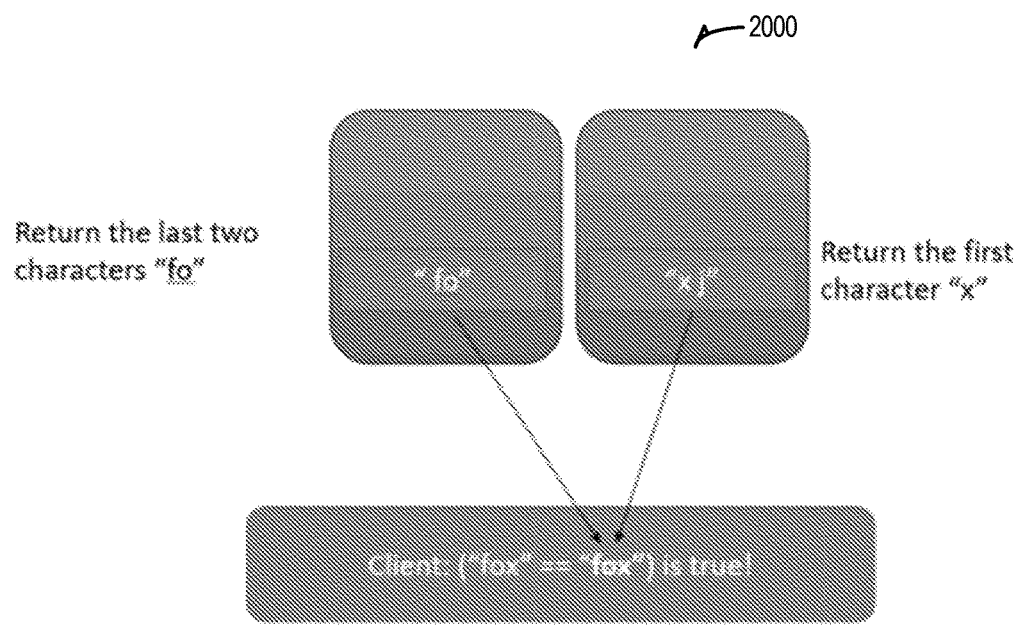
FIG. 20 illustrates an example of returning ambiguous residual data for reconstruction.

In this example, most of the chunks and their sub-blocks can easily be discarded independently with no coordination, as they do not match any letters in our search string. A sub-block in chunk 1b, however, matches the first 2 letters which should be returned to the host and/or client, and similarly, chunk 1c matches on the letter x in its first letter. Neither of them can verify with 100% certainty whether they've found the search string, so they return their data to the calling application on the host for verification. These two chunks will return characters from their respective sub-blocks and the calling application (running on the host server) will do the final comparison, as illustrated in FIG. 20. For example, FIG. 20 illustrates an example of returning ambiguous residual data for final reconstruction.

The lynchpin of this solution is the identification of what we call residuals. A residual is a data element (e.g., a CSV record) that crosses chunk boundaries, and requires being combined with another residual to make sense of it. A trailing residual is a partial element straddling a boundary at the end of a sub-block, while a leading residual is one that is at the start of a sub-block. These residuals may be returned in addition to other data of interest to the calling client, where they will be reconstructed into full data elements and operated on otherwise normally.

There are two basic methods for identifying residuals:

(1) Fixed Size: If data elements are all of a fixed size N bytes, even if there is not an underlying structure to leverage, it is trivial to simply return the first and last N−1 bytes of a sub-block on either side of a data boundary.

(2) Structured/Semi-Structured Data: some data is well structured while some has clear delimiters between contiguous elements, e.g., CSVs have carriage returns, JSONs have braces, and so forth.

(i) Trailing Residual: If an element is truncated at a sub-block boundary, return all data from the end of the previous structure (e.g., in a CSV, this would be a line) to the end of the sub-block.

(ii) Leading Residual: If an element is "too short" (missing pieces), identify the beginning of the next complete element. Return all data from the start of the sub-block, to the start of the first complete element.

Moreover, the application must have the ability to accurately describe the data layout to the compute-in-storage system, such as by providing a series of offsets that describe boundaries as well as which boundaries map to one another. In FIG. 19, for example, it should be recognized that sub-blocks 1c and 1d, 1d and 2a, etc. are logically adjacent to one another. This information is commonly available as metadata in many systems (e.g., the xl.Json file stored with Minio objects).

Figure 21:
FIG. 21 illustrates an example of identifying residuals on semi-structured data.

FIG. 21 illustrates a simple example of identifying residuals on semi-structured data. In this example, the highlighted CSV value spans a boundary, and we can recognize that we have an incomplete record as it is not terminated with a carriage return (\n).

With respect to the request flow, on the host side (e.g., the calling application), we use the layout metadata to construct a list of boundary entries, which are used to organize and sort the residuals. Each boundary entry contains a reference to a file or object chunk, offsets describing the start and end of a sub-block, buffers to store any trailing or leading residuals, and pointers to its logical neighbors. An example of residuals and a boundary list are shown in FIGS. 22 and 23, respectively.

Figure 22:
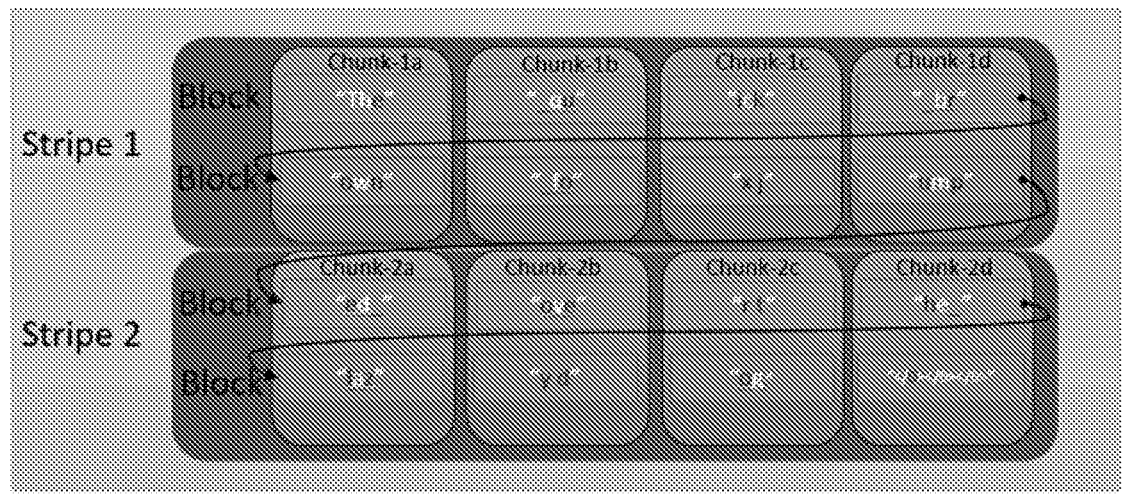
FIG. 22 illustrates an example of residuals when searching for a string of length two.
Figure 23:
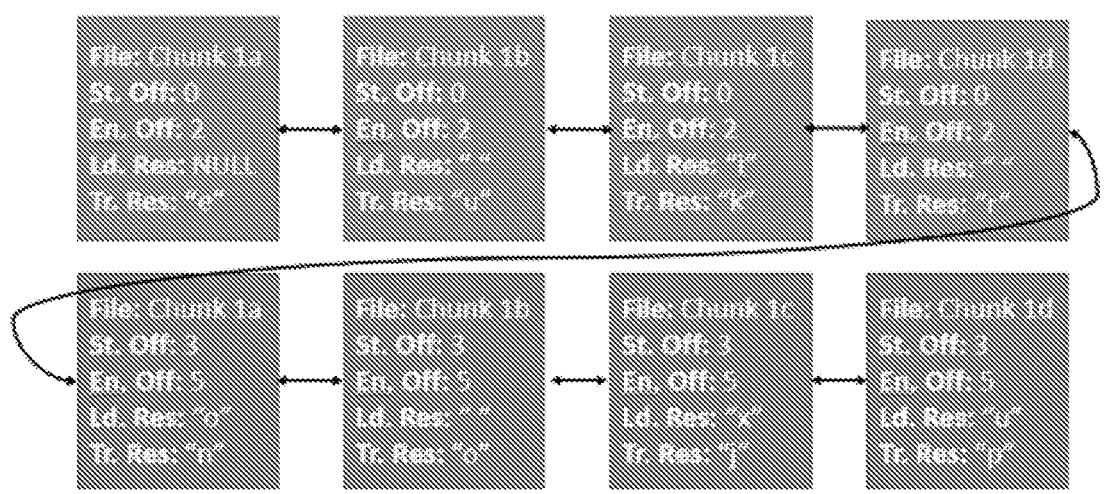
FIG. 23 illustrates an example boundary list with residual returns.

For example, FIG. 22 illustrates an example of residuals when searching for a string of length two, and FIG. 23 illustrates an example boundary list with residual returns for stripe 1 from FIG. 22. This example is based off of a search for a string of length two, so each leading and trailing residual, if present, is of length 1 (e.g., n−1).

During this construction, we also collate all the boundaries that occur per chunk, which allows each chunk location to calculate and retrieve all of its residuals with a single request.

These grouped boundaries are included in the compute descriptor. For example, the compute descriptor contains a list of blocks that compose a file object, along with the operation to be performed (e.g., search) and any arguments (e.g., "fox"). In addition, the descriptor is extended to include the boundaries and offsets for each chunk.

Each machine where chunk(s) are located on will independently run the operation and return any residuals that are specific to the operation being requested. As mentioned earlier, any complete data will be returned as normal, along with these partial residuals. These residuals are then reconstructed and operated on the host side, before returning the result(s) back to the calling application.

The complete flow is summarized as follows:

(1) HOST: Host retrieves layout metadata (e.g., XL.json in Minio) from the storage target.

(2) HOST: From layout metadata:
  (i) Boundaries and offsets are calculated, and the initial boundary list is created.
  (ii) Concurrently, the offsets of each individual chunk are collated.

(3) HOST: The compute descriptors are created and issued to the target(s).
  (i) Note that each chunk will have its own descriptor created.

(4) TARGET(S): Each target processes each descriptor.
  (i) As described above, any residual data is calculated and collected for return.
  (ii) Non-residual data is operated on and any relevant results are also collected for return. For example, in a CSV, complete CSV lines can be queried as normal and matching values returned.

(5) HOST: Residuals are returned and re-assembled and operated on (e.g., as shown in FIG. 19).

(6) HOST: Results are returned to the calling application.

Figure 24:
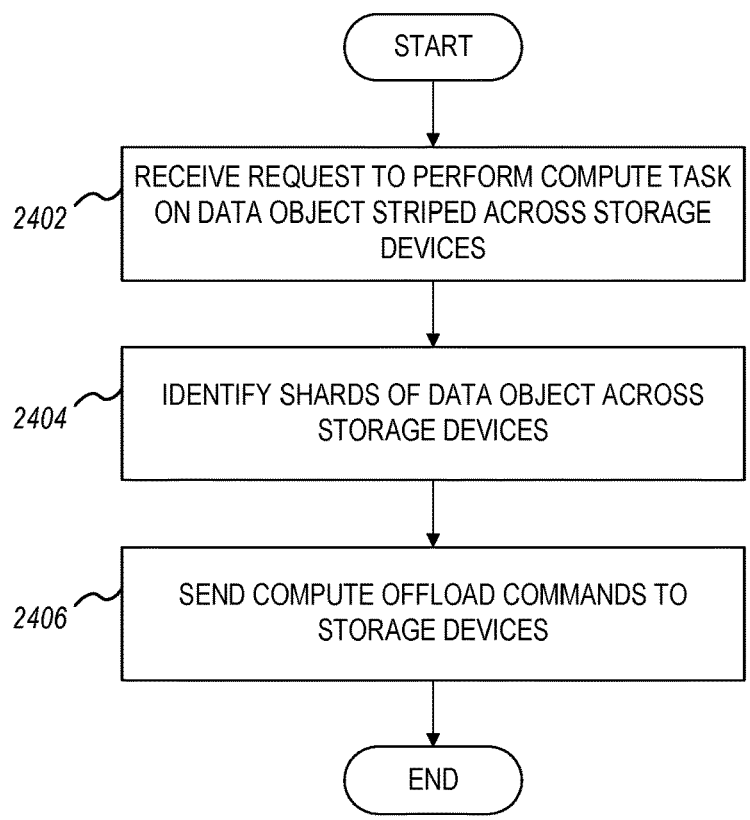
FIG. 24 illustrates a flowchart for performing compute tasks on data objects stored in a striped storage system.

FIG. 24 illustrates a flowchart 2400 for performing compute tasks on data objects stored in a striped storage system. In various embodiments, flowchart 2400 may be implemented using the embodiments and functionality described throughout this disclosure.

The flowchart begins at block 2402, where a request is received to perform a compute task on a data object stored on a storage system, wherein the data object is striped across a plurality of storage devices in the storage system.

The flowchart then proceeds to block 2404 to identify a plurality of shards of the data object on the plurality of storage devices, wherein each shard comprises a contiguous portion of the data object stored on one of the plurality of storage devices.

The flowchart then proceeds to block 2406 to send a plurality of compute offload commands to the plurality of storage devices, wherein each compute offload command is to instruct a corresponding storage device to perform the compute task on a corresponding shard stored on the corresponding storage device.

At this point, the flowchart may be complete. In some embodiments, however, the flowchart may restart and/or certain blocks may be repeated. For example, in some embodiments, the flowchart may restart at block 2402 to continue receiving and processing requests to perform compute tasks on data objects stored in the striped storage system.

Compute-In-Storage on Distributed Storage System Running in Degraded Mode

Figure 26:
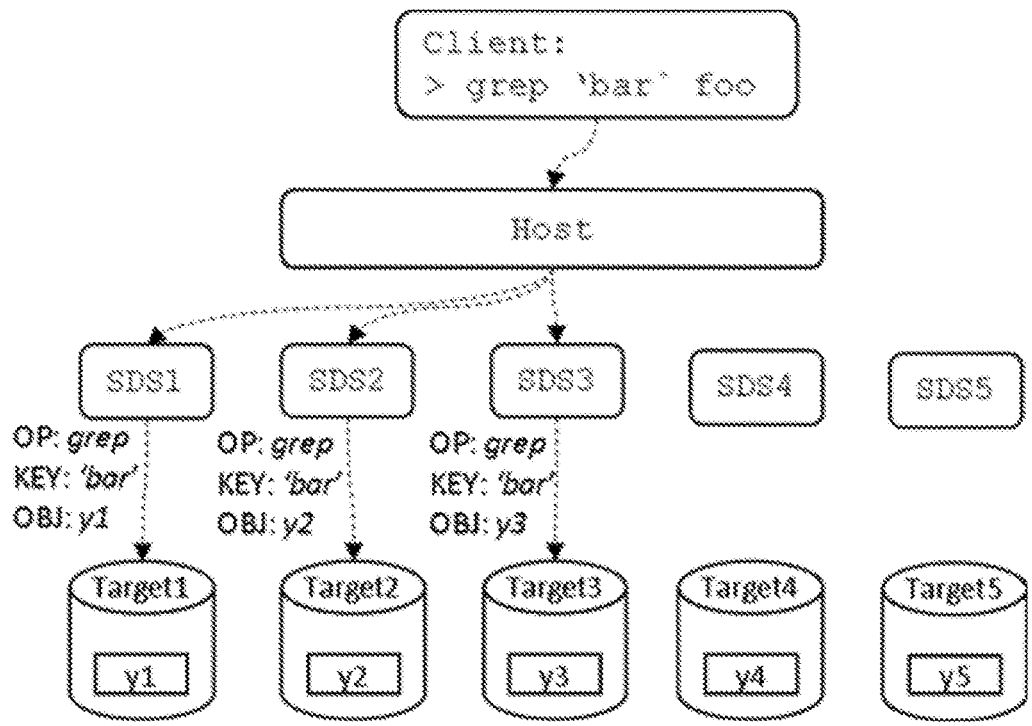
FIG. 26 illustrates an example of compute-in-storage on a distributed software-defined storage system.

In the context of rack scale storage designs (e.g., as shown in FIG. 26), compute-in-storage solutions move data-intensive computation (e.g., filtering, searching, and compression) to storage targets running protocols such as Internet SCSI (iSCSI) or NVM over Fabrics (NVMeOF). The goal is to reduce the network bandwidth that would otherwise be required to perform these tasks on the storage host server. In the case of erasure coded (EC) storage, which is becoming increasingly important due to its improved capacity efficiency at scale, data is erasure coded across the storage nodes. However, when one or multiple storage nodes fail, the storage system enters the degraded mode, where data must first be reconstructed at the storage node side, forcing the data to be pulled over from the target side. As such, client applications cannot benefit fully from compute-in-storage (e.g., as data is being copied across the network for the reconstruction). This problem can be solved by introducing a mechanism to temporarily assign one storage node as the degraded mode compute offload storage node, thereby allowing it to create a degraded mode compute descriptor such that its target can reconstruct data from its parity and perform the requested compute-in-storage task.

Figure 25:
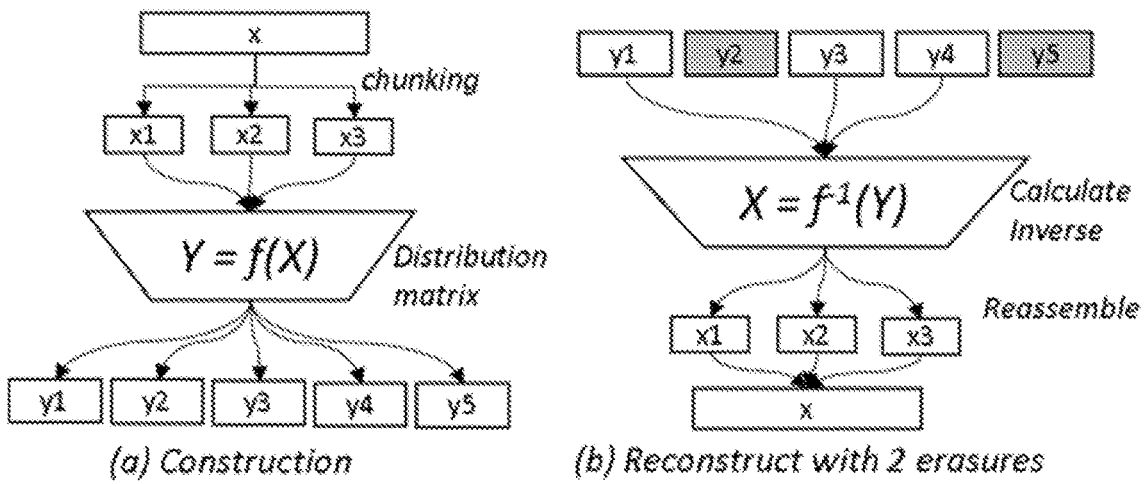
FIG. 25 illustrates an example of the logical flow for erasure coding construction and reconstruction.

Most existing industry distributed cloud storage systems, such as Private Cloud storage from Minio Inc., Red Hat Ceph, Open Stack Swift, or Aliyun Pangu, support EC storage. EC can be described generally by the term EC(k, m), where the input data is split into k data chunks and m parity chunks are computed based a distribution matrix. In the event a number of chunks <=m are lost (e.g., m erasures), such as due to system crash or server failures, the original data can still be reconstructed from the surviving k chunks. For example, FIG. 25 illustrates an example of the logical flow for erasure coding construction and reconstruction. In FIG. 25, the logical flow for EC construction and reconstruction is shown in sub-figures (a) and (b), respectively, and the example EC scheme is a (3,2) scheme with 3 data chunks and 2 parity chunks.

Meanwhile, the industry is moving to disaggregated storage to achieve better resource modularity and independent scalability, which is particularly suitable for the growing storage capacity needs from a vast variety of clients at cloud scale. In disaggregated storage, a storage server node (e.g., Ceph OSD node, Swift Storage Node, or Minio Server Node) is an initiator (e.g., NVMeOF or iSCSI) with storage located at the remote target. As expected, this approach results in a considerable consumption of extra network bandwidth and an increase on latency due to data being moved back and forth from the target to the storage server side.

Accordingly, the following discussion presents a mechanism for compute-in-storage on EC-based distributed storage running in degraded mode with data or parity erasures.

FIG. 26 illustrates an example of compute-in-storage on a distributed software-defined storage system with EC(3,2) deployed over NVMeOF disaggregated storage. Note that the offloaded compute is always designated to all plain data chunks of 'foo' (y1, y2, y3). The 2 parity chunks (y4, y5) are not involved in this process.

To understand FIG. 26, the following terminologies are defined below and further referenced throughout this section:

Client: This is an application that uses storage services (e.g., via S3, block, or filesystem interfaces). For compute offload capable storage, it is assumed the client is able to issue commands to perform the offloaded tasks, such as 'grep' in this example.

Host: This is where the storage service interface is provided to the client. The client request to get, put, and/or compute will be translated to corresponding storage implementation specific protocol related requests. For example, in Ceph, 'Host' is a RADOS Gateway or QEMU RBD; in Swift, 'Host' is the Swift Proxy server; and in Minio, 'Host' is referred to as the Minio Server.

SDS: The software defined storage (SDS) server node. This is normally the core entity in a distributed storage system responsible for actual placing and retrieving client data based on required policies such as replication or erasure coding. In Ceph, this is called the OSD Node, where in Swift this is called the Storage Node. In Minio, this is simply called the Minio Server Node.

Target: This refers commonly to the NVMeOF target for NVMeOF fabrics or SCSI target in SCSI over Fiber Channel fabrics. These are the entities where actual storage devices reside in disaggregated storage.

Compute-in-storage architectures move selected host computations to storage nodes. Examples may include higher-level functions (like Hadoop's map-reduce), simple FS operations (like search) and low-level storage system operations (like CRC-32C integrity checks). In FIG. 26, as an example, assume we have to search a given string 'bar' from the target object file 'foo' (e.g., 'grep' command in Linux), where 'foo' resides in a EC(3,2) erasure coded distributed storage. When all plain data chunks (i.e., y1, y2, y3) are available, the compute offload would involve building up an operation compute descriptor for each plain data chunk, which is generally a tuple defined below as compute offload descriptor: =<op, key, object>. In the example of FIG. 26, we have desc=<op: grep, key: bar, obj: chunk for foo>.

However, when the system is in a degraded mode due to disk failure or server crash, an erasure code scheme EC(k, m) would allow a maximum of m erasures out of total k+m chunks, but there is no solution to achieve compute-in-storage when the m erasures involve any of the k data chunks. In the case of FIG. 26, if any of the erasure chunks comes from d1, d2, or d3, no compute-in-storage can be performed until the lost chunk is reconstructed. This means that even though the availability of the storage service is still guaranteed in degraded mode, the availability of the compute-in-storage service is lost.

No existing solutions can perform compute-in-storage for EC-based distributed storage in degraded mode. For example, when a storage system enters degraded mode, it is possible to designate the compute task to one of the SDS nodes that is still up and running (e.g., using approaches such as Storelet). However, as can be seen from FIG. 28, if SDS4 is to be used for data reconstruction when y2 is lost, the surviving chunks of y1, y3, and y5 will first have to be pulled over from the target side to SDS1, SDS3, and SDS5. Secondly, SDS4 has to pull y1, y3, and y5 from SDS1, SDS3, and SDS5 to reconstruct the lost y2. It is not difficult to see the bandwidth waste that results due to the data movement from the target side. At the same time, while adding computation to SDS4, existing compute-in-storage capabilities at the target side are sitting completely idle.

The solution described below enables compute-in-storage on distribute storage with an erasure code scheme EC(k, m) for any of m erasures. The mechanism leverages target-to-target direct communication at the target side and has the following key components: (1) a process to select an SDS node as the degraded mode compute offload SDS node; (2) a mechanism of creating the degraded mode compute offload descriptor.

There several unique advantages from this solution, including:

(1) Enabling Compute-in-storage for Disaggregated Storage: It is strategically important to establish leadership for NVMeOF based disaggregated architectures, using datacenter platform architectures and non-volatile storage products. In particular, this solution enables compute-in-storage based on platforms and storage products at scale for NVMeOF-based disaggregated storage.

(2) Better compute-in-storage service availability: This solution enables compute-in-storage services even when the storage system is in degraded mode. This particularly important for cloud customers who are facing disk failures or server crashes regularly with large scales of storage deployed. This enables compute-in-storage services to be available for customers even when the storage is in degraded mode, thus reducing the likelihood of SLA violations for cloud service providers (CSPs).

(3) Better Total Cost of Ownership (TCO): Furthermore, this solution allows compute-in-storage to continue to service clients while the storage system is being recovered, thus allowing more efficient resource usage in compute-in-storage enabled distributed storage systems with erasure codes. In other words, this solution amortizes the unavoidable cost from data recovery with erasure chunks, thus reducing TCOs for entities such as CSPs, Telcos, and so forth, as it lowers the cost of their data centers and consequentially lowers the cost to their customers.

For an EC(k, m) erasure coding scheme with k plain data chunks and m parity chunks, when the lost chunk or erasure chunk is among any of the m parity chunks, that problem is already addressed by other solutions in this disclosure, since all k data chunks are still available in the stripe.

The following solution addresses EC storage for erasures from plain k data chunks or any m erasures coming from all encoded k+m chunks, where both cases require reconstruction via the matrix inverse operation. Therefore, in the following discussion, when we refer to e erasures (e<=m), these n erasure chunks are either lost plain data chunks or lost encoded chunks (i.e., encoded data and parity).

The SDS node is generally responsible for building the compute offload descriptor and sends it to the corresponding target, as illustrated in FIG. 26. In the case of degraded mode, not all SDS nodes are available for this joint compute offload effort. For example, in FIG. 27, SDS2 is not available, as target2 has crashed. Apart from regular operation SDS nodes that still hold the data chunks (e.g., SDS1 for y1 via target1 and SDS3 for y3 via target3), which are referred to as normal mode compute offload SDS nodes (NMCO SDS), the Host must select an SDS node for the compute offload operation on behalf of SDS2, referred to as a degraded mode compute offload SDS node (DMCO SDS). In addition, the selected degraded mode compute offload SDS node has the responsibility of building a compute offload descriptor different from the regular compute offload descriptors, referred to as a degraded mode compute offload descriptor, which is described further below.

In the following discussion, we describe one embodiment of the selection algorithm based on tracking the compute offload load indicator on each SDS node at the Host. We first use $L_i$ as the compute offload load indicator for each target i directed by its corresponding SDSi node to perform the compute offload task. For each compute offload task, we simply define $L_i$ as:

$$L_i = \Sigma l_{ij} \qquad (1),$$

where $l_{ij}$ is the load for the compute offload task j running at target i. The individual load $l_{ij}$ is simply defined as:

$$l_{ij}=1, \text{ if SDSi is a NMCO SDS node for offload task } j \qquad (2),$$

or, $$l_{ij}=2, \text{ if SDSi is a DMCO SDS node for offload task } j \qquad (3).$$

The Host tracks the load for each SDS node i, adds the cost $l_{ij}$ to $L_i$ when a new task j is started, and removes the cost $l_{ij}$ from $L_i$ when the task is completed. The above definition allows the compute offload tasks to be balanced among all SDS nodes, since one SDS node can be contributing as the NMCO node for one task and also as the DMCO node for a different task.

With the above load indicator established, the selection process can be described as the following steps:

(1) Host finds the set of SDS nodes that own all data chunks, let it be $S_k$.

(2) Host finds the set of SDS nodes that own all parity chunks, let it be $S_m$.

(3) Host finds the set of erasure SDS nodes that are in $S_k$, i.e., nodes in $S_k$ that are out-of-service, let it be $S_e$.

(4) Host designates all nodes in $S_k \backslash S_e$ as the normal mode compute offload SDS nodes (NMCO).

(5) Host sorts the set $S_m$ based on the current offload load indicator L.

(6) Host selects a number of nodes $|S_e|$ from $S_m$ as the degraded mode compute offload SDS nodes (DMCO) with the lowest load L.

The above algorithm for selecting the DMCO nodes is also scalable when the distributed storage system scales out.

As mentioned earlier, the compute offload descriptor for normal mode can be described as:

$$\text{Compute Offload Descriptor or desc}:=<\text{op,key,object}> \qquad (4).$$

For a DMCO SDS node, it has to first perform the reconstruction based on all peer chunks, as the original data chunk is currently not available. It then can perform the required compute offload task on the reconstructed data. Therefore, the target corresponding to the DMCO SDS node must retrieve data chunks from targets of its peer SDS nodes. To achieve this, we define the degraded mode compute offload descriptor (dmdesc) as follows:

$$\text{dmdesc}:=<\text{op,key},<\text{peer chunk1,target1}>,<\text{peer chunk2,target2}>, \ldots > \qquad (5).$$

Note that, compared to the normal descriptor which describes where the chunk is, the dmdesc has a list of pairs of <peer chunk, target>. This information allows the receiving target to perform target-to-target direct communications to its peer targets to retrieve all peer chunks for EC reconstruction.

Figures 27, 28:
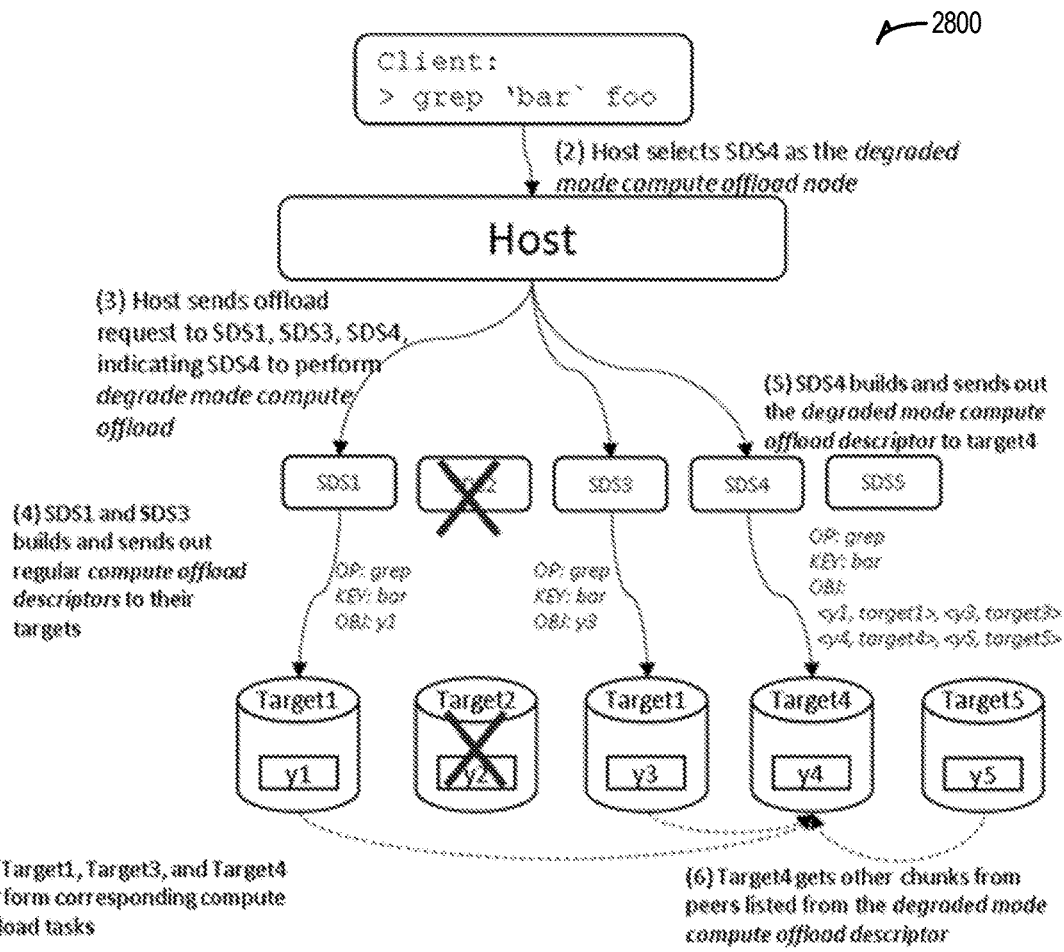
FIG. 27 illustrates an example Ceph OSD configuration with extensions to target information for OSD.
FIG. 28 illustrates an example of compute offload for storage in degraded mode.

For compute in storage to work in degraded mode, the selected DMCO nodes must have the knowledge about the targets corresponding to its peer SDS nodes. One embodiment of this can be via the extension to the SDS cluster configuration file, such as the OSD section of a Ceph cluster configuration file, as shown in FIG. 27. For example, FIG. 27 illustrates an example Ceph OSD configuration with extensions to target information for OSD. The example configuration shows an NVMeOF target based on an RDMA transport.

The above target information is then available for all SDS nodes and can be used to build the degraded mode compute offload descriptor.

For the target-to-target communication protocol, existing approaches such as T10 XCOPY can be leveraged to allow the target to read from or write to other targets, as long as the target information is detailed enough for any target to locate its peers.

FIG. 28 illustrates an example of compute offload for storage in degraded mode. In particular, FIG. 28 offers a detailed view of the operation flow from the client application to the disaggregated targets. In this example, the distributed storage is using an EC(3,2) scheme for data redundancy. Further, the storage system is currently operating in a degraded mode, as it is suffering from a loss of one data chunk from SDS2/target2. In this example, when SDS2/target2 fails, SDS4 is selected to build the degraded mode compute offload descriptor. Target4 uses target-to-target direct communication to retrieve peer chunks to reconstruct the lost data chunk 'y2', and then the compute operation is performed at the target side.

The steps are described below in more detail for a client that is aware of the compute offload capability in the distributed storage:

(1) The client sends a request to perform a compute task offloaded to the distributed storage, e.g., find a string 'bar' from a file 'foo'.

(2) Host checks what SDS nodes are still available and what SDS nodes are out of service. It selects SDS1 and SDS3 as the normal mode compute offload SDS nodes (NMCO). It then checks the compute offload load indicator for SDS4 and SDS5 according Equation (1), Equation (2), and Equation (3). Host then decides to select SDS4 as the degraded mode compute offload node, as SDS4 has a lower compute offload load.

(3) Host sends compute offload requests to SDS1, SDS3, and SDS4. It flags SDS1 and SDS3 as NMCO nodes, but SDS4 as a DMCO node to perform degraded mode compute offload (e.g., to build degraded mode compute offload descriptor).

(4) SDS1 and SDS3 receive the request as NMCO nodes and build the normal mode compute offload descriptors according to Equation (4). SDS1 and SDS3 send their descriptors to their corresponding targets.

(5) SDS4 receives the request as a DMCO node. SDS4 finds out target information for its peer SDS nodes, e.g., from the cluster configuration information. SDS4 then builds the degraded mode compute offload descriptor according to Equation (5). Finally, SDS4 sends the degraded mode compute offload descriptor to its target Target4.

(6) Based on the received degraded mode compute descriptor, Target4 uses the direct target-to-target communication protocol to retrieve peer chunks from its peer targets. For the pair in the descriptor where the target is itself, it performs local I/O to retrieve the chunk. Target4 then performs EC reconstruction to recover the lost chunk.

(7) Target1, Target2, and Target4 perform the corresponding compute offload tasks.

Note that SDS4 can potentially ask Target4 to return the reconstructed data so it can be placed to somewhere else for permanent recovery of this data chunk, rather than be thrown away after the compute-in-storage task is down at the target side. This effectively enables the reconstruction to be an offload-able operation suited for compute-in-storage.

Figure 29:
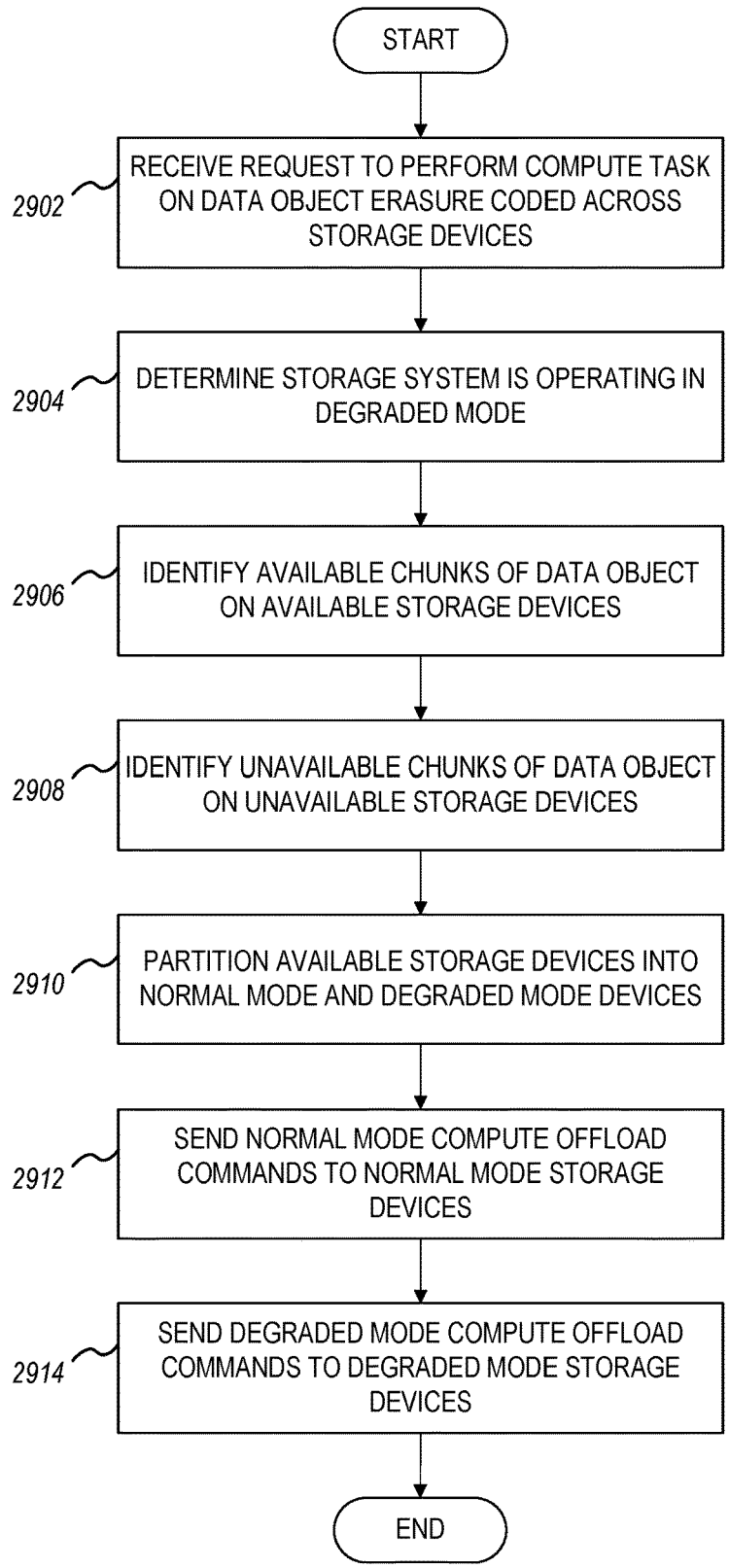
FIG. 29 illustrates a flowchart for performing compute tasks on data objects stored in an erasure-coded storage system.

FIG. 29 illustrates a flowchart 2900 for performing compute tasks on data objects stored in an erasure-coded storage system. In various embodiments, flowchart 2900 may be implemented using the embodiments and functionality described throughout this disclosure.

The flowchart begins at block 2902, where a request is received to perform a compute task on a data object stored on a storage system, wherein the data object is erasure coded across a plurality of storage devices in the storage system.

The flowchart then proceeds to block 2904, where it is determined that the storage system is operating in a degraded mode, wherein the degraded mode indicates that the plurality of storage devices comprises a set of available storage devices and a set of unavailable storage devices.

The flowchart then proceeds to block 2906 to identify a set of available chunks of the data object on the set of available storage devices.

The flowchart then proceeds to block 2908 to identify a set of unavailable chunks of the data object on the set of unavailable storage devices.

The flowchart then proceeds to block 2910 to partition the set of available storage devices into a set of normal mode storage devices and a set of degraded mode storage devices.

The flowchart then proceeds to block 2912 to send a first set of compute offload commands to the set of normal mode storage devices, wherein the first set of compute offload commands is to instruct the set of normal mode storage devices to perform the compute task on the set of available chunks.

The flowchart then proceeds to block 2914 to send a second set of compute offload commands to the set of degraded mode storage devices, wherein the second set of compute offload commands is to instruct the set of degraded mode storage devices to reconstruct the set of unavailable chunks and perform the compute task on a corresponding set of reconstructed chunks.

At this point, the flowchart may be complete. In some embodiments, however, the flowchart may restart and/or certain blocks may be repeated. For example, in some embodiments, the flowchart may restart at block 2902 to continue receiving and processing requests to perform compute tasks on data objects stored in the erasure-coded storage system.

Chained Operations with Pre-Allocation in Computational Block Storage

This section describes a mechanism for chaining multiple compute-in-storage operations together to enable more complex storage offloads, such as creation of a search index or bloom filter in-situ in a block storage target.

The technical problem is based on certain observations associated with prior block-based computational storage solutions. For example, there are currently only two ways to keep operations in-situ:

(1) Multiple round trips from the host, e.g., send a command, identify where the result landed, send an additional command to operate on that result, etc.

(2) Create a new compute offload that integrates the entire pipeline into one method. This is problematic as it may cause redundant development work that could otherwise have been trivially done by chaining existing functions together.

Based on these observations, a solution is proposed below that removes the need for multiple round-trips between the client and host, while enabling existing computational functions to be chained together simply and efficiently, using pre-allocation of circular buffers for storing large offload results.

No prior computational storage solutions address the problem solved by the solution presented below. For example, while there are various solutions at the object storage level (e.g., dynamic classes in Ceph and Swift Storelets), these object-based solutions require the use of heavyweight object interfaces, and they do not address the round-trip issues inherent in chaining results. Further, object interfaces, while simple, are inflexible and can be challenging to work with without requiring higher level coordination (e.g., from a client).

The basic idea behind this solution is to make use of temporary buffer space for storing an output that is then used as a subsequent input to another operation, all within the context of a block-based computational storage system. This solution uses pools of pre-allocated blocks to store results, or if a result is small enough, the result is simply kept in memory and handed to the next operation as a pointer. In this manner, compute-in-storage operations can be efficiently chained together to further improve performance.

In particular, this solution implements chained operations for compute-in-storage using virtual objects, compute descriptors, and pre-allocated output space for computational storage results.

A virtual object is a transient mapping of logical blocks, and a length, that describes an object. For example, the extent map of a file along with a file length is a virtual object describing the location and size of a file.

A compute descriptor contains at least one input virtual object (e.g., a block extent map and length for the input file) along with a method/function name, function arguments, and optional output virtual objects where the result of the method/function can be stored. These compute descriptors are interpreted by the block storage target, which completes the specified operations.

Moreover, in this solution, the compute descriptor is extended in order to chain operations together. For example, a pipeline of operations can be chained together into an operation chain or pipeline (e.g., filter a file, then compress the results). The solution allows multiple operations to be defined, which are then processed in order or sequentially. The output of the first operation will be the input to the second, and so on, until all operations are completed. The final output can potentially be returned directly to the host application if it is small, written to a specified block location (e.g., one of the virtual output objects), or written to one of the aforementioned pre-allocated buffer locations. If written to one of these pre-allocated locations, the LBA+offset+length will be returned to the host, so that the host can later retrieve the data.

In addition, a pool of buffers is created (e.g., on block storage) to store large intermediate results. The number of pools may equal the number of expected operations to be run in parallel. This removes the need for complicated inter-process communication and locks between operation chains that may be running at the same time. The logical block addresses (LBAs) of these storage buffers are tracked by the compute engine in the storage target. A simple mutex can track which buffers are or are not available for use.

The compute descriptor for a chained operation may include the following:

Virtual Object: <extent list> <object length>
Output: <extent OR pre-allocated OR best effort direct return>
  NOTE: best effort may still end up returning LBA location if it is too big to embed
Operation Chain: <operation 1>, <operation 2>, <operation 3> . . . .
Operation Args: <op1 args>, <op2 args> . . . .

Figure 30:
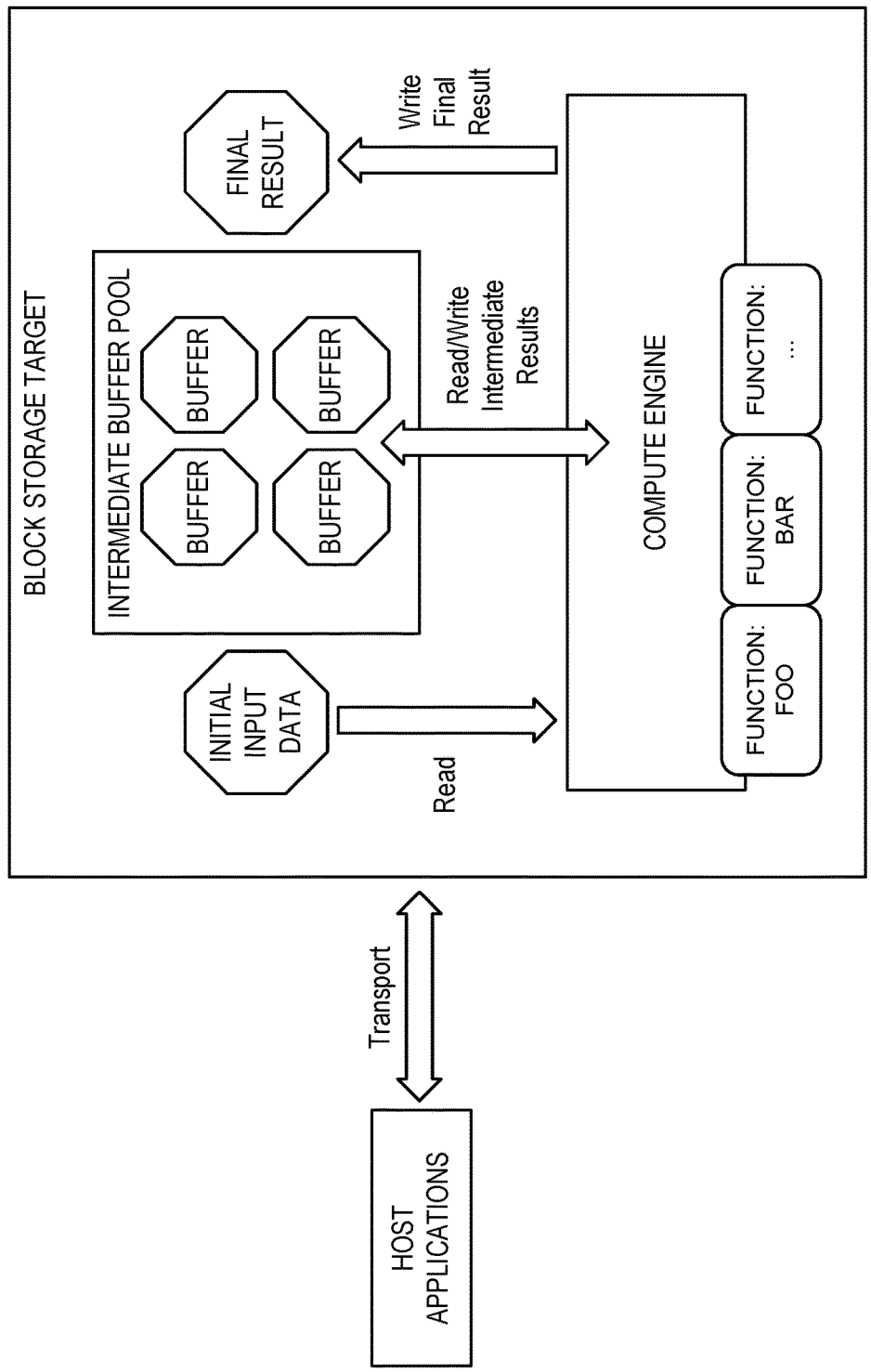
FIG. 30 illustrates an example of the overall architecture and data flow for chained compute-in-storage operations.

FIG. 30 illustrates an example of the overall architecture and data flow for chained compute-in-storage operations. In the illustrated example, a host application issues a request to the block storage target using a compute descriptor. The compute engine reads the initial input and runs the first specified operation. If the result is larger than a configurable high-water mark, it is stored in a buffer in the intermediate buffer pool, otherwise it can be directly handed to the next specified operation as input. Once all operations are complete, the result is either written final result location (which can be a pre-allocated buffer location) or returned directly to the host through the transport payload.

It should also be noted that any operation, even those that are not explicitly chained together, can make use of the intermediate buffer pool. For example, a recursive merge operation could store its intermediate results in the buffer pool.

As an example, consider a use case for in-situ bloom filter creation, which may involve creating a bloom filter for rapidly searching for tags or keywords in a large text file. The input would be a virtual object describing the location and length of the text file. The output would be a "best-fit" file from a pre-allocated buffer pool. The first operation is a simple word set identifier, which creates entries for any words it has not seen before. This set list is stored in an intermediate buffer, and subsequently used to create a new bloom filter. This bloom filter is then stored in a "best fit" pre-allocated file, with the location and length returned to the host. The host can then read and operate on the bloom filter at its leisure.

As another example, consider a use case for log-structured-merge (LSM) tree compaction. LSM trees are commonly used in key-value (KV) stores (e.g., LevelDB). In these KV stores, as data is inserted or deleted, it is noted in an in-memory append only log. As the log fills, it is periodically sorted and output to persistent storage (e.g., HDD, SSD, and so forth). These sorted logs are themselves periodically merged and compacted, for example, in a process that is roughly analogous to the traditional merge-sort algorithm.

Typically, this requires reading data out of the storage target and into the CPU-memory complex, followed by merging and promptly writing data back to the target, which is a full round trip for the data involved and may be over a contended network link. Even traditional compute-in-storage solutions may struggle given the multiple steps required for this operation. However, the chaining solution described above can make use of staging zones for the merge steps, thus simplifying the process and reducing memory overhead, as the computational storage target will no longer require everything to be maintained in memory for each step.

Figure 31:
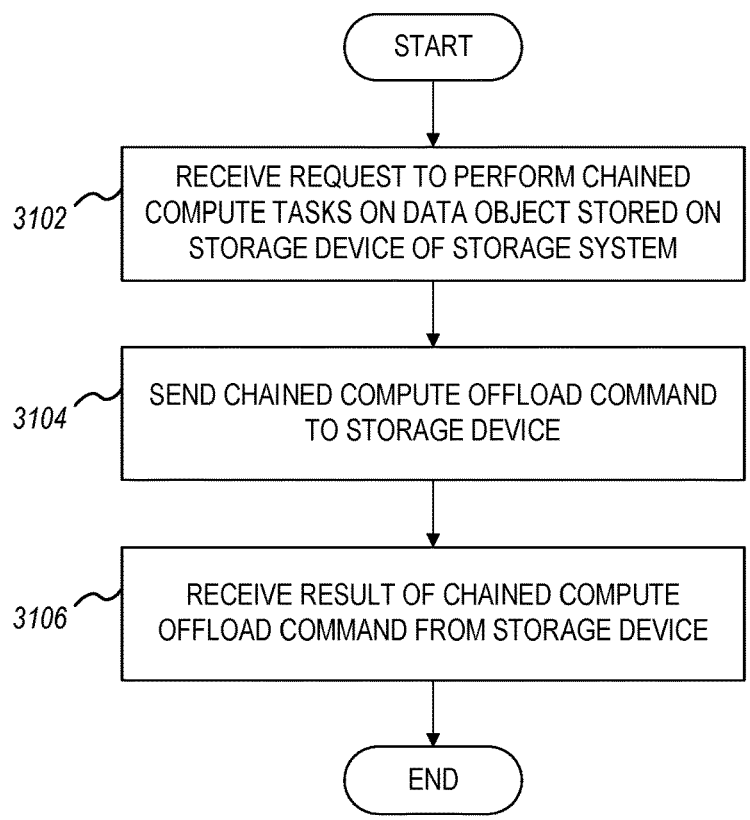
FIG. 31 illustrates a flowchart for performing chained compute tasks on data objects stored in a storage system.

FIG. 31 illustrates a flowchart 3100 for performing chained compute tasks on data objects stored in a storage system. In various embodiments, flowchart 3100 may be implemented using the embodiments and functionality described throughout this disclosure.

The flowchart begins at block 3102, where a request is received to perform a plurality of chained compute tasks on a data object stored on the storage system, wherein the data object is stored on a corresponding storage device of the storage system.

The flowchart then proceeds to block 3104 to send a chained compute offload command to the corresponding storage device, wherein the chained compute offload command is to instruct the corresponding storage device to perform the plurality of chained compute tasks on the data object.

The flowchart then proceeds to block 3106, where a result of the chained compute offload command is received from the corresponding storage device.

At this point, the flowchart may be complete. In some embodiments, however, the flowchart may restart and/or certain blocks may be repeated. For example, in some embodiments, the flowchart may restart at block 3102 to continue receiving and processing requests to perform chained compute tasks on data objects stored in the storage system.

Computational Storage for Visual Data and Analytics

This section presents a compute-in-storage solution for visual data and analytics, as well as other similar workloads. For example, the proposed solution generally applies to any workload with input files, output files, and some form of computation that maps the input to the output.

Rather than move data from storage to CPUs (e.g., where computation normally takes place), we want to move the computation to the data. In the past, the benefits of such "active storage" did not justify the costs. For example, conventional block-based storage was never quite fast enough to be significantly limited by I/O, as storage access time was the limiting factor. Today, however, we see the opposite—storage access times are fast, while the I/O path is slower in comparison.

Visual data (e.g., images, pictures, video) in particular is increasingly valuable with modern high-performance machine learning and data mining techniques. With this is mind, there are several points that motivate this solution to make compute-in-storage possible for visual data:

(1) "Striped" data, such erasure coded data that is spread across multiple targets, does not respect data element boundaries. For example, a keyframe from a video may straddle target boundaries, or a list of feature vectors describing images may have vectors that cross target boundaries. This either requires complex offset arithmetic and data coordination to handle, or fully centralizing the data before operating on it, which eliminates the benefits of compute-in-storage.

(2) Visual data consumes vast amounts of space. This leads to a challenge in that we generally want data "near" where it is used, but this means either wasteful replication/storage of copies of data on the machines that are processing it, or generating large amounts of network traffic to retrieve data that is stored efficiently, but off-machine on a separate storage target.

(3) Many visual data operations generate output that is significantly smaller than the input. For example, a feature vector describing an object in an image may only be a few kilobytes in length, or the desired processed image for input to a classification model (such as a neural network) may be much smaller than the original image.

(4) Even assuming compute-in-storage is feasible for a particular piece of visual data, often the result is still sufficiently large that simply using block-based compute-in-store protocols may be inefficient. The result may be too large to embed in a return, which requires expensive pre-allocation of space on the storage target to write the result.

Based on these observations, the proposed solutions reduce the need for expensive pre-allocation of data and provide a methodology for aligning data such that individual data elements do not cross target boundaries, removing the need for complex offset arithmetic.

No existing solutions provide the ability to efficiently offload visual operations to block storage. In general, current solutions are overly complex, and they ignore the issue of expensive pre-allocation of storage for writing results, thus failing to achieve the benefits of compute-in-storage for visual data.

The proposed solution involves two parts. First, we handle the pre-allocation problem by, at system start, pre-allocating a large circular buffer on the storage target for writing results, and/or pre-allocating a pool of files of varying sizes. This amortizes the cost of pre-allocation and hides it from the calling applications. Second, we outline a method for aligning data in a striped system, such that the data encoding remains largely unchanged, but removes the need for complex offset arithmetic and host-target coordination. We effectively adjust the location of data elements slightly by using padding to ensure individual elements do not cross target boundaries.

The proposed solution improves compute-in-storage for disaggregated storage platforms (e.g., Intel Data Management Platform) and visual analytics, thus improving overall performance and increasing the need for compute-in-storage hardware in existing computing ecosystems.

Below we also outline several use cases (e.g., image processing, classification, feature vector querying and extraction) and explain how they can be adapted to work with the proposed solution.

The proposed solution relies on operations that are based on a virtual object approach with compute descriptors, as described throughout this disclosure. A virtual object is simply a transient mapping that describes the location of a particular set of data, such as a file or object. In our case, this is an extent list describing logical block locations that can be interpreted by a block storage target or device. This mapping is a part of a compute descriptor which describes the input, output, operation, and arguments for the compute-in-storage function. The compute-in-storage target interprets these compute descriptors and acts based on the instructions contained within them.

To begin, we define the following terminology regarding distributed and/or block-based storage:

A striped object (e.g., a file) is made up of multiple chunks.
  These chunks are usually distributed across multiple machines for reliability and performance purposes.
  These chunks may be erasure coded (e.g., distributed with parity), although this is not required. Note, since this solution does not depend on the presence of parity data, such data is not included in the example figures for this solution.
Groups of chunks are organized into stripes.
  This logical arrangement allows the parity of erasure codes to be easily calculated, performing parallel reading, and so forth.
Blocks are linear groupings of data that span chunks across a full stripe
  If data does not fill up a block, it is padded.
  Blocks may vary in size, but this does not impact the solution as long as their sizes are known.
  Note, these "blocks" are distinct from the blocks presented on a block-based device like an SSD. Unless otherwise specified, the term "blocks" in the following discussion refers to the higher-level abstraction described here.
The portion of a block that resides inside of a chunk is a sub-block.

First, compute-in-storage needs to be simplified for striped environments. Replicated data is straightforward to operate on and is similar to working on purely local storage. However, erasure coded data requires an understanding of data element boundaries (see, e.g., FIG. 32), as described in other sections of this disclosure. These boundaries and how they are addressed varies on a method-by-method basis, but in naively striped environments they lead to complex problems for both the target and host. Targets must have enough intelligence to identify data elements, while the host must be able to reassemble arbitrary data elements from constituent pieces.

Figure 32:
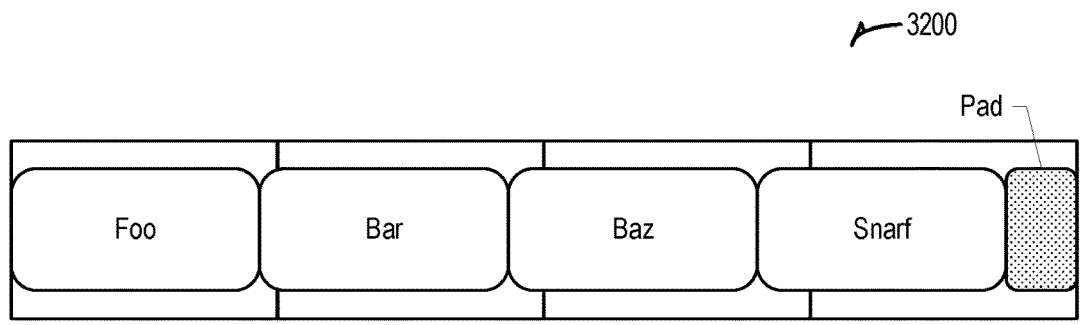
FIG. 32 illustrates an example of a striped object with multiple data elements that span across chunk or sub-block boundaries.

FIG. 32 illustrates an example of these challenges, where most data elements in a striped object cross boundaries even though they could each easily fit within a single chunk. For example, FIG. 32 illustrates an example of a striped object with multiple data elements that span across chunk or sub-block boundaries. In FIG. 32, only the first data element (e.g., "Foo") is fully contained within a single sub-block, while the remaining data elements span across chunk or sub-block boundaries and thus cannot be easily operated on within the target, and instead must be collated back at the host.

Figure 33:
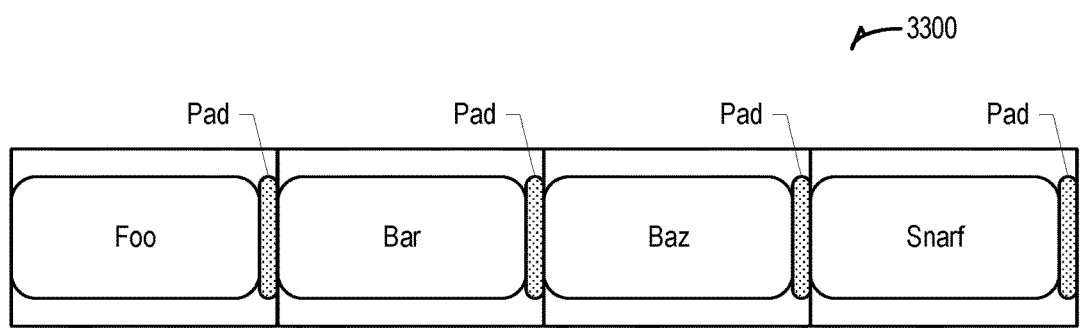
FIG. 33 illustrates an example of a striped object with multiple data elements that are aligned within chunk and sub-block boundaries using padding.

To handle this, the proposed solution provides a tool to re-arrange the data layout slightly using padding, such that individual data elements can cleanly reside within individual sub-blocks and chunks. In some cases, this may increase the storage overhead slightly, but it pays off by making many compute-in-storage operations much simpler, as they will require little to no coordination between the target and host. A simple example of this layout is illustrated in FIG. 33. For example, FIG. 33 illustrates an example of a striped object with multiple data elements that are aligned within sub-block and chunk boundaries using padding. In FIG. 33, the layout of the striped object includes padding that has been added to each data element in order to cleanly position the data elements within the sub-block and chunk boundaries. As a result, this massively reduces the complexity and coordination required between targets and host.

This reduced complexity for the compute-in-storage operations is handled by slightly changing the write path for compute-in-storage applications. The write path needs to be aware of the data layout of the target storage system, which is often trivially available or known out-of-band via fixed policies (e.g., the Minio system stores each object's data layout in a separate file collocated with each object chunk). The writing application also needs to be able to identify the boundaries and sizes of individual data elements, and these data elements must be smaller than the chunk and sub-block sizes. It then becomes a simple greedy bin packing exercise. If the data elements are larger than the sub-block size, then this approach will not work, as those data elements will span sub-block and chunk boundaries regardless.

The following pseudocode illustrates an example algorithm for aligning data elements using padding:
  //Assumes all Data Elements (DEs)<Sub-block Block Size (BS).
  For each data element:
    If DE datacount+current_subblock_data<subblock_maxsize:
      Append current element
      Adjust current subblock size
    Else:
      Store padding location (we deal with this later)
      Pad out remaining subblock data, create new sub-block/stripe as needed
      Append data element to new subblock and adjust subblock size
  After all data elements have been appended, fill out remaining subblocks/stripe with padding.

The padding information for each sub-block can be ignored if the host application and targets can identify boundaries natively. If not, this information can be stored either out of band (e.g., another file, database) or be appended to the end of the sub-block stream.

The read path of the host may need to be modified slightly if the application is not aware of the padding. This can be done by an alternate read path that is either able to recognize boundaries and padding and remove them, or that has out-of-band knowledge of the path, potentially stored in the write path (as noted above), such as appended to the file, stored in a separate database or metadata file, stored as part of extended filesystem metadata, and so forth.

Typical compute-in-storage operations on the target-side data should require no additional modifications beyond that required for enabling any operation, such as recognizing data elements.

Next, large results from block-based compute-in-storage operations need to be output in an efficient manner. For example, a challenge in block-based approaches is that while small results are easy enough to embed and return using existing transport protocols (e.g., iSCSI bidirectional commands, NVMeOF Fused commands), larger results must be written on the storage target and retrieved by the host. This requires that storage be allocated and zeroed from the host, adding an additional expensive operation that removes much of the advantage of compute-in-storage. If we try to naively use methods such as fallocate, a block mapping at the disk level will not exist until actual data (or zeroes) have been written to disk, which is primarily for security purposes.

To address this issue, we must pre-allocate some number of files on the host. We can then use these files, on-demand, as the output for a given compute-in-storage operation. In some cases, we may use one or more pre-allocated files as a circular buffer and direct the target to overwrite the buffer, as needed.

With respect to the pre-allocated file pool, after a compute-in-storage operation has written out to a pre-allocated file, the file on the host must be truncated to reflect the new file length. It is assumed that the target will return the length of the output file. For example, if a file is being compressed and the output is being directed to one of the pre-allocated output files, the target will return the length of the compressed file to the host. From there, the host can truncate the pre-allocated file to the correct size. Truncating the pre-allocated file requires that the host page cache first be flushed (e.g., by unmounting and remounting the filesystem) or updated with the last page of the truncated file (e.g., by reading the file from disk using a SCSI or NVMe pass-through command and updating the file on the host with a single write to the page cache). If the host page cache is not flushed or updated, stale data (e.g., data that was created during the pre-allocation and is still present in the host page cache) could be written back to disk. This would lead to corruption of the data that was output from the compute-in-storage operation on the target.

In some cases, rather than use pre-allocated output files, the host may choose to use a pre-allocated circular buffer on the target. Compute-in-storage targets only need to maintain a very small amount of state information: the current "end" of the circular buffer, its first address (start), and the total length of the buffer. In other words, 3 integers. As computations occur and results are written to the buffer, the target returns the offset and length for each result to the host, and then increments the current end-of-buffer pointer. If writing a result will overfill the buffer, the "end" pointer is moved to the beginning and old results are overwritten starting at the beginning of the space, and this will be noted in the return to the host. This does mean that care must be taken to provide sufficient buffer space that allows for results to be read by the host before being overwritten, however this will be up to the host's policy. This basic concept is illustrated in FIG. 34.

Figure 34:
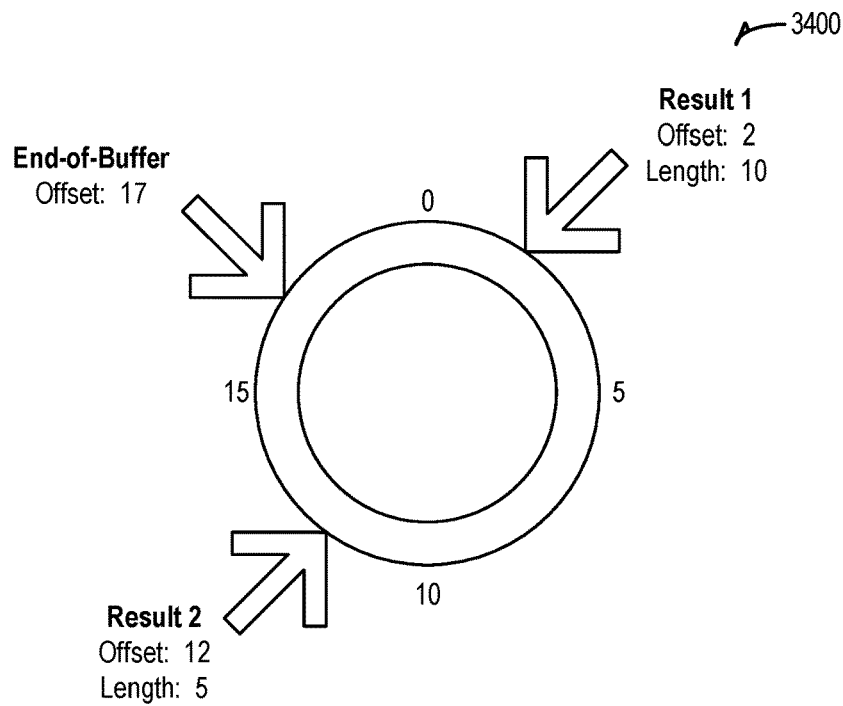
FIG. 34 illustrates an example of a pre-allocated circular buffer.

FIG. 34 illustrates a simple example of a pre-allocated circular buffer in use. It acts as a typical circular buffer, though the only state maintained on the target side is the start of the buffer, length, and current endpoint. As writes continue, it will wrap around the space.

Several use cases for processing visual data using the proposed solution are presented below. While the proposed solution is used for these use cases, it should be noted that this list of use cases is not exhaustive, as the proposed solution may be used for many other use cases as well (visual and non-visual).

To begin, a brief overview is provided for the compute-in-storage framework described throughout this disclosure. In particular, the compute-in-storage framework relies on the concept of a virtual object. A virtual object is simply a transient mapping that describes the location of a particular set of data, such as a file or object. In our case, this is an extent list describing logical block locations that can be interpreted by a block storage target or device. This mapping is a part of a compute descriptor which describes the input, output, operation, and arguments for the compute-in-storage function. The compute-in-storage target interprets these compute descriptors and acts based on the instructions contained within them. The result is either returned over the transport (e.g., iSCSI, NVMeOF, and so forth) or written to a location on the storage target. This location can be detailed in the descriptor, or if we are using the circular buffer or pre-allocated file method, it can be returned as an address and offset to the host, and subsequently used for reading and operating on.

Image preprocessing is one example use case. For example, a common operation for visual data pipelines involves the transformation of images. This includes operations such as resize and cropping. While these tend to result in a smaller data foot print for the final image, their sizes can still be non-trivial and may not fit into the return. Further, when batches of images are stored together in striped environments, they may straddle sub-block boundaries in the manner described above.

Writing batches of images into striped storage with the proposed solution is straightforward: if one or more images are less than or equal to a sub block size, we simply naïvely apply the method detailed earlier to avoid images crossing sub-block boundaries.

The compute descriptor input will require image sizes and offsets, or delimiters, to distinguish individual image boundaries. In this manner, the operation can then be performed using common of the shelf tools (e.g., OpenCV).

Very small results can be embedded directly into the return payload of the transport (e.g., iSCSI, NVMeOF, and so forth). Large results can be written to the pre-allocated space described earlier. Without those methodologies, the image would have to be returned in full to the host, significantly degrading efficiency.

Image classification is another example use case. For example, image classification involves running an image through a trained machine learning model to identify what is in the image (e.g., a cat or dog). The same basic layout requirements noted above for image processing also apply here (in fact, the result of image processing may be a precursor for classification in some cases). The compute descriptor describes the data boundaries of the image or how to identify them, and the result may either be written into the target location, or directly returned as a payload.

Feature vector extraction is another example use case. Feature vector extraction involves analyzing an image to extract characteristics of the image or objects within the image. The extraction of feature vectors can be done by a wide range of techniques, from hand-picked characteristics of the image (such as histogram of color intensity), to more complex extraction using an intermediate layer of a convolutional neural network. In any case, the result is a vector of floating-point numbers describing the elements of interest that make a particular visual object differentiable from the rest. The size (in bytes) of the extracted feature vector is typically fixed and orders of magnitude smaller than the input image, so it is less likely that extra mechanisms will be needed for returning the result. However, if the use case requires feature extraction to be performed over a large number of images, the circular buffer technique described above can be used, with the simplification that, since all feature vectors are of equal size, there is no need to compute offsets.

Like image preprocessing, without the ability to store an image within a single sub-block, the process would require centralization (e.g., reading multiple sub-blocks) on the host, eliminating most of the benefit of the compute-in-storage. The read and write requirements are the same as image processing, as is the compute descriptor: it will require either offsets delineating individual images or defined delimiters.

Feature vector querying is another example use case. For example, a common operation is searching an existing database or table of feature vectors to identify which vectors are "similar" that can then be used to target specific images. Similar to the image processing example, feature vectors stored in a batch can be aligned within shards to ease complexity and eliminate most of the need for complex host and target coordination. All feature vectors corresponding to a multidimensional search space are of equal size, which makes it much easier than the case of images described above (where the size of file depends on the content of the image), and the boundaries of each of the feature vectors can be determined statically.

The result of this operation is usually just a set of 2-tuples <distance, id>, corresponding to the k-closest elements with respect to the input feature vector. If the number of the requested results ("k") is small, they can be directly returned to the host. If "k" is larger, the pre-allocated buffer offset and length can be returned, and the host can do regular reads to retrieve the result, with the simplification that offsets are fixed given that that each pair is of a fixed size.

Figure 35:
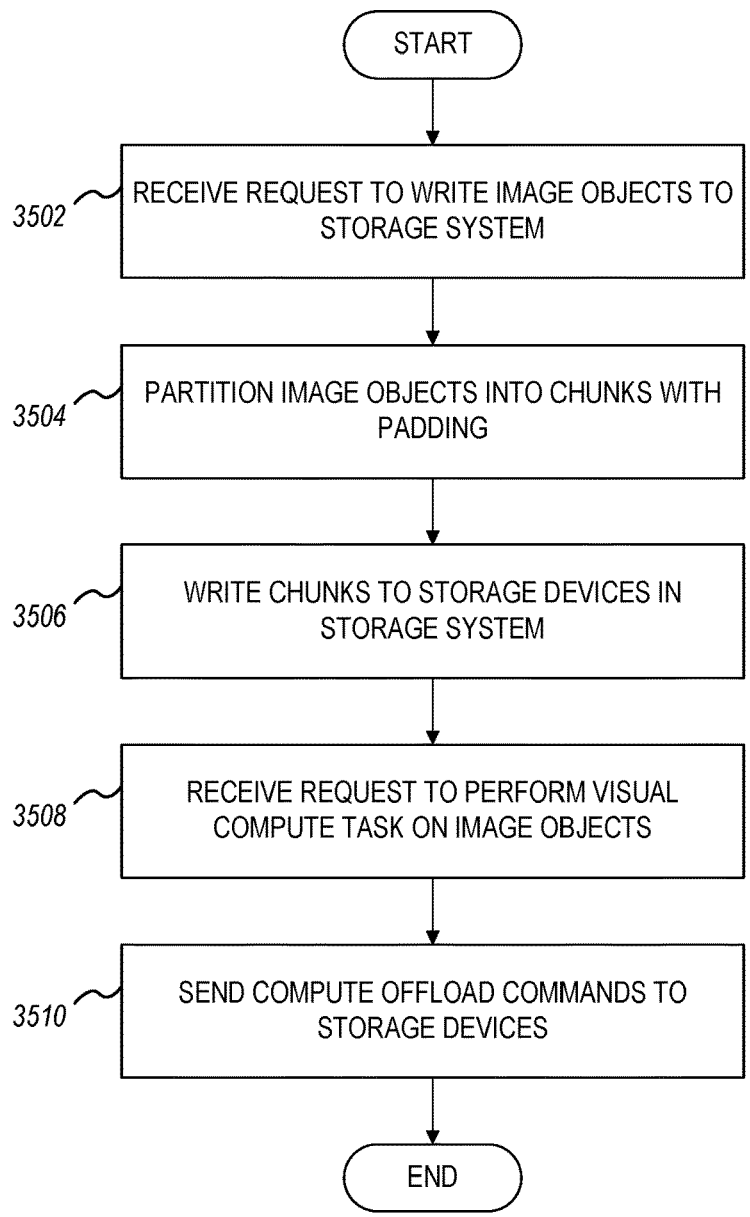
FIG. 35 illustrates a flowchart for performing visual compute tasks on image objects stored in a storage system.

FIG. 35 illustrates a flowchart 3500 for performing visual compute tasks on image objects stored in a storage system. In various embodiments, flowchart 3500 may be implemented using the embodiments and functionality described throughout this disclosure.

The flowchart begins at block 3502, where a request is received to write a set of image objects to a storage system.

The flowchart then proceeds to block 3504 to partition the set of image objects into a plurality of chunks, wherein each chunk of the plurality of chunks comprises one or more image objects from the set of image objects, and wherein the plurality of chunks is padded such that each image object from the set of image objects is aligned within boundaries of a corresponding chunk of the plurality of chunks.

The flowchart then proceeds to block 3506 to write the plurality of chunks to the storage system, wherein each chunk is to be written to a corresponding storage device of the plurality of storage devices.

The flowchart then proceeds to block 3508, where a request is received to perform a visual compute task on the set of image objects.

The flowchart then proceeds to block 3510 to send a plurality of compute offload commands to the plurality of storage devices, wherein each compute offload command is to instruct a corresponding storage device to perform the visual compute task on a corresponding subset of image objects from the set of image objects, wherein the corresponding subset of image objects is stored on the corresponding storage device.

At this point, the flowchart may be complete. In some embodiments, however, the flowchart may restart and/or certain blocks may be repeated. For example, in some embodiments, the flowchart may restart at block 3502 to continue receiving and processing requests to write image objects to storage and perform visual compute tasks on the image objects.

Ageing Data in Disaggregated Storage Environments Using Compute-In-Storage

This section presents a solution for ageing data in disaggregated storage environments using compute-in-storage.

The ever-increasing amount of data that is being stored from Internet-of-Things (IoT) sensors, audio/video devices, and a myriad of Internet applications, puts pressure on the available storage capacity. Typically, the value of data (and correspondingly accesses to it) diminishes after some application-dependent period of time, which has led to strategies to "age" data so as to reduce its storage footprint. Numerous approaches to ageing are employed. Aged data can be compressed in-place or the encoding scheme might be modified to one which reduces the data footprint. Another approach stems from the durability and availability guarantees that storage systems offer wherein multiple replicas of individual data items are stored. Ageing replicated data can be done by Erasure coding the data (more compute needed to encode/decode, but much smaller storage footprint). Finally, aged data might be moved to cheaper/slower storage tiers (like SSD to HDD), either as is or by compressing the data before pushing to the cheaper tier. The over-arching goal of all these approaches is to reduce the storage cost.

An unrelated trend is that of storage disaggregation, where storage devices are provisioned in blades with minimal processing capability and minimal hardware resources. The storage media on the blade is exposed as block devices to a filesystem running on a separate server. This allows independent scaling of storage capacity without underutilizing (or overpaying for) the other hardware resources if full blown servers were housing the storage devices.

Compute-in-storage is an emerging technology that has wide applicability. The solution in this section addresses the need for a new compute-in-storage mechanism for efficiently "ageing" data (e.g., compressing, tiering) in the context of disaggregated storage systems (e.g., iSCSI, NVMeOF), such as rack scale designs where host servers and storage servers are physically separated via a storage fabric.

Ageing data requires reading stored data, transforming it in some way (e.g., compressing) and storing it back. When storage is disaggregated, data needs to be read from the storage blade to the server where the OS and filesystem run. Reading large amounts of old data consumes a significant amount of network bandwidth. For example, existing solutions require transferring data from the storage blade to another server where the data is transformed, and then writing it out once again over a network to its final location. The T-10 standards define the 'XCopy' mechanism, which enables data to be transferred directly from one location (like storage blade) to another. However, no operations to transform the data can be performed with XCopy. Thus, existing solutions consume significant network bandwidth, both for transferring the original data and for writing the transformed data back to the storage layer.

Accordingly, a compute-in-storage solution is proposed to enable the ageing of data on storage blades without having to read all the data onto the servers running the filesystem and/or applications. For example, the proposed solution sends a command in order to age the specified data instead of transferring data back and forth. Since the command is much smaller than the data, costly data transfers are avoided. The command describes the operation and the list of blocks on which the operation is to be performed. This approach allows ageing to be performed at the block layer without the need for a filesystem or other storage stacks (e.g., object storage systems) to be running on the storage target.

The proposed solution provides numerous advantages. For example, the proposed solution enables operations to be performed in a storage blade at the block layer directly without the need for a filesystem or other storage stacks (e.g., object storage stacks). Consequently, the required processing capability on the storage blade is reduced. This translates to a total cost of ownership (TCO) reduction via a more efficient overall system wherein ageing operations can be performed in-situ.

The proposed solution also eliminates the need for transferring large amounts of data within the network just for ageing. Reducing the network bandwidth consumption for "background" storage operations in turn reduces the perturbations seen for active "foreground" storage operations. Further, while operators currently have to provision a separate cluster network for such background traffic (which adds to overall cost of a deployment), that is no longer necessary under the proposed solution.

Moreover, the proposed solution enables the use of more sophisticated ageing transformations that can be application specific. For example, data may initially be stored raw (e.g., for quick access by applications), but once it has aged, the data may be encoded to reduce its footprint. As another example, a video application could add metadata to identify frames that are not relevant to the application, such as when the video has minimal or no change for some time interval, which is a common occurrence in surveillance camera footage or between active plays in a sports recording, among other examples. This metadata can be used on the storage blade during ageing to cut out irrelevant frames entirely, thus saving significant storage capacity.

Figure 36:
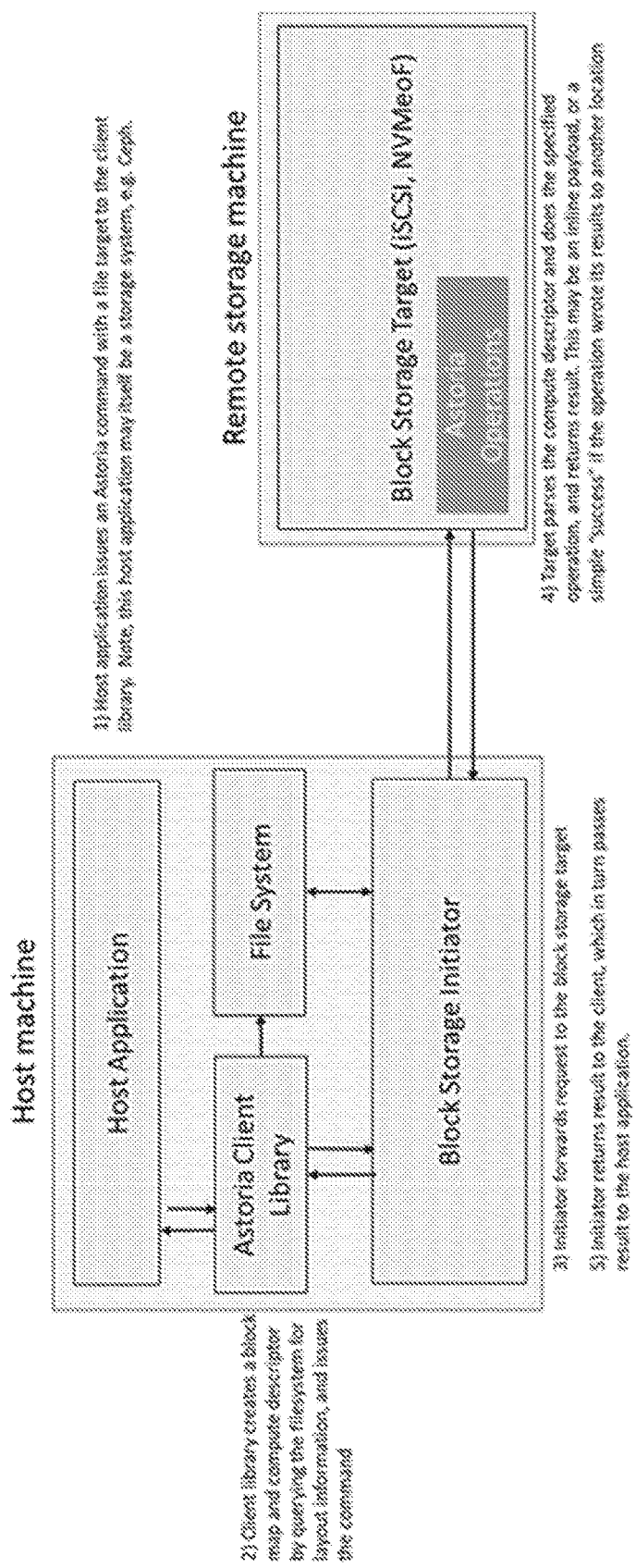
FIG. 36 illustrates an example computing architecture for ageing data using compute-in-storage.

FIG. 36 illustrates an example computing architecture for ageing data using compute-in-storage. In particular, FIG. 36 shows the different system components (e.g., the system stacks on the host and storage target machines) and the tasks performed by each component to accomplish an ageing operation.

An ageing operation generally involves transforming data and placing it at the appropriate location in the storage system. The proposed solution avoids transferring the data out of the block storage target for the ageing transformation, and instead sends a command to the storage target with the appropriate information so the ageing steps can be performed by the storage target itself.

The command specifies the list of blocks on which the ageing transform operation should be performed. The basic flow of such a command is described further throughout other sections of this disclosure. Effectively, the client works with the host to create a compute descriptor, which describes the block locations of a file or object, along with an operation to run. However, instead of returning a result of an operation, for ageing, we transform the data on the target side and return metadata describing the new data locations or lengths.

Several different approaches and embodiments for ageing and migrating data using compute-in-storage are presented below, including:

(1) ageing data to pre-allocated locations on the same target;
(2) in-place data ageing on the same target;
(3) ageing data to pre-allocated locations on a different target;

(4) ageing replicated data to erasure coded data; and (5) ageing data to $3^{rd}$ party storage services.

Figure 37:
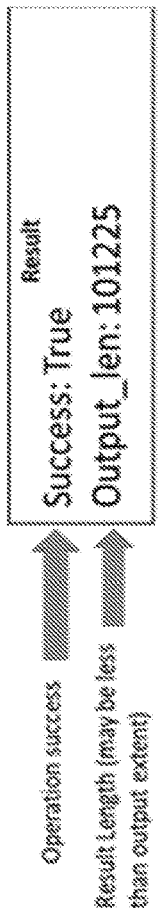
FIG. 37 illustrates an example compute descriptor for compressing and placing data in a new location.
Figure 37:
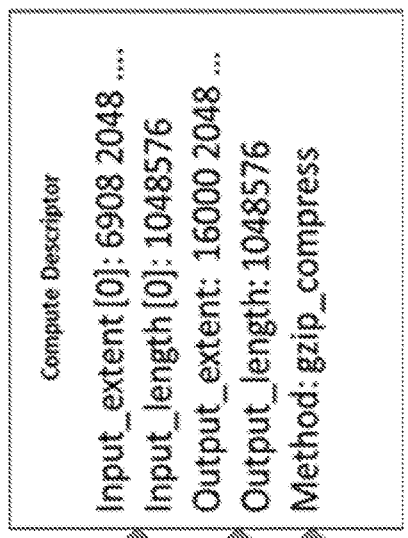

Ageing data to pre-allocated locations on the same target: The simplest approach involves using a pre-allocated location on the same storage target where transformed data is to be written. For example, a compression operation reads in data specified in the compute-descriptor, and writes the compressed data to the target location, which is also specified in the compute descriptor. A success/failure and a data length is returned to the host/client, letting them know the length of the compressed data in the specified location, which can subsequently be read when convenient. Similarly, the old uncompressed data can be discarded when the host decides to do so. An example of a compute descriptor that uses this approach is shown in FIG. 37. In particular, FIG. 37 illustrates an example compute descriptor for compressing and placing data in a new location in the manner described above.

Care must be taken when pre-allocating a file. In particular, the file must be "synced" on the host prior to issuing the compute-in-storage operation. If the file is not synced, the pre-allocated blocks will not have a valid block mapping.

In-place data ageing on the same target: Another approach involves compressing and writing the file "in-place," such as by truncating and overwriting the original file with the compressed one. Truncating the file requires that the host page cache first be flushed (e.g., by unmounting and remounting the filesystem) or updated with the last page of the truncated file (e.g., by reading the file from disk using an SCSI or NVMe pass-through command and updating the file on the host with a single write to the page cache). It is noted that the standard commands to 'drop cache' are advisory and the filesystem might choose to ignore them. If the host page cache is not flushed or updated, stale data (e.g., data created during the pre-allocation stage that is still present in the host page cache) could be written back to disk. This would lead to corruption of the data that was the output from the compute-in-storage operation on the target. Accordingly, the proposed solution may implement various mechanisms to ensure that stale data is not written out to storage.

Ageing data to pre-allocated locations on a different target: In this approach, the ageing operation involves not just compressing the data, but also moving the compressed data to another target. The most general scenario is when the final target is also separated by a fabric. Consequently, the ageing command requires information about the destination location in addition to the blocks in that destination namespace.

Figure 38:
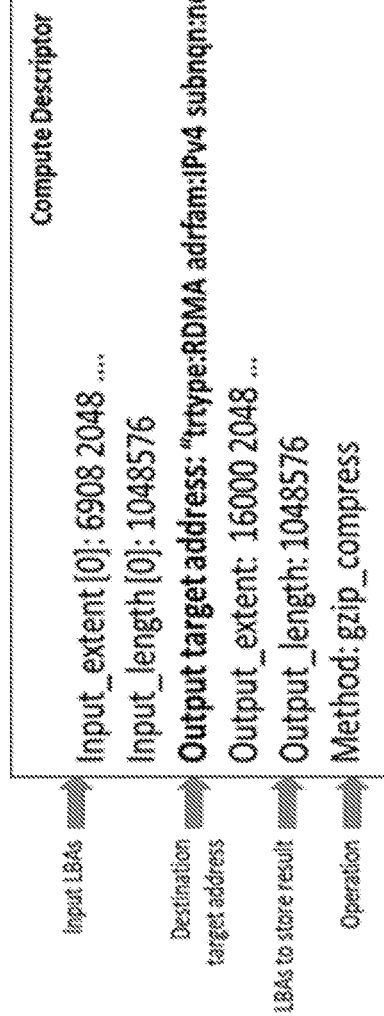
FIG. 38 illustrates an example compute descriptor for ageing data to a pre-allocated location on a different target machine.

An example of such a command is shown in FIG. 38. In particular, FIG. 38 illustrates an example compute descriptor for ageing data to a pre-allocated location on a different target machine. The input extent and length indicate the source blocks of the data to age. The output target address identifies the target machine where the aged data must be placed. The output extent and length provide information about the blocks on the target machine where the data is to be stored. The method field indicates that the data should be gzip compressed before being sent to the target.

Figure 39:
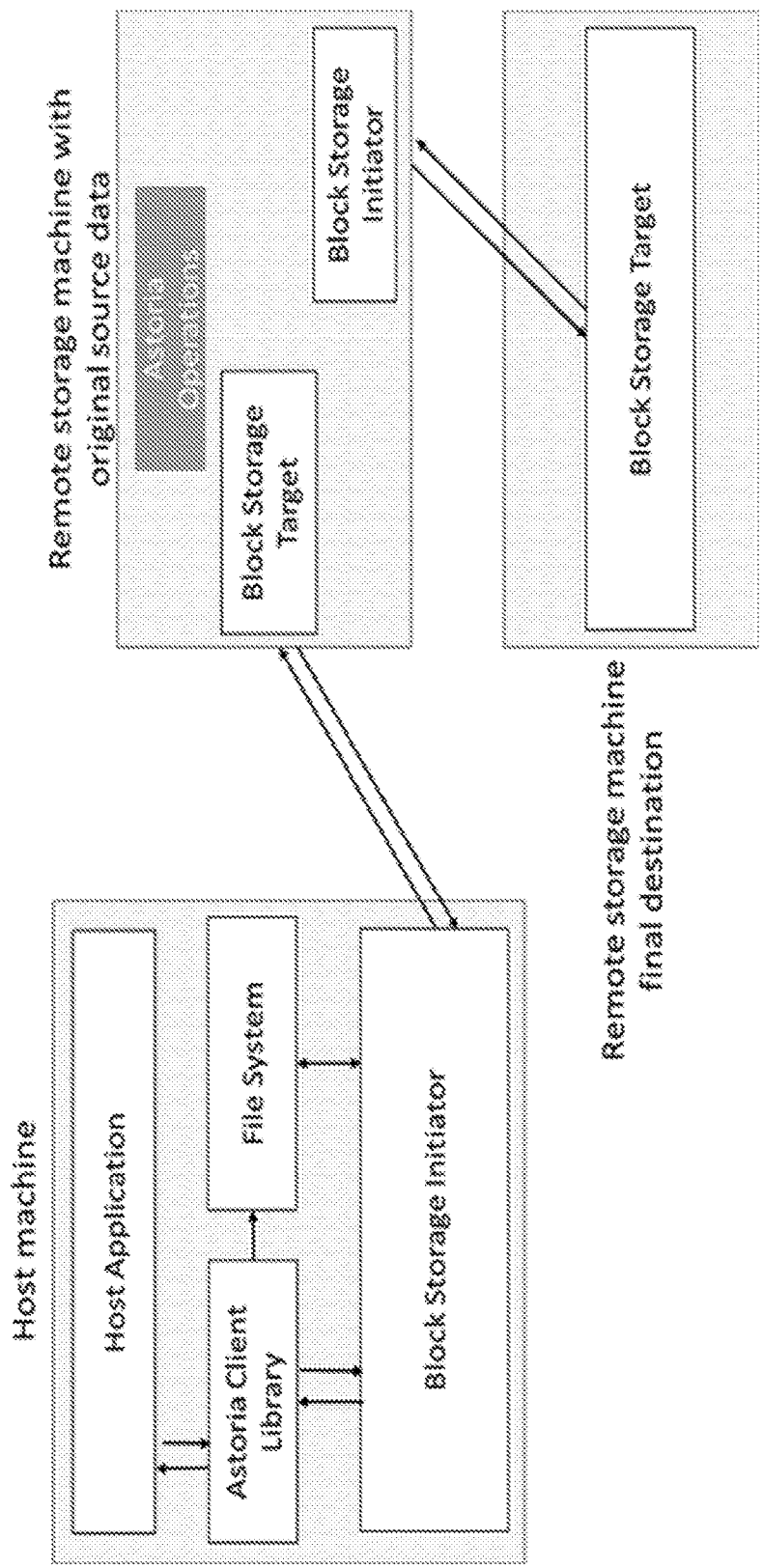
FIG. 39 illustrates an example computing architecture for ageing data to a different target using compute-in-storage.

FIG. 39 illustrates an example computing architecture for ageing data to a different target using compute-in-storage. In FIG. 39, the storage target that receives the compute descriptor needs to not only read the data and perform the ageing operation, but also invoke a block storage initiator using the output information in the compute descriptor.

Ageing replicated data to erasure coded data: In this approach, replicated data is aged by converting it to erasure coded data. For example, data is often replicated for durability, as well as high availability and for providing better throughput for storage requests to the data. However, replication also increases the storage footprint. As the data ages and its value diminishes, one approach to reducing the storage footprint is to erasure code the data. Current approaches to ageing in this manner would require reading one of the data copies to a host, performing erasure coding on the data, and then finally writing out the erasure coded chunks.

Figure 40:
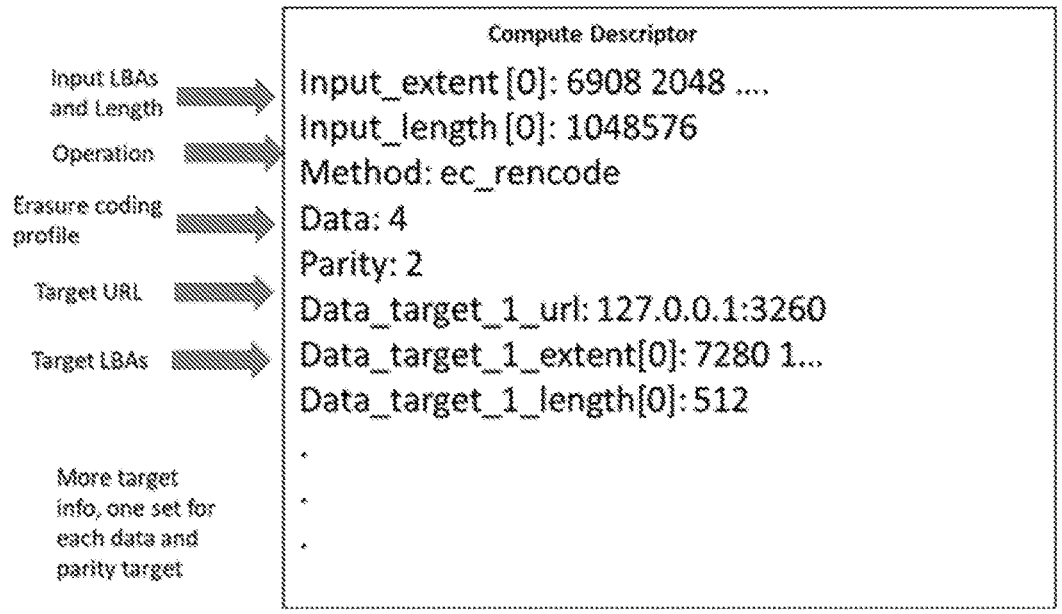
FIG. 40 illustrates an example compute descriptor for converting replicated data to erasure coded data.

In the proposed solution, however, ageing replicated data into erasure coded data can be performed in-situ using compute-in-storage. An example compute-in-store ageing command for performing such an operation is shown in FIG. 40. In particular, FIG. 40 illustrates an example compute descriptor for converting replicated data to erasure coded data using the proposed solution. The compute descriptor provides the erasure code (EC) profile information, such as the number of data and parity chunks. Further, the descriptor includes information on the storage targets where the various erasure coded chunks are to be placed. When a success response is received for the operation, the client application can update the metadata to indicate that the data has been aged and is now erasure coded with the chunks placed at the targets specified in the compute descriptor. Finally, the client application can send commands to delete the original replicas of the data so as to free up the storage space.

Figure 41:
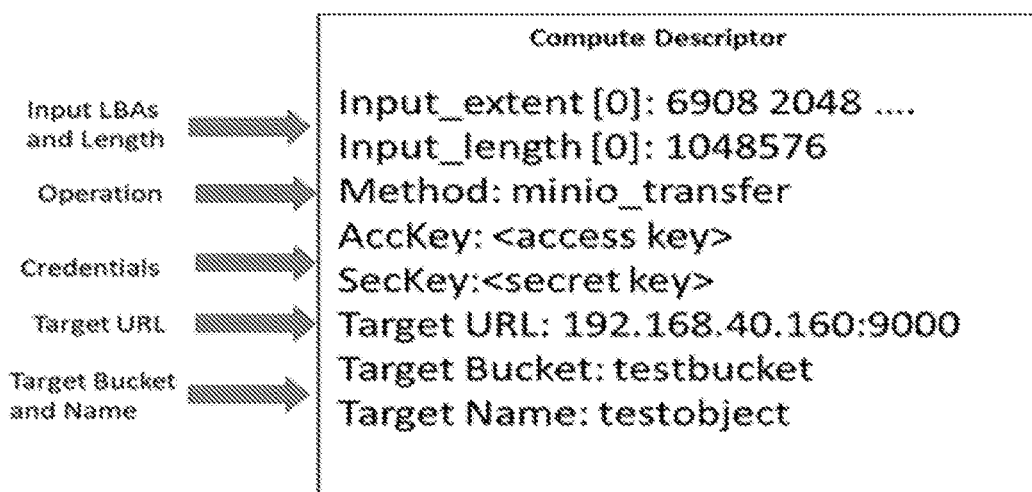
FIG. 41 illustrates an example compute descriptor for ageing data to a 3$^{rd}$ party storage service.

Ageing data to $3^{rd}$ party storage services: Another possible approach is to age data to a separate storage service (e.g., Ceph, Swift, Minio, and so forth) that is potentially managed by a separate provider. Such an ageing operation would require endpoint information, as well as credentials for the $3^{rd}$ party storage service. For example, FIG. 41 illustrates an example compute descriptor for ageing data to a $3^{rd}$ party storage service. In this example, the compute descriptor identifies the data to be aged and further specifies that the data is to be transferred to a Minio storage service.

Figure 42:
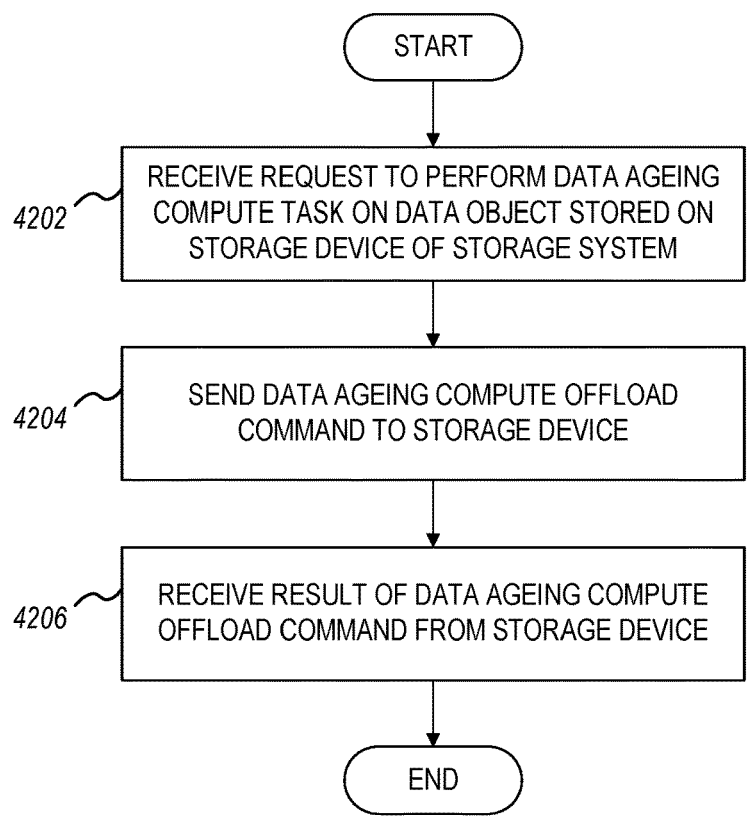
FIG. 42 illustrates a flowchart for performing data ageing compute tasks on data objects stored in the storage system.

FIG. 42 illustrates a flowchart 4200 for performing data ageing compute tasks on data objects stored in the storage system. In various embodiments, flowchart 4200 may be implemented using the embodiments and functionality described throughout this disclosure.

The flowchart begins at block 4202, where a request is received to perform a data ageing compute task on a data object stored on the storage system, wherein the data object is stored on a corresponding storage device of the storage system.

The flowchart then proceeds to block 4204 to send a data ageing compute offload command to the corresponding storage device, wherein the data ageing compute offload command is to instruct the corresponding storage device to perform the data ageing compute task on the data object.

The flowchart then proceeds to block 4206, where a result of the data ageing compute offload command is received from the corresponding storage device.

At this point, the flowchart may be complete. In some embodiments, however, the flowchart may restart and/or certain blocks may be repeated. For example, in some embodiments, the flowchart may restart at block 4202 to continue receiving and processing requests to perform data ageing compute tasks on data objects stored in the storage system.

Hint-Based Lifetime Prediction for NAND Storage

This section presents a solution that provides hint-based lifetime prediction for NAND storage.

NAND performance is very sensitive to how data is allocated within the device. Unlike a conventional hard disk drive, NAND devices remap host writes to available pages within the device. These pages are organized into larger erase blocks. When data is overwritten, the old pages within an erase block must be invalidated and later garbage-collected, thereby making the pages available for new data. In doing this, any data that has not yet been overwritten in that erase block must be relocated to another erase block on the same drive.

Because data relocation is expensive, it is desirable that all pages within an erase block have the same lifetime (e.g., they get deleted or overwritten by the host at about the same time). As such, there would be no need to relocate any of the data, and an entire erase block could be efficiently reclaimed and made available for new data.

In many cases, however, the lifetime of data is not known, which makes efficient garbage collection within the drive difficult.

Previous solutions rely on the operating system to send "hints" to the solid-state drive (SSD). In all cases, this requires that the application be modified to provide those hints. The largest disadvantage of the application-based hinting approach is that the application must have some awareness of the lifetime of its data. In many cases, the application developers simply do not know the lifetime of the data. In addition, not all data is created by applications. Some data, such as filesystem metadata, will also have an associated lifetime that would be useful to know for purposes of NAND storage management.

Accordingly, this section proposes a solution by which data lifetime can be predicted and used when allocating pages in NAND storage. Pages that are predicted to have the same lifetime will be allocated to the same erase block.

This solution relies on I/O classification, whereby applications and filesystems inform the block storage system of "classes" of data. These classes can include a variety of information, such as the type of data, the process reading/writing the data, the intended data usage, and so forth. Using these "features," we can train a machine learning model to learn and predict the lifetime. For example, we may discover that all data classified as "metadata" is short-lived and data classified as "archive" is long-lived.

The core of this solution involves two key aspects. First, we provide a mechanism by which applications can communicate classification information to the operating and/or storage system(s). Second, once that classification is in place, we exploit a classification and regression tree model (CART) to make the actual predictions. It should be noted that the mechanism for classifying data relies on "compute-in-storage," in which a computational storage library is used by applications to communicate arbitrary classification information to the storage system.

There are numerous advantages provided by this solution. First, using compute-in-storage does not require major changes to the operating system (which is not the case with other hinting approaches that rely on kernel patches). Second, lifetime predictions are useful in increasing the performance of SSDs and/or any other type of NAND-based storage.

The proposed solution includes a computer system containing at least one NAND storage device and one Optane device serving as a cache for the NAND device. Intel's Cache Acceleration Software (CAS) can be used to manage the cache device, and it is also a source for the I/O-related feature vector inputs to the machine learning (ML) algorithm. For example, a special API (e.g., a compute-in-storage API) is used to send classification information to the CAS, and a machine learning (ML) algorithm is used to parse I/O trace data that the CAS produces. Moreover, this ML algorithm will be trained to predict data lifetime.

Examples of the I/O feature vectors used by the machine learning algorithm are provided below in TABLE 1.

TABLE 1

I/O Feature Vectors

| NAME | DESCRIPTION |
| --- | --- |
| Timestamp | Time at which trace event was generated |
| Operation | Read, Write, Discard (Trim) |
| LBA | Logical block address of starting block |
| nBlocks | Number of blocks to be operated on |
| Class | Differentiates metadata from data |
| Inode number | Identifies file; can be used to identify different extents belonging to same file |
| Process Name | Name of process triggering operation |
| Data Signature | File-type signature detected in $1^{st}$ data block |

The proposed solution also periodically captures a small set of SSD counters that are also provided as input feature vectors to the ML algorithm. These counters are read by using NVMe GetLog admin command. Examples of the SSD feature vectors used by the machine learning algorithm are provided below in TABLE 2.

TABLE 2

SSD Feature Vectors

| NAME | DESCRIPTION |
| --- | --- |
| Host Writes | Number of NAND writes generated by host requests |
| NAND Writes | All NAND writes (including host writes and writes due to background operations) |
| Wear Level | The minimum, maximum, and average times erase blocks have been erased |

Applications can provide additional feature vectors as input to the ML algorithm to help with lifetime determination. Applications use a special API (e.g., compute-in-storage API) to pass these feature vectors to the CAS software. Examples of the application feature vectors used by the machine learning algorithm are provided below in TABLE 3.

TABLE 3

Application Feature Vectors

| NAME | DESCRIPTION |
| --- | --- |
| Process Name | Name of application |
| Process Write Path | Identifies unique write path if application contains multiple write paths |
| File Name | Name of file |
| File Type | Type of file |
| Inode Number | Allows application features to be matched to I/O features |

Figure 43:
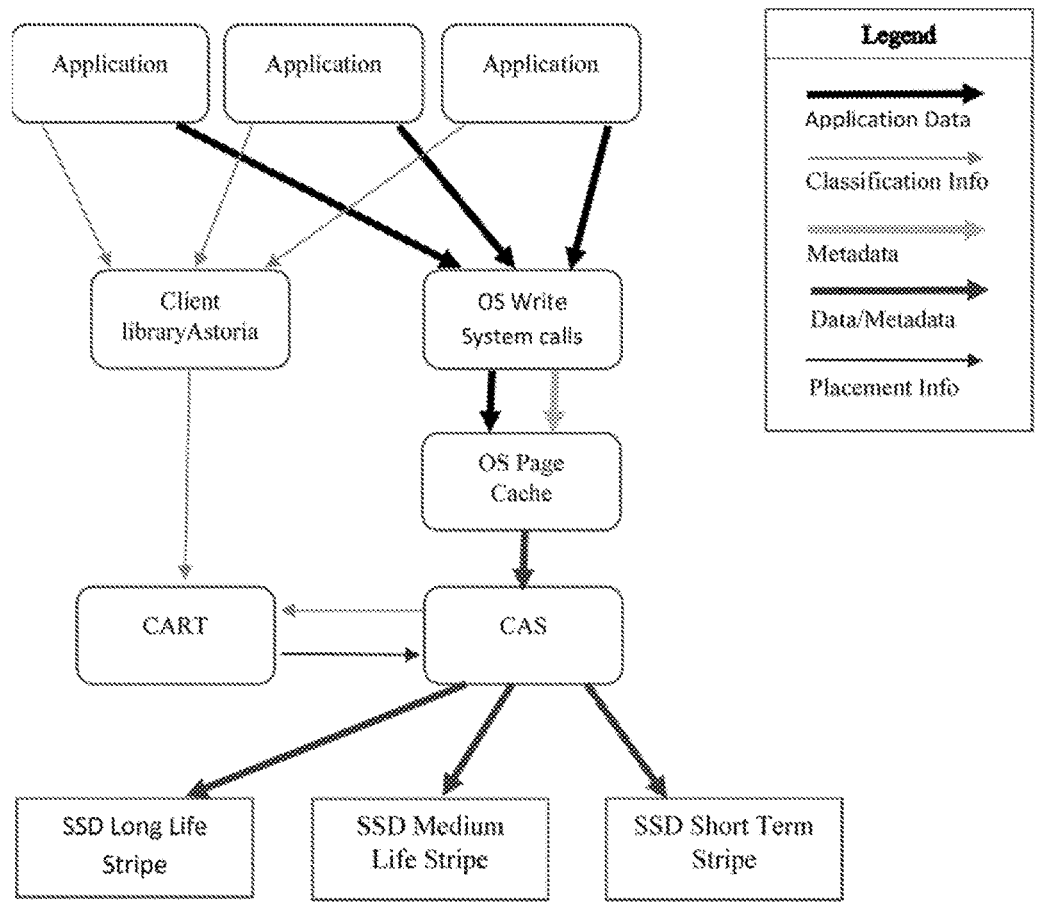
FIG. 43 illustrates an example of the architecture and dataflows for hint-based lifetime prediction for NAND storage.

FIG. 43 illustrates an example of the architecture and dataflows for hint-based lifetime prediction for NAND storage.

Figure 44:
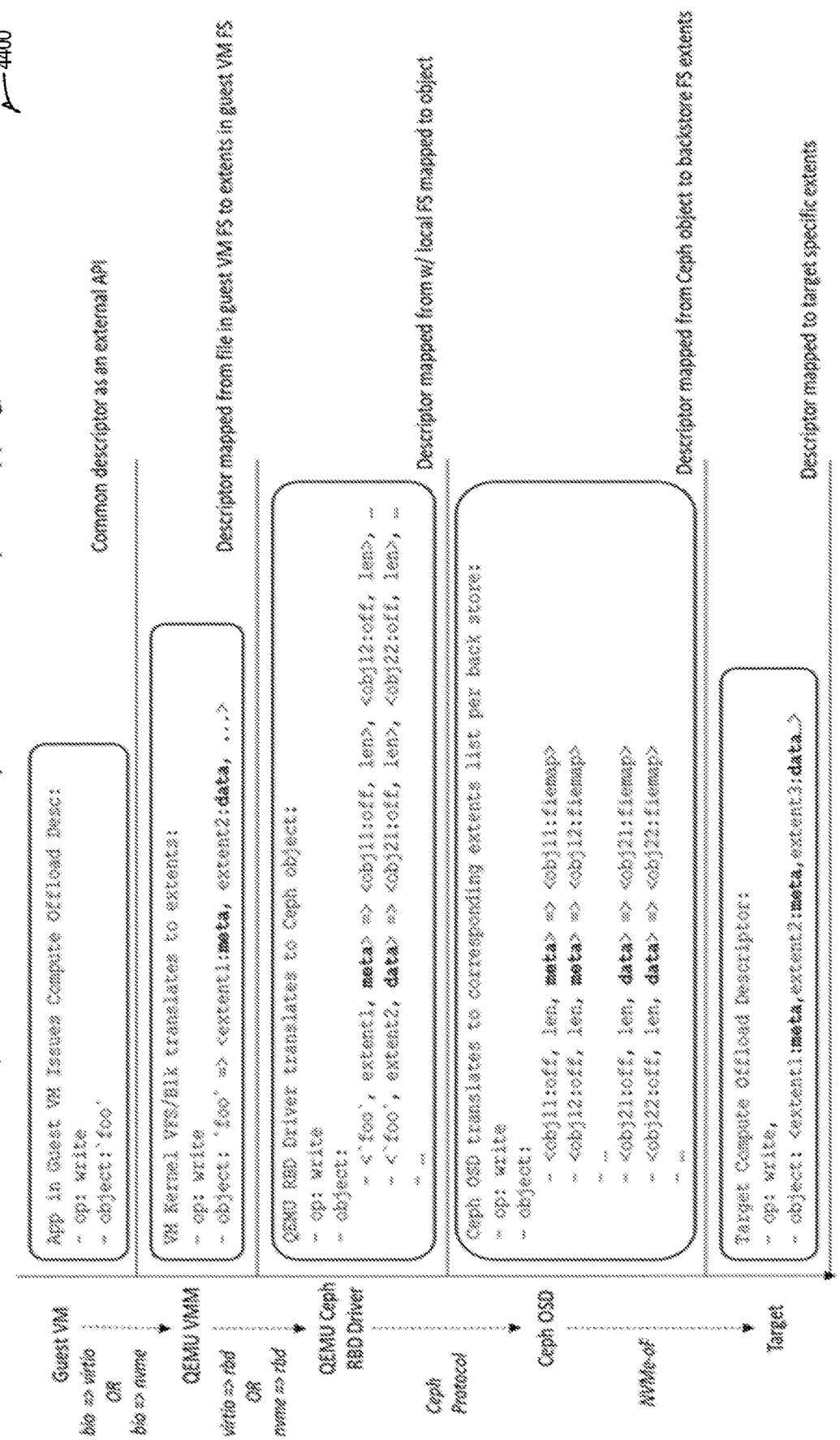
FIG. 44 illustrates an example embodiment of an end-to-end I/O classification and compute offload descriptor mapping for NAND-based data lifetime prediction.

To illustrate, an end-to-end use case in the context of scale-out multi-tenant cloud storage (e.g., a distributed storage shared among many tenants with various I/O characteristics) is presented in FIG. 44. For example, in order to achieve lifetime prediction as an end-to-end pipeline in a multi-tenant environment (e.g., using Red Hat Ceph), FIG. 44 illustrates an example embodiment of the end-to-end I/O classification and compute offload descriptor mapping. The illustrated example leverages two types of I/O using metadata and data. For example, as described further below, there are two components in the mechanism shown in FIG. 44.

The first component is an I/O classification extension to the compute offload descriptor. This allows application level I/O classification to be delivered all the way along the end-to-end path to the final SSD storage devices. Any intermediate layer can be the consumer of this information for the purpose of lifetime prediction at that layer. For example, we can use CAS at the QEMU Ceph RBD level for caching data at the QEMU host.

The second component is the compute offload descriptor mapping and translation. A sequential or random I/O operation seen at the application side may not necessarily be seen as sequential or random at various layers along the end-to-end I/O path. Therefore, we have to properly remap the descriptors and translate them properly to allow the I/O classification information to be always associated with the correct I/O of that layer. For example, a guest virtual machine (VM) filesystem metadata operation on a virtual disk image backed by the Ceph cluster needs to be translated into the proper descriptor format of the corresponding layer, as shown in FIG. 44.

As shown in FIG. 44, for example, "meta" and "data" I/O classes are added to the compute offload descriptor. The I/O classification information originates inside VM instances of cloud tenants, then tunnels through all middle layers, such as QEMU (a virtual machine manager), Ceph RBD (a block-to-object storage mapping service), Ceph protocol (Ceph storage service protocol over TCP/IP), Ceph OSD (object storage daemon), NVMeOF (disaggregated storage fabric), storage target, then eventually to the underlying storage devices (SSD or HDDs).

For lifetime prediction, this can happen at any layer along the end-to-end I/O classification path, depending on which layer is designed to be the consumer of the I/O classification. For example, if the goal is to deploy Optane cache devices on the QEMU VMM host side, the QEMU Ceph RBD can be the consumer of these I/O hints to predict the lifetime using the feature vectors shown in TABLES 1-3.

Figure 45:
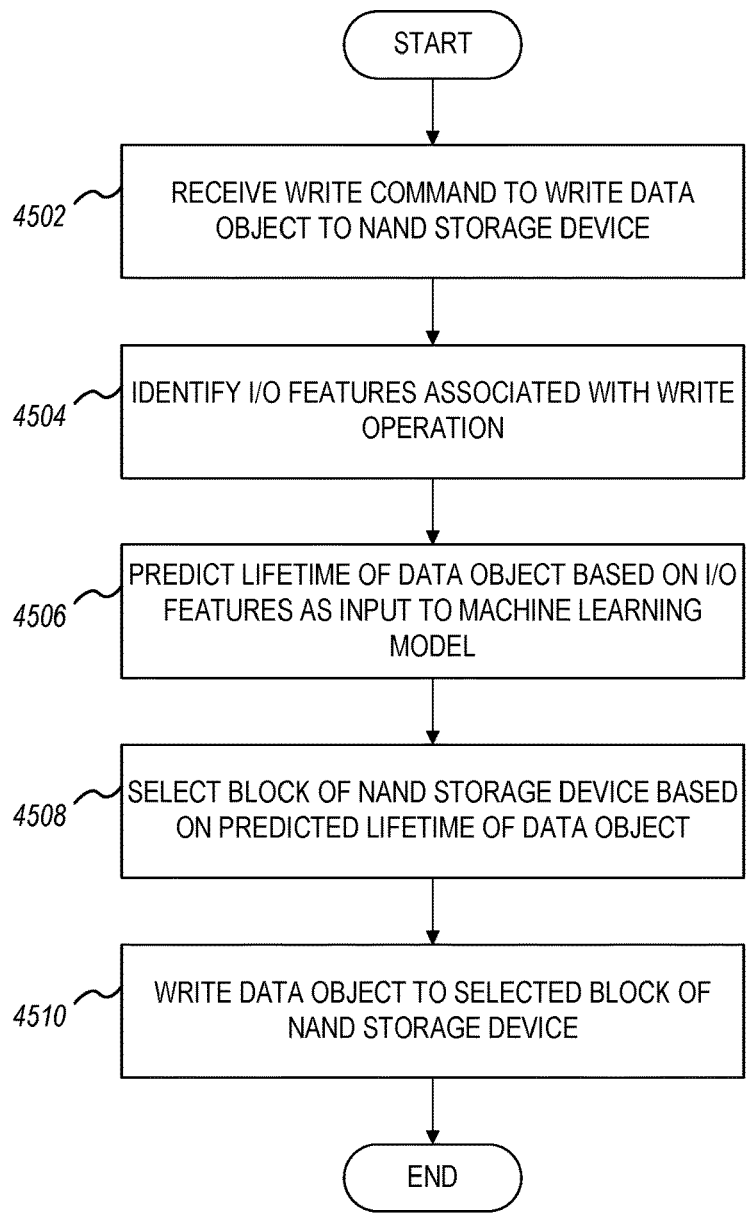
FIG. 45 illustrates a flowchart for storing data on NAND storage using data lifetime predictions.

FIG. 45 illustrates a flowchart 4500 for storing data on NAND storage using data lifetime predictions. In various embodiments, flowchart 4500 may be implemented using the embodiments and functionality described throughout this disclosure.

The flowchart begins at block 4502, where a write command is received from a host processor, wherein the write command is to instruct a NAND storage device to perform a write operation to write a data object to the NAND storage device.

The flowchart then proceeds to block 4504 to identify a plurality of input/output (I/O) features associated with the write operation, wherein the plurality of I/O features is to indicate a timestamp, a type of data, and an application name.

The flowchart then proceeds to block 4506 to predict a lifetime of the data object based on a machine learning model, wherein the machine learning model is trained to predict the lifetime of the data object based on the plurality of I/O features.

The flowchart then proceeds to block 4508 to select a corresponding block on the NAND storage device for storing the data object, wherein the corresponding block is selected from a plurality of blocks on the NAND storage device based on the lifetime of the data object.

The flowchart then proceeds to block 4510 to write the data object to the corresponding block on the NAND storage device.

At this point, the flowchart may be complete. In some embodiments, however, the flowchart may restart and/or certain blocks may be repeated. For example, in some embodiments, the flowchart may restart at block 4502 to continue receiving and processing requests to write data objects to NAND storage.

A Heuristic Method for Efficiently Exploring Cache Allocation Policies

This section presents a solution for heuristically exploring cache allocation policies.

Storage analytics is an area of research that attempts to help automate routine storage management tasks, starting with cache configuration and provisioning. This is accomplished via automated workload monitoring (e.g., I/O characterization), policy optimization (e.g., cache modeling and prediction), and orchestration (e.g., bringing caches online with an optimized policy).

Consider the process of appropriately configuring caching software (e.g., Intel's Cache Acceleration Software (CAS) with support for Differentiated Storage Services). In such a system, each class of data can receive its own caching policy. For example, we may choose to cache the filesystem journal and not cache large files.

Even with a relatively small number of I/O classes, however, we still have an exponential number of possible cache allocation policies. Naïvely searching this configuration space to look for an optimal caching policy is not feasible. Instead, we must rely on heuristics and models to predict the cache performance of various caching policies.

Figure 46:
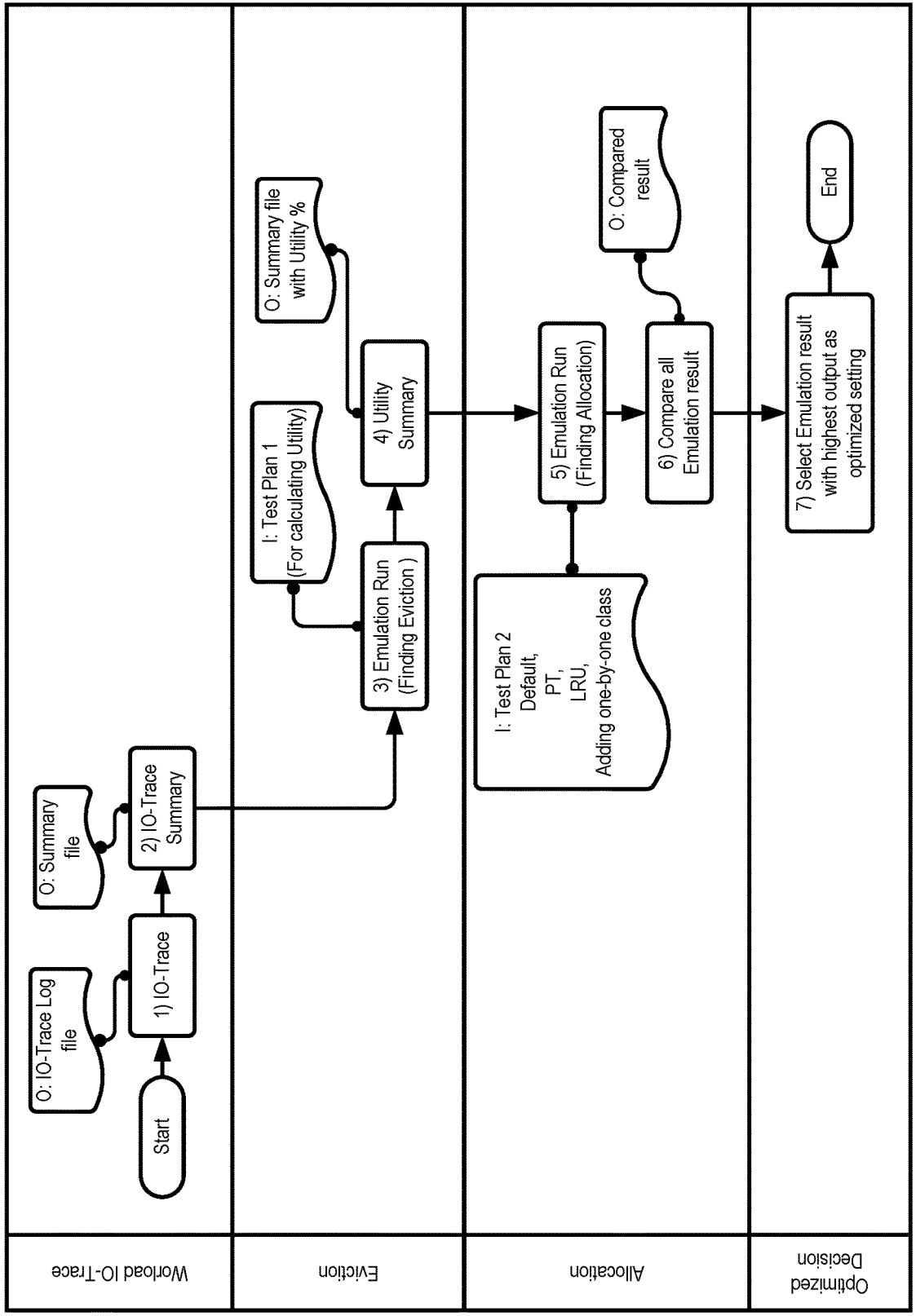
FIG. 46 illustrates an example process flow for cache eviction and allocation tuning.

In particular, cache software typically performs a process to automatically configure itself, which is a process referred to as "cache utility." For example, Intel's Cache Acceleration Software (CAS) performs the following process in order to automatically configure itself (as shown in FIG. 46):

Steps 1-2. Run an application, trace its I/O, and include the class of each I/O in the trace. Example I/O classes include "metadata," "small file," "medium file," and "large file."

Steps 3-4. Configure the CAS cache emulator with a "cache all" policy using an infinite cache size. No I/O will be evicted. Everything will be cached in the emulator. Replay the trace through the emulator and, within the emulator, record the number of disk seeks of each I/O class and the number of cache lines consumed. Divide the former by the latter to arrive at the cache utility of that class. In other words, with an infinite cache, we can cache all data to determine the size of each class, and we can determine the number of disk seeks that would be saved by caching the entire class. This is called the "cache utility" of that class. Higher is better. Utility (class)=seeks (class)/size (class).

Steps 3-4 (determine the eviction policy). Rank all n classes from highest to lowest utility. That ranking represents the eviction priority of each class of I/O. That is, when the cache fills, we would evict the lowest utility class first, then the second lowest, and so on. Higher utility classes are given priority in the cache.

Steps 5-6 (determine the allocation policy). With the eviction policy found in the previous step for the n classes, CAS must determine which classes to allocate. Not all classes are necessarily allocated in the cache. To do this, CAS starts by caching just the highest priority class and records the cache performance (via emulation). It then adds the second highest priority, then the third, and so on, until all classes are eventually cached. In doing this, CAS can take note of when the cache performance reached its maximum, and it can use that as the cache allocation policy. In many cases, only a certain number of classes need to be cached to reach maximum performance. After that, "thrash" can develop. Note that this step is linear in the number of classes. We have to run the cache emulator once for each new class that we are adding to the cache.

Step 7. Communicate the eviction ranking and the allocation policy (which classes get cached) to the actual CAS software (versus the CAS emulator) so that it can set the appropriate caching policy at runtime.

The allocation tuning process time is inefficient. It increases linearly with the number of classes, and it also increases with the size of the workload (e.g., replaying a given workload trace through the emulator takes time). It is desirable to have a solution that requires fewer runs of the emulator.

Accordingly, this section introduces a method for automatically exploring the cache allocation space (e.g., which classes of data do or do not get allocated in the cache). In particular, the proposed solution is a novel, automatic cache allocation tuning technique that uses a combination of hill climbing and modeling methodologies. For example, it uses the required minimum runs to start fitting polynomials, sigmoid, and exponential models. Then, hill climbing searching is used to determine which model gives the lowest residue, and that model is then used to predict the next optimized allocation policy while dropping the rest. When the model's residue approximately reaches zero (~0), the searching stops. The resulting model becomes the final model and the predicted best allocation policy becomes the optimized allocation configuration. In this manner, the cache is automatically optimized and tuned using the proposed solution in order to maximize performance.

The proposed solution involves 8 steps for automatically configuring the allocation policy in CAS. A case study of the Postmark workload (modeling SPEC SFS) is used for the detailed explanation. The nine CAS classes and the eviction policy determined by cache utility (as described earlier) are shown in TABLE 5. In the emulated runs, this utility-based eviction policy is never changed. Instead, we only focus on exploring the cache allocation space.

In contrast to the aforementioned linear solution (e.g., exploring the effects of allocating each class, one at a time), we instead perform something that looks more like a binary search. That is, we start by caching just the first class (the one of highest utility), and we record the emulated cache performance. We then cache all classes, and record that performance as well. We can then fit a line to these two points and extrapolate or interpolate between them in order to determine the effects of caching the other combinations. However, rather than stop there, we explore the "center" point by caching just half of the classes. We now have 3 points that we can fit a curve to, which doesn't necessarily have to be linear. Instead, we look for the best fit (e.g., linear vs. quadratic vs. cubic). We repeat this process until we find a curve with the best fit. And from there, we use that curve to predict the outcome of caching other classes of data.

More detail on this process is shown in TABLE 6. We show the number of loops and tests/loop needed to find the optimal cache allocation setting. Step 1 of the proposed solution is to run three allocation emulation tests on two boundaries and center point in the related eviction order and I/O classes. In the Postmark workload, the three emulation tests will run by allocating I/O class=metadata (boundary #1), I/O class=all (boundary #2), and I/O class=1, 11, 12, 13, 14 (center point) respectively. In step 2, we fit models that can be fitted using 3 data points from step 2. The minimum data points required for fitting various models is shown in TABLE 4. With 3 data points, linear, quadratic, logistic 3P, and exponential 3P, are fitted.

TABLE 4

Minimum data points required for model fitting

| NO. | POLYNOMIAL | | SIGMOID | | EXPONENTIAL | |
| --- | --- | --- | --- | --- | --- | --- |
| 1 | Linear | 2 | Logistic 3P | 3 | Exp 2P | 2 |
| 2 | Quadratic | 3 | Logistic 4P | 4 | Exp 3P | 3 |
| 3 | Cubic | 4 | Logistic 5P | 5 | Exp 4P | 4 |
| 4 | Quartic | 5 | | | Exp 5P | 5 |
| 5 | Quintic | 6 | | | | |

Since a specific workload will have its unique combination of I/O classes, the boundary condition is confined. There will be only one perfect model able to fit through the points within the boundary. Thus, we are looking for a perfect fit model for the confined boundary problem based on the residue. Step 3 computes the average residue between the predicted and real measurement values, which is then used in a hill climbing search to search for most fitted model:

$$\text{Average Residue} = \frac{\sum_{i}^{m} \sqrt[2]{(Y_i - \hat{Y}_i)^2}}{m} \quad (1)$$

where Y=measured value, Ŷ=model predicted value, and m is the total emulation runs. The square and root mean square are used to convert negative value to positive.

In the first model fitting with three data points, the hill climbing search will search for the model with the minimum average of residue from the three data points' residues and will use that model to predict the next best optimized allocation class in step 4. In step 5, if the predicted allocation class is not among the first three data points, emulation will run on the new predicted allocation setting. As shown in TABLE 6, the quadratic model has an average residue of approximately zero (~0), but it predicted that the best optimized allocation configuration involves allocating classes 1, 11, 12, 13, 14, 15, and 16, which has not been tested before. Then, continue with loop 2 by running the emulation with the new predicted optimized configuration. The model fitting will continue on the previous best model and adding new models that can be fitted with four data points in step 6. Loop 2 models include quadratic, cubic, and logistic 4P. In step 7, repeat step 3 to 6 until a model meeting the criteria of average residue is approximately zero (~0) and its predicted optimization setting is one of the measured data points before. This happened on loop 3 for the Postmark workload, where the quartic model reaches approximately zero (~0) average residue and it predicted allocating classes 1, 11, 12, 13, and 14 as optimal. This predicted setting was run in loop 1. Thus, the loop stops and the predicted optimization by the best model is chosen as the optimized setting for the workload in step 8.

TABLE 5

Postmark CAS Class ID and Eviction Policy determined by Cache Utility

| Class | Postmark CAS Class ID | CAS eviction policy |
|---|---|---|
| Metadata | 1 | 0 |
| <=4 KB | 11 | 1 |
| <=16 KB | 12 | 2 |
| <=64 KB | 13 | 3 |
| <=256 KB | 14 | 4 |
| <=1 MB | 15 | 5 |
| <=4 MB | 16 | 6 |
| <=16 MB | 17 | 7 |
| <=64 MB | 18 | 8 |

TABLE 6

Postmark CAS Allocation tuning steps and models used

| Emulated Run Number | Cache size (% of working set) | CAS Eviction Policy | CAS Allocation Policy | Notes | Model Used | Average Residue |
|---|---|---|---|---|---|---|
| 1 | 5% | See TABLE 5 | Allocate first class = 1 | Loop1: 1st boundary (allo 1) | Linear, Quadratic, Exp 3P, | Linear = 2096.8 Quadratic = 5.228e−10 |
| 2 | 5% | Same | (allocate first 5 classes) 1, 11, 12, 13, 14 | Loop1: center point (allo 5) | Logistic 3P | Exp 3p = 35.1 Logistic 3P = 574.4 |
| 3 | 5% | Same | (allocate all classes) 1, 11, 12, 13, 14, 15, 16, 17, 18 | Loop1: 2nd boundary (the end, allo all) | | |
| 4 | 5% | Same | (allocate first 7 classes) 1, 11, 12, 13, 14, 15, 16 | Loop2: allo based on best model predicted | Quadratic, Cubic, Logistic 4P | Quadratic = 385 Cubic = 4.2e−8 Logistic 4P = 48 |
| 5 | 5% | Same | (allocate first 6 classes) 0, 1, 11, 12, 13, 14 | Loop3: based on best model predicted (found ~0 residue and stop loop) | Cubic, logistic 5P, Quartic | Cubic = 37.5 Quartic = 3.2e−6 Logistic 5P = 27.9 |

In summary, the loop of the allocation policy search is as follows:
(1) After eviction ranking is found, begin with 3 emulation runs (2 points from boundaries+1 center point);
(2) Fit all models that require minimum of 3 points (m);
(3) Compute and compare models' average residue to search for minimum;
(4) Use model with least residue to predict optimized allocation setting;
(5) If predicted is not among the 3 points in step 1, run emulation;
(6) Fit models that require a minimum of 4 points (m+1) and refit the previously found best model in step 3;
(7) Repeat steps 3-6 until the average residue is approximately zero (~0) and the predicted optimized allocation setting is among the tested runs; and
(8) The best model's predicted allocation policy is updated to CAS.

Figure 47:
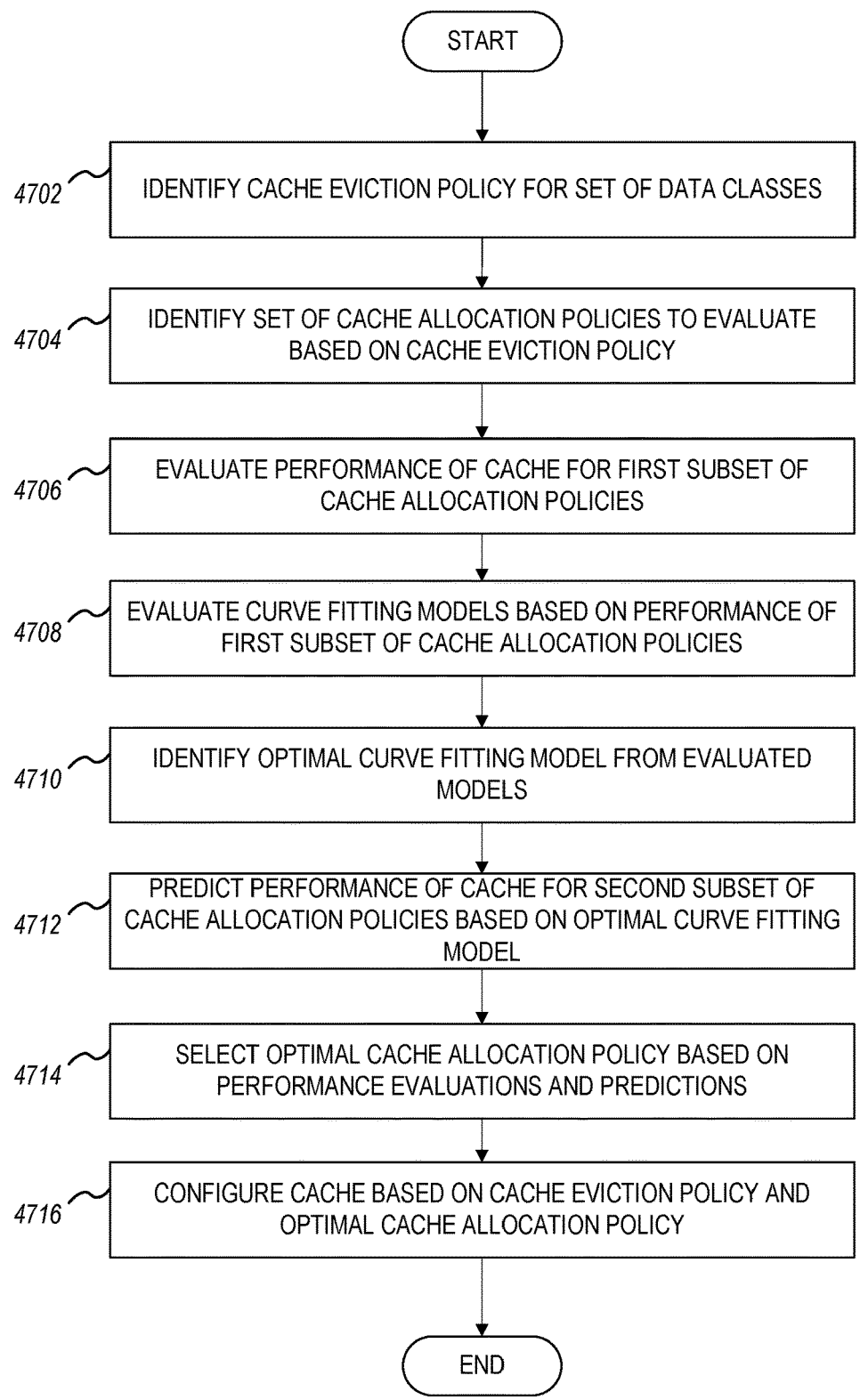
FIG. 47 illustrates a flowchart for optimizing and configuring a cache for a storage system.

FIG. 47 illustrates a flowchart 4700 for optimizing and configuring a cache for a storage system. In various embodiments, flowchart 4700 may be implemented using the embodiments and functionality described throughout this disclosure.

The flowchart begins at block 4702 to identify a cache eviction policy for a set of data classes, wherein the cache eviction policy indicates a priority in which each data class of the set of data classes is to be evicted from the cache.

The flowchart then proceeds to block 4704 to identify a set of cache allocation policies to evaluate based on the cache eviction policy, wherein each cache allocation policy is to allocate a different subset of the set of data classes to the cache.

The flowchart then proceeds to block 4706 to evaluate a performance of the cache for a first subset of cache allocation policies from the set of cache allocation policies, wherein a first set of performance indicators is obtained for the first subset of cache allocation policies based on evaluating the performance of the cache.

The flowchart then proceeds to block 4708 to evaluate a plurality of curve fitting models on the first set of performance indicators.

The flowchart then proceeds to block 4710 to identify an optimal curve fitting model for the first set of performance indicators, wherein the optimal curve fitting model is identified from the plurality of curve fitting models evaluated on the first set of performance indicators.

The flowchart then proceeds to block 4712 to predict the performance of the cache for a second subset of cache allocation policies from the set of cache allocation policies, wherein a second set of performance indicators is predicted for the second subset of cache allocation policies based on the optimal curve fitting model for the first set of performance indicators.

The flowchart then proceeds to block 4714 to select an optimal cache allocation policy from the set of cache allocation policies, wherein the optimal cache allocation policy is selected based on the first set of performance indicators and the second set of performance indicators.

The flowchart then proceeds to block 4716 to configure the cache based on the cache eviction policy and the optimal cache allocation policy.

At this point, the flowchart may be complete. In some embodiments, however, the flowchart may restart and/or certain blocks may be repeated. For example, in some embodiments, the flowchart may restart at block 4702 to continue optimizing and configuring the cache.

CRC Calculations Using Computational Storage

This section presents a compute-in-storage solution for performing end-to-end CRC calculations in an SSD over one or more logical block addresses (LBAs).

Advances in storage technology are leading to extremely fast devices. In particular, we are seeing various forms of non-volatile memory being used for solid-state disks, notably NAND and persistent memory. However, I/O speeds are not keeping pace, and this is resulting in more time needed to transfer data between storage devices and CPUs. The available bandwidth from these fast devices is being governed by the I/O stack, which includes a variety of legacy software and hardware. Though improvements to the I/O path are underway and ongoing, they will never address the fundamental problem—moving data takes time. Non-volatile memory is already limited by the I/O controllers they are attached to, and this is expected to get worse as storage density increases.

This solution proposes a compute-in-storage alternative for an SSD. Rather than move data to the CPUs, we want to move computation to the data. We specifically focus on a CRC calculation, which is data-intensive and commonly used in a variety of software stacks to ensure data integrity.

Specifically, within an SSD, we calculate the CRC on one or more LBAs, and return the result to the host without transferring the data payload. This allows the host to offload the data integrity check to the storage device rather than transfer the entire payload and then perform the data integrity calculation.

As a concrete example, consider "bitrot detection" or "auditing" in object storage systems. This involves calculating a checksum (often CRC-32) over the entirety of an object to identify any corruption and trigger subsequent repairs. The problem arises in that as drives and storage system increase, ever increasing amounts of bandwidth must be dedicated to reading this data and calculating these checksums, stressing the I/O paths with important, albeit "uninteresting" traffic. If the checksum can be offloaded to the SSD itself, this frees up CPU and I/O bandwidth for higher priority, latency sensitive operations.

In current solutions, the host is required to transfer the entire data payload over the transport interface and perform the data integrity calculation using the host CPU. Thus, both the host CPU and transport interface bandwidth are required resources for performing the data integrity checking. While the host CPU and transport interface bandwidth could be utilized for higher-value work if the CRC calculation could be offloaded to the storage device, that is not possible using current solutions.

Figure 48:
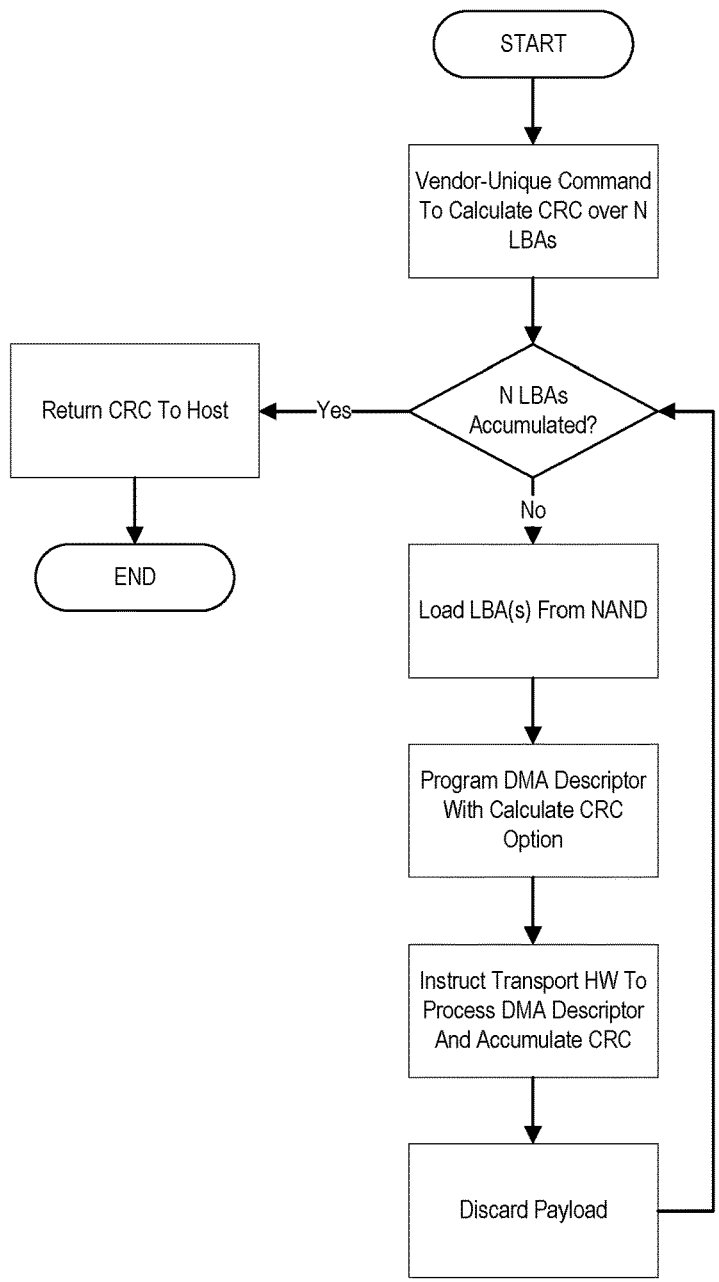
FIG. 48 illustrates a flowchart for an example embodiment of offloading CTC calculations using compute-in-storage.

Accordingly, this section proposes a compute-in-storage solution that enables CRC calculations to be offloaded to storage devices. For example, a new capability is provided in transport hardware where a DMA operation accumulates the CRC on a payload of >=1 sector(s) and returns the calculated CRC to the host in response to a vendor-unique command. The vendor unique command requests a CRC calculation on the payload of 1 or more 4K sectors, and further includes a final length such that data that is not a sector-length multiple in size can be calculated. In other words, the final sector may be less than 4 k in length, and the final CRC update is calculated on a subset of its data. The firmware within the SSD interprets this command and reads the sectors from the NAND storage. A DMA descriptor is programmed into the transport hardware, which tells the transport hardware to read the data and accumulate the CRC over the payload(s), but then discard the data rather than transfer it into host memory over the corresponding interface (e.g., SATA, PCIe, and so forth). After all sectors have traversed through the transport hardware, the final CRC value is returned to the host. FIG. 48 illustrates a flowchart for an example embodiment of offloading CTC calculations using compute-in-storage, as described above.

Thus, this solution gives the transport hardware the ability to accumulate a CRC on >=1 LBA, as described by a DMA descriptor. The data payload is discarded after the CRC calculation is performed. Further, no data transfer to the host occurs until all LBA(s) are processed and the final CRC value is returned.

By implementing a vendor-unique command to offload CRC checking to the storage device, users and/or entities can utilize their host-side CPUs for higher-value work, thus improving overall performance.

Figure 49:
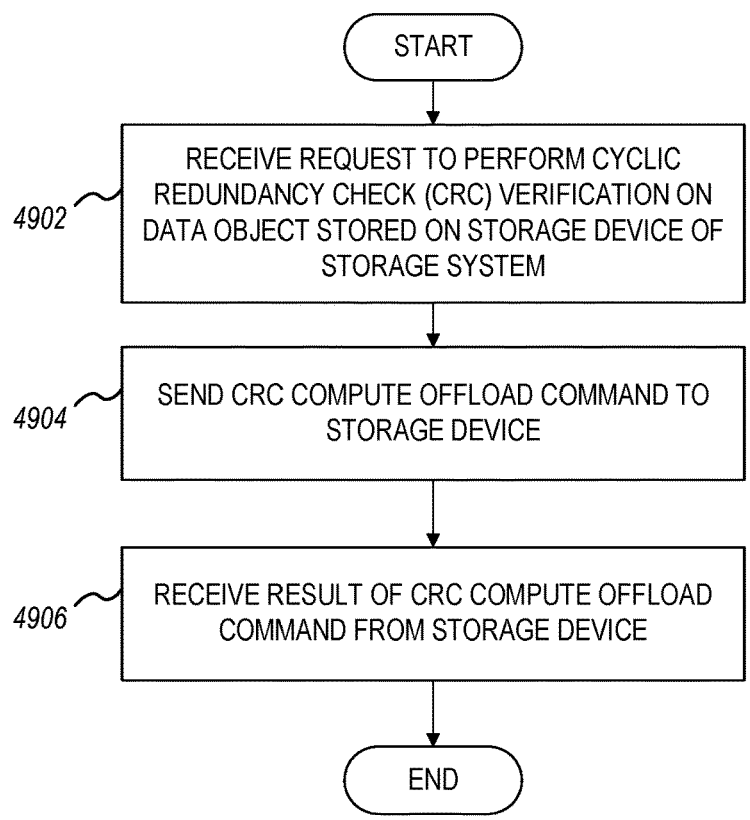
FIG. 49 illustrates a flowchart for performing CRC validations on data objects stored in the storage system.

FIG. 49 illustrates a flowchart 4900 for performing CRC validations on data objects stored in the storage system. In various embodiments, flowchart 4900 may be implemented using the embodiments and functionality described throughout this disclosure.

The flowchart begins at block 4902, where a request is received to perform a cyclic redundancy check (CRC) verification on a data object stored on a storage system, wherein the data object is stored on a corresponding storage device of the storage system.

The flowchart then proceeds to block 4904 to send a CRC compute offload command to the corresponding storage device, wherein the CRC compute offload command is to instruct the corresponding storage device to perform the CRC verification on the data object.

The flowchart then proceeds to block 4906, where a result of the CRC compute offload command is received from the corresponding storage device.

At this point, the flowchart may be complete. In some embodiments, however, the flowchart may restart and/or certain blocks may be repeated. For example, in some embodiments, the flowchart may restart at block 4902 to continue receiving and processing requests to perform CRC validations on data objects stored in the storage system.

Example Computing Embodiments

The following sections present various examples of computing devices, systems, architectures, and environments that may be used in conjunction with the compute-in-storage functionality described throughout this disclosure.

Example Edge Computing Architectures

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

In the following description, methods, configurations, and related apparatuses are disclosed for various improvements to the configuration and functional capabilities of an edge computing architecture and an implementing edge computing system. These improvements may benefit a variety of use cases, especially those involving multiple stakeholders of the edge computing system—whether in the form of multiple users of a system, multiple tenants on a system, multiple devices or user equipment interacting with a system, multiple services being offered from a system, multiple resources being available or managed within a system, multiple forms of network access being exposed for a system, multiple locations of operation for a system, and the like. Such multi-dimensional aspects and considerations are generally referred to herein as "multi-entity" constraints, with specific discussion of resources managed or orchestrated in multi-tenant and multi-service edge computing configurations.

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency usercases such as autonomous driving, video surveillance, and mobile media consumption. Additionally, these resources will benefit from service management in an edge system which provides the ability to scale and achieve local SLAs, manage tiered service requirements, and enable local features and functions on a temporary or permanent basis.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

As used herein, the term "edge computing" may encompass many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein may refer to groups or groupings of functional distributed compute elements and, therefore, generally unrelated to "edges" (links or connections) as used in graph theory.

Specific arrangements of edge computing applications and services accessible via mobile wireless networks (e.g., cellular and Wi-Fi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" may refer to an identifiable entity implementing an aspect of edge computing operations, whether part of a larger system, distributed collection of systems, or a standalone apparatus. In some examples, a compute node may be referred to as an "edge node", "edge device", "edge system", whether in operation as a client, server, or intermediate entity. Specific implementations of a compute node may be incorporated into a server, base station, gateway, road side unit, on premise unit, UE or end consuming device, or the like.

As used herein, the term "base station" may refer to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station may use specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) may refer to an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

As used herein, the term "cloud service provider" (or CSP) may refer to an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" or "datacenter" may refer to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of network functions from embedded services inside proprietary hardware appliances to software-based virtualized network functions (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized network function" (or VNF) indicates a software-based network function operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

Although many of the following examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Figure 50:
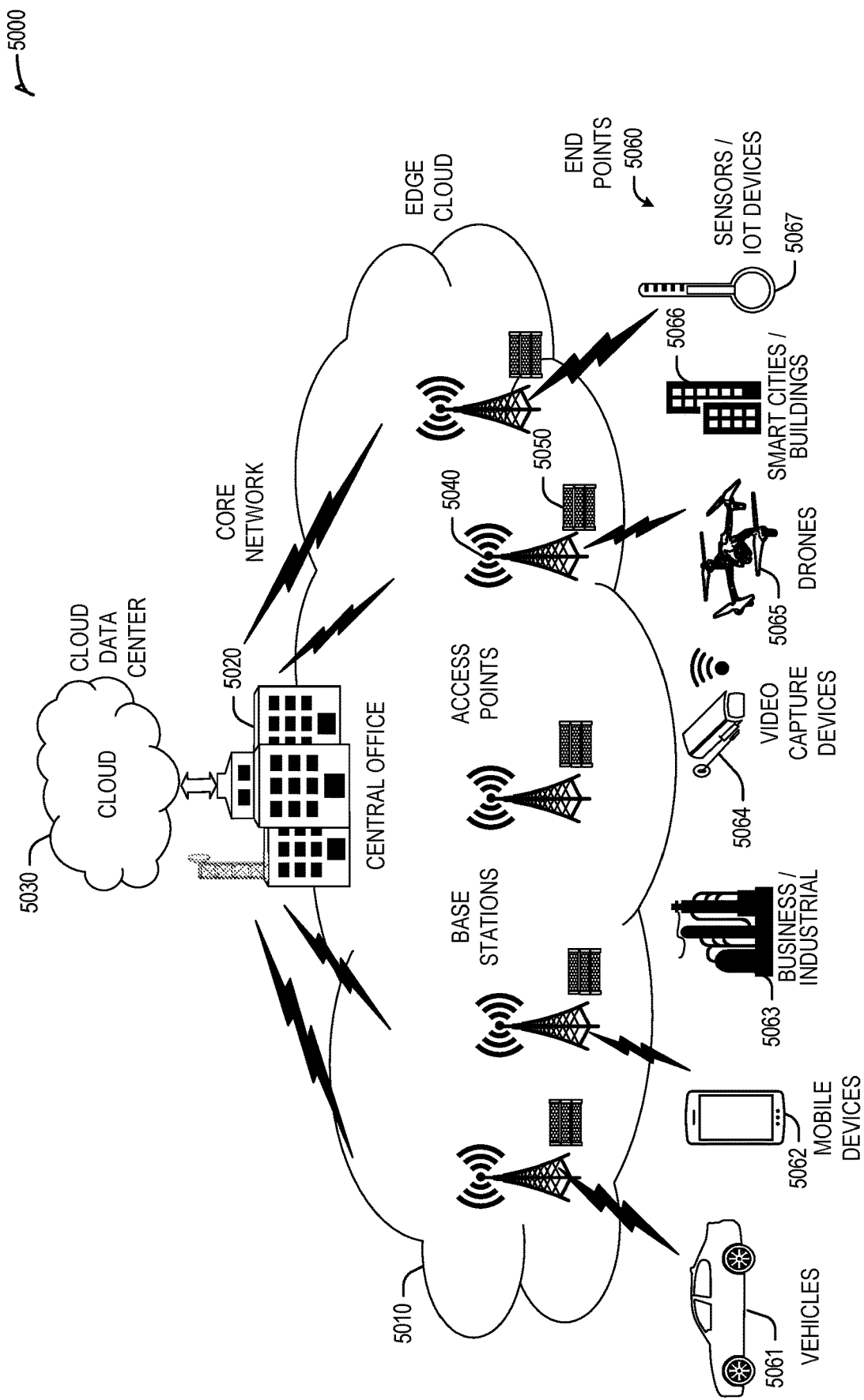
FIG. 50 illustrates an overview of an edge cloud configuration for edge computing.

FIG. 50 is a block diagram 5000 showing an overview of a configuration for edge computing, which includes a layer of processing referenced in many of the current examples as an "edge cloud". As shown, the edge cloud 5010 is co-located at an edge location, such as the base station 5040, a local processing hub 5050, or a central office 5020, and thus may include multiple entities, devices, and equipment instances. The edge cloud 5010 is located much closer to the endpoint (consumer and producer) data sources 5060 (e.g., autonomous vehicles 5061, user equipment 5062, business and industrial equipment 5063, video capture devices 5064, drones 5065, smart cities and building devices 5066, sensors and IoT devices 5067, etc.) than the cloud data center 5030. Compute, memory, and storage resources which are offered at the edges in the edge cloud 5010 are critical to providing ultra-low latency response times for services and functions used by the endpoint data sources 5060 as well as reduce network backhaul traffic from the edge cloud 5010 toward cloud data center 5030 thus improving energy consumption and overall network usages among other benefits.

Compute, memory, and storage are scarce resources, and generally decrease depending on the edge location (e.g., fewer processing resources being available at consumer endpoint devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle. As another example, the compute-in-storage functionality described throughout this disclosure may be leveraged throughout the cloud 5030, edge cloud 5010, and/or end points 5060 in order to reduce latency associated with data storage, retrieval, and computation.

In contrast to the network architecture of FIG. 50, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 51:
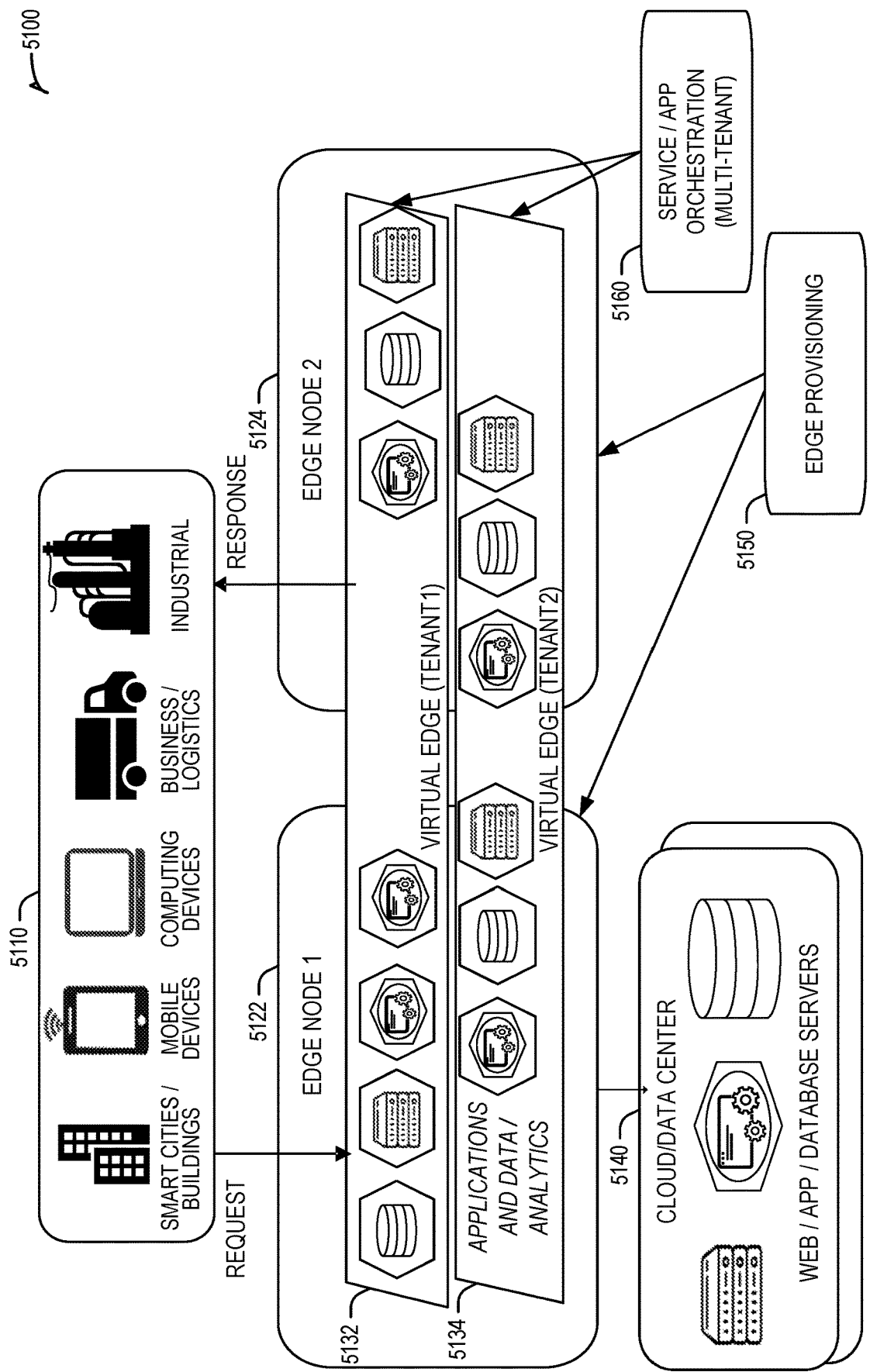
FIG. 51 illustrates deployment and orchestration for virtual edge configurations across an edge computing system operated among multiple edge nodes and multiple tenants.

FIG. 51 illustrates deployment and orchestration for virtual edge configurations across an edge computing system operated among multiple edge nodes and multiple tenants. Specifically, FIG. 51 depicts coordination of a first edge node 5122 and a second edge node 5124 in an edge computing system 5100, to fulfill requests and responses for various client endpoints 5110 from various virtual edge instances. The virtual edge instances provide edge compute capabilities and processing in an edge cloud, with access to a cloud/data center 5140 for higher-latency requests for websites, applications, database servers, etc. Thus, the edge cloud enables coordination of processing among multiple edge nodes for multiple tenants or entities.

In the example of FIG. 51, these virtual edge instances include: a first virtual edge 5132, offered to a first tenant (Tenant 1), which offers a first combination of edge storage, computing, and services; and a second virtual edge 5134, offering a second combination of edge storage, computing, and services, to a second tenant (Tenant 2). The virtual edge instances 5132, 5134 are distributed among the edge nodes 5122, 5124, and may include scenarios in which a request and response are fulfilled from the same or different edge nodes. The configuration of each edge node 5122, 5124 to operate in a distributed yet coordinated fashion occurs based on edge provisioning functions 5150. The functionality of the edge nodes 5122, 5124 to provide coordinated operation for applications and services, among multiple tenants, occurs based on orchestration functions 5160.

It should be understood that some of the devices in 5110 are multi-tenant devices where Tenant1 may function within a Tenant1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning entities 5110, 5122, and 5140 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 51. An orchestrator may use a DICE layering and fan-out construction to create a RoT context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 5122 (e.g., operated by a first owner) and a second edge node 5124 (e.g., operated by a second owner) may operate or respond to a container orchestrator to coordinate the execution of various applications within the virtual edge instances offered for respective tenants. For instance, the edge nodes 5122, 5124 may be coordinated based on edge provisioning functions 5150, while the operation of the various applications are coordinated with orchestration functions 5160.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Moreover, in some embodiments, the compute-in-storage functionality described throughout this disclosure may be leveraged throughout edge computing system 5100 in order to reduce latency associated with data storage, retrieval, and computation.

Figure 52:
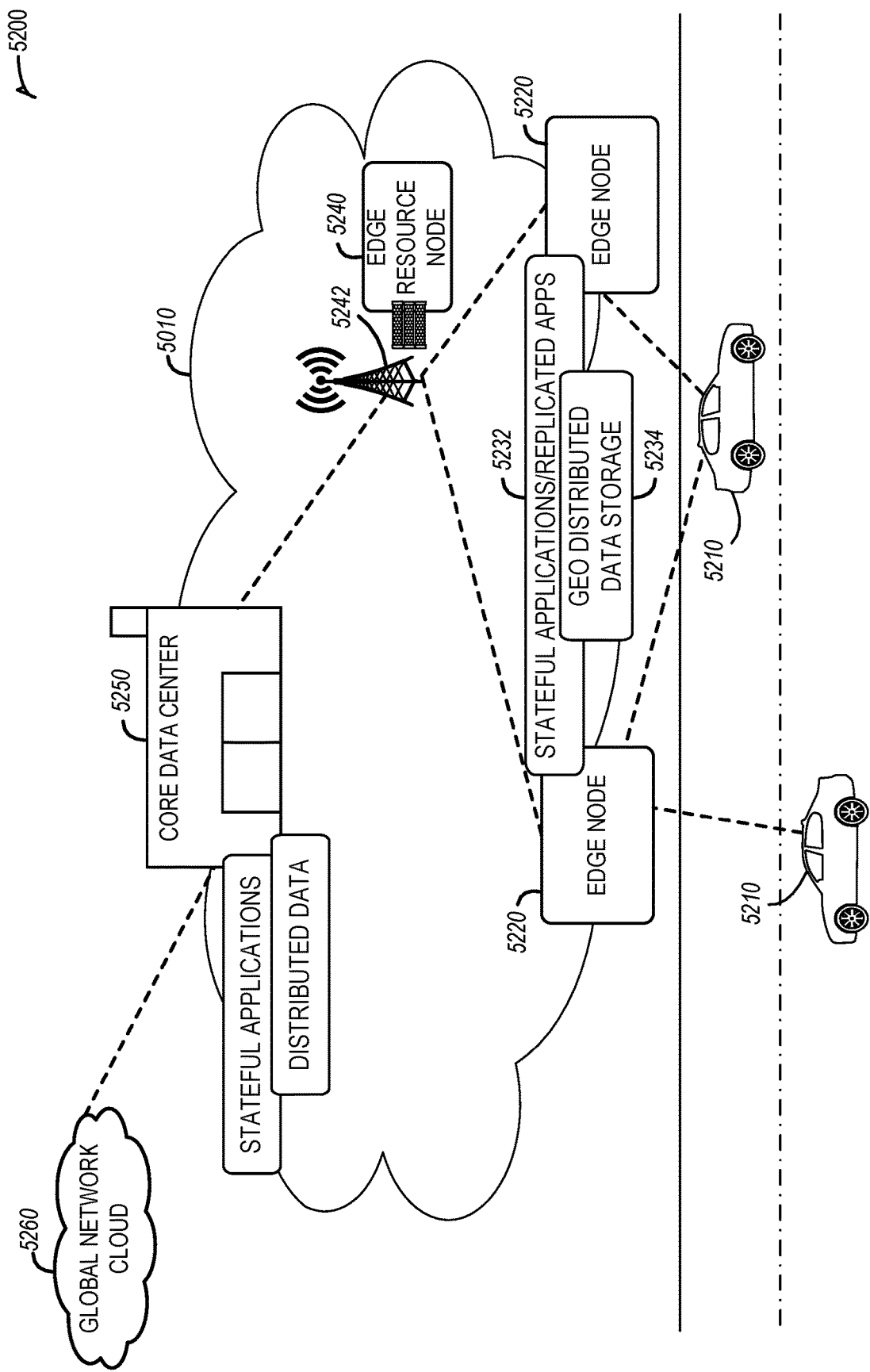
FIG. 52 illustrates a vehicle compute and communication use case involving mobile access to applications in an edge computing system.

It should be appreciated that the edge computing systems and arrangements discussed herein may be applicable in various solutions, services, and/or use cases. As an example, FIG. 52 shows a simplified vehicle compute and communication use case involving mobile access to applications in an edge computing system 5200 that implements an edge cloud 5010. In this use case, each client compute node 5210 may be embodied as in-vehicle compute systems (e.g., in-vehicle navigation and/or infotainment systems) located in corresponding vehicles that communicate with the edge gateway nodes 5220 during traversal of a roadway. For instance, edge gateway nodes 5220 may be located in roadside cabinets, which may be placed along the roadway, at intersections of the roadway, or other locations near the roadway. As each vehicle traverses along the roadway, the connection between its client compute node 5210 and a particular edge gateway node 5220 may propagate so as to maintain a consistent connection and context for the client compute node 5210. Each of the edge gateway nodes 5220 includes some processing and storage capabilities and, as such, some processing and/or storage of data for the client compute nodes 5210 may be performed on one or more of the edge gateway nodes 5220.

Each of the edge gateway nodes 5220 may communicate with one or more edge resource nodes 5240, which are illustratively embodied as compute servers, appliances or components located at or in a communication base station 5242 (e.g., a base station of a cellular network). As discussed above, each edge resource node 5240 includes some processing and storage capabilities and, as such, some processing and/or storage of data for the client compute nodes 5210 may be performed on the edge resource node 5240. For example, the processing of data that is less urgent or important may be performed by the edge resource node 5240, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 5220, edge resource node(s) 5240, core data center 5250, and network cloud 5260.

The edge resource node(s) 5240 also communicate with the core data center 5250, which may include compute servers, appliances, and/or other components located in a central location (e.g., a central office of a cellular communication network). The core data center 5250 may provide a gateway to the global network cloud 5260 (e.g., the Internet) for the edge cloud 5010 operations formed by the edge resource node(s) 5240 and the edge gateway nodes 5220. Additionally, in some examples, the core data center 5250 may include an amount of processing and storage capabilities and, as such, some processing and/or storage of data for the client compute devices may be performed on the core data center 5250 (e.g., processing of low urgency or importance, or high complexity). The edge gateway nodes 5220 or the edge resource nodes 5240 may offer the use of stateful applications 5232 and a geographic distributed data storage 5234 (e.g., database, data store, etc.).

In further examples, FIG. 52 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 5220, some others at the edge resource node 5240, and others in the core data center 5250 or global network cloud 5260.

Moreover, in some embodiments, the compute-in-storage functionality described throughout this disclosure may be leveraged throughout edge computing system 5200 in order to reduce latency associated with data storage, retrieval, and computation.

In further configurations, the edge computing system may implement FaaS or EaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS or EaaS deployment, a container is used to provide an environment in which function code is executed. The container may be any isolated-execution entity such as a process, a Docker or Kubernetes container, a virtual machine, etc. Within the edge computing system, various data center, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS and EaaS may enable deployment of edge functions in a service fashion, including a support of respective functions that support edge computing as a service. Additional features of FaaS and EaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Some of the techniques and configurations discussed with reference to edge computing may be implemented within an MEC environment, such as that provided by the standards and approaches published in ETSI GS MEC-003 "Mobile Edge Computing (MEC); Framework and Reference Architecture" (e.g., V2.0.3) and related MEC or networked operational implementations.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 53:
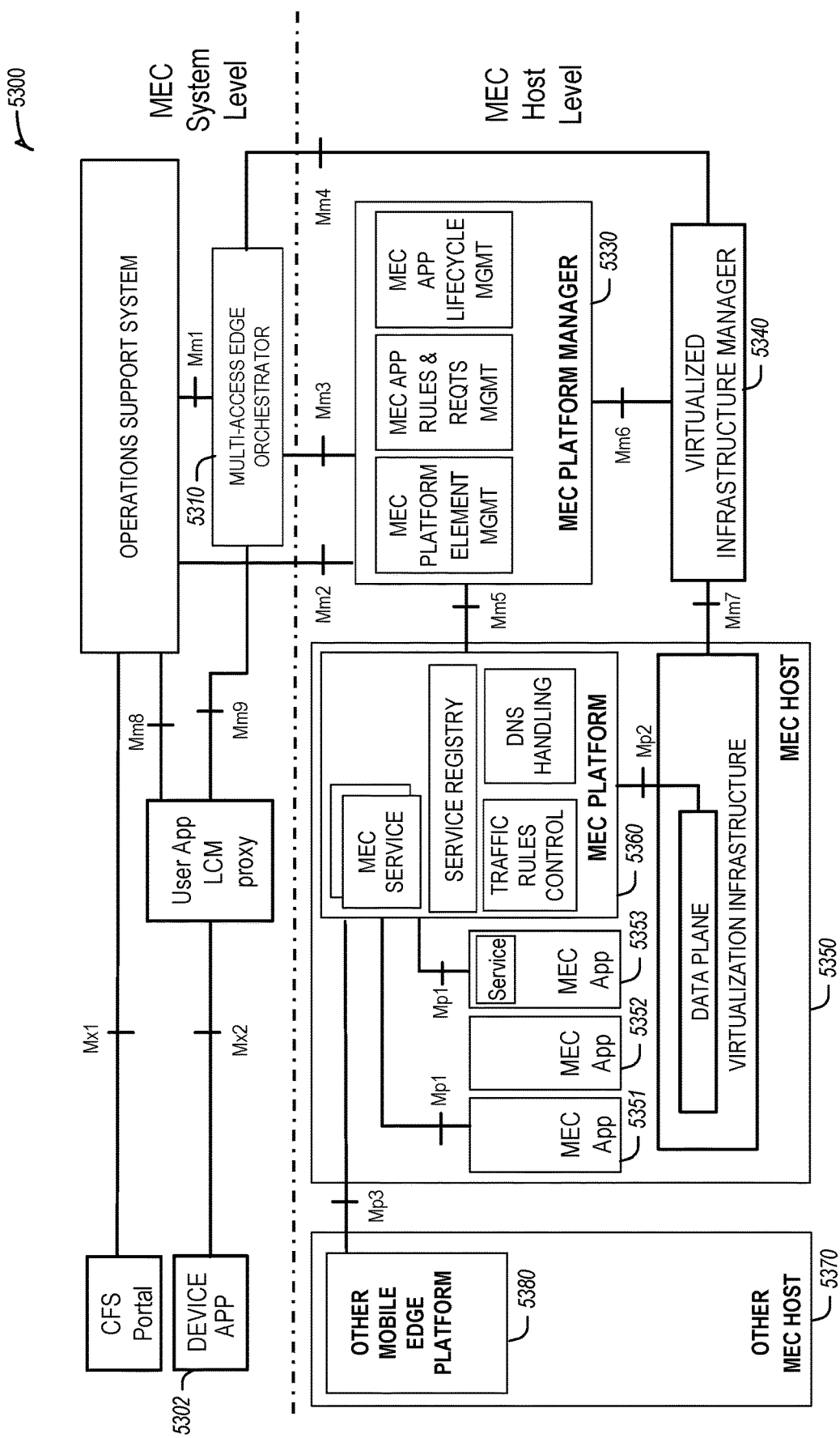
FIG. 53 illustrates a block diagram for a Multi-access Edge Computing (MEC) system architecture.

FIG. 53 depicts a block diagram 5300 for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 53, and the communications to perform network operations may be implemented at any number of the interfaces of the MEC system architecture depicted in FIG. 53.

For instance, a device application 5302 operating at a client user equipment device (e.g., smartphone) may access a multi-access edge orchestrator 5310, as the orchestrator 5310 coordinates system configuration or features of an edge computing host for fulfillment of services or applications. Further, a particular MEC Host 5350 may operate one or more MEC applications 5351, 5352, 5353 or a platform 5360 which provide an MEC resource or service via a virtual edge appliance. A virtualized infrastructure manager 5340 and MEC Platform Manager 5330 provide management of the use of the hosts, platforms, and resources, and may also provide managed access to an attestation service or verifier (not shown). The virtualized infrastructure manager 5340 and MEC Platform Manager 5330 may also provide managed access to other MEC hosts (e.g., host 5370) or MEC platforms (e.g., platform 5380), which may also be involved with uses of attestation functionality as described herein.

Moreover, in some embodiments, the MEC system architecture 5300 may leverage the compute-in-storage functionality described throughout this disclosure in order to reduce latency associated with data storage, retrieval, and computation. As an example, the virtualization infrastructure of an MEC host 5350 may include data storage resources that are implemented with compute-in-storage functionality. In some embodiments, for example, the virtualization infrastructure may include a data storage device that leverages an associated processor, controller, and/or accelerator to perform certain compute tasks on data stored on the storage device.

Figure 54:
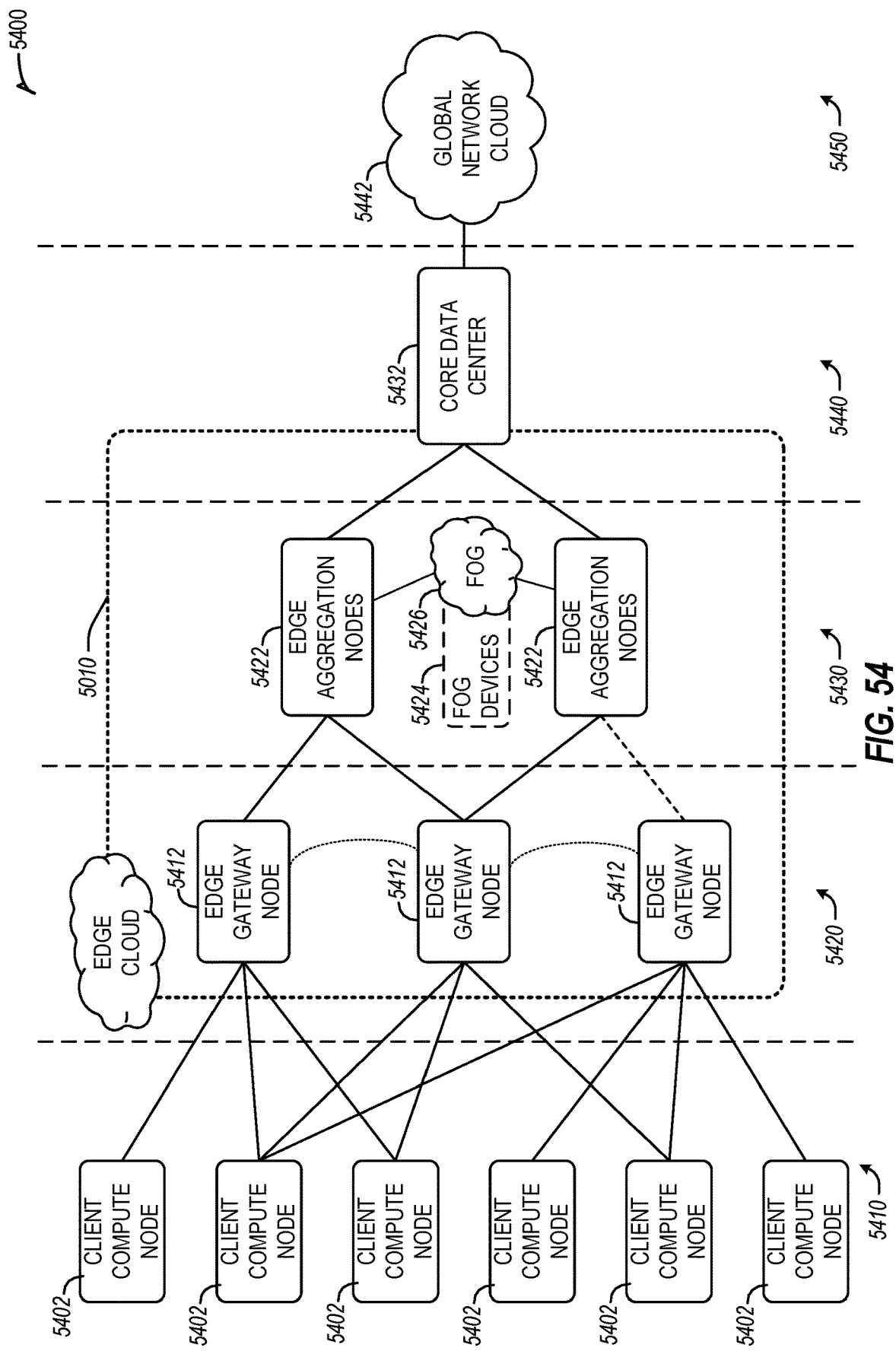
FIG. 54 illustrates an overview of layers of distributed compute deployed among an edge computing environment.

At a more generic level, an edge computing system may be described to encompass any number of deployments operating in the edge cloud 5010, which provide coordination from client and distributed computing devices. FIG. 54 provides a further abstracted overview of layers of distributed compute deployed among an edge computing environment for purposes of illustration.

FIG. 54 generically depicts an edge computing system for providing edge services and applications to multi-stakeholder entities, as distributed among one or more client compute nodes 5402, one or more edge gateway nodes 5412, one or more edge aggregation nodes 5422, one or more core data centers 5432, and a global network cloud 5442, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities. Various forms of wired or wireless connections may be configured to establish connectivity among the nodes 5402, 5412, 5422, 5432, including interconnections among such nodes (e.g., connections among edge gateway nodes 5412, and connections among edge aggregation nodes 5422).

Each node or device of the edge computing system is located at a particular layer corresponding to layers 5410, 5420, 5430, 5440, 5450. For example, the client compute nodes 5402 are each located at an endpoint layer 5410, while each of the edge gateway nodes 5412 are located at an edge devices layer 5420 (local level) of the edge computing system. Additionally, each of the edge aggregation nodes 5422 (and/or fog devices 5424, if arranged or operated with or among a fog networking configuration 5426) are located at a network access layer 5430 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 5432 is located at a core network layer 5440 (e.g., a regional or geographically-central level), while the global network cloud 5442 is located at a cloud data center layer 5450 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 5432 may be located within, at, or near the edge cloud 5010.

Although an illustrative number of client compute nodes 5402, edge gateway nodes 5412, edge aggregation nodes 5422, core data centers 5432, global network clouds 5442 are shown in FIG. 54, it should be appreciated that the edge computing system may include more or fewer devices or systems at each layer. Additionally, as shown in FIG. 54, the number of components of each layer 5410, 5420, 5430, 5440, 5450 generally increases at each lower level (i.e., when moving closer to endpoints). As such, one edge gateway node 5412 may service multiple client compute nodes 5402, and one edge aggregation node 5422 may service multiple edge gateway nodes 5412. Moreover, in some embodiments, the compute-in-storage functionality described throughout this disclosure may be leveraged throughout edge computing system 5400 in order to reduce latency associated with data storage, retrieval, and computation.

Consistent with the examples provided herein, each client compute node 5402 may be embodied as any type of end point component, device, appliance, or "thing" capable of communicating as a producer or consumer of data. Further, the label "node" or "device" as used in the edge computing system 5400 does not necessarily mean that such node or device operates in a client or slave role; rather, any of the nodes or devices in the edge computing system 5400 refer to individual entities, nodes, or subsystems which include discrete or connected hardware or software configurations to facilitate or use the edge cloud 5010.

As such, the edge cloud 5010 is formed from network components and functional features operated by and within the edge gateway nodes 5412 and the edge aggregation nodes 5422 of layers 5420, 5430, respectively. The edge cloud 5010 may be embodied as any type of network that provides edge computing and/or storage resources which are proximately located to radio access network (RAN) capable endpoint devices (e.g., mobile computing devices, IoT devices, smart devices, etc.), which are shown in FIG. 54 as the client compute nodes 5402. In other words, the edge cloud 5010 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 5010 may form a portion of or otherwise provide an ingress point into or across a fog networking configuration 5426 (e.g., a network of fog devices 5424, not shown in detail), which may be embodied as a system-level horizontal and distributed architecture that distributes resources and services to perform a specific function. For instance, a coordinated and distributed network of fog devices 5424 may perform computing, storage, control, or networking aspects in the context of an IoT system arrangement. Other networked, aggregated, and distributed functions may exist in the edge cloud 5010 between the core network layer 5440 and the client endpoints (e.g., client compute nodes 5402). Some of these are discussed in the following sections in the context of network functions or service virtualization, including the use of virtual edges and virtual services which are orchestrated for multiple stakeholders.

The edge gateway nodes 5412 and the edge aggregation nodes 5422 cooperate to provide various edge services and security to the client compute nodes 5402. Furthermore, because each client compute node 5402 may be stationary or mobile, each edge gateway node 5412 may cooperate with other edge gateway devices to propagate presently provided edge services and security as the corresponding client compute node 5402 moves about a region. To do so, each of the edge gateway nodes 5412 and/or edge aggregation nodes 5422 may support multiple tenancy and multiple stakeholder configurations, in which services from (or hosted for) multiple service providers and multiple consumers may be supported and coordinated across a single or multiple compute devices.

A variety of security approaches may be utilized within the architecture of the edge cloud 5010. In a multi-stakeholder environment, there can be multiple loadable security modules (LSMs) used to provision policies that enforce the stakeholders interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 5010, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

Global Service Page Table Examples

One of the challenges in a distributed architecture where data is being posted distributed across multiple edge locations for a particular services or tenant owning different services is how to manage the rights that these set of services has to particular data sets. These set of data sets may be stored in what is known as data lake. In an example, a new hardware method uses a page table concept to allow efficient and low latency data distribution (in memory) and access to devices.

Existing solutions are based on software stacks for distributed storage. In this case the software stack performs translation access from services to virtual address space to physical location and checks the permissions that those services have for that particular data set. Scalability is a major limitation of the using the software stack. Similar issues arise with services for tenants and devices.

The edge computing systems described herein (e.g., edge cloud 5010, and the edge computing system configurations described and depicted throughout this disclosure) are expanded with an implementation of an edge page table. The edge page table is used to track what services have access to what data, how virtual addresses from the service are mapped to physical address, and what the permissions are for an address or data. In an example, the page table may enable a service may be instantiated or migrated across multiple edge locations. The edge page table may improve security or tenant isolation on endpoint devices (including by protecting different areas of the page table using tenant, service or user-based data encryption). Further, the edge page table may be offered on a "global" or system-wide/multi-system basis, to improve performance of tenant-specific resource context switching.

Figure 55:
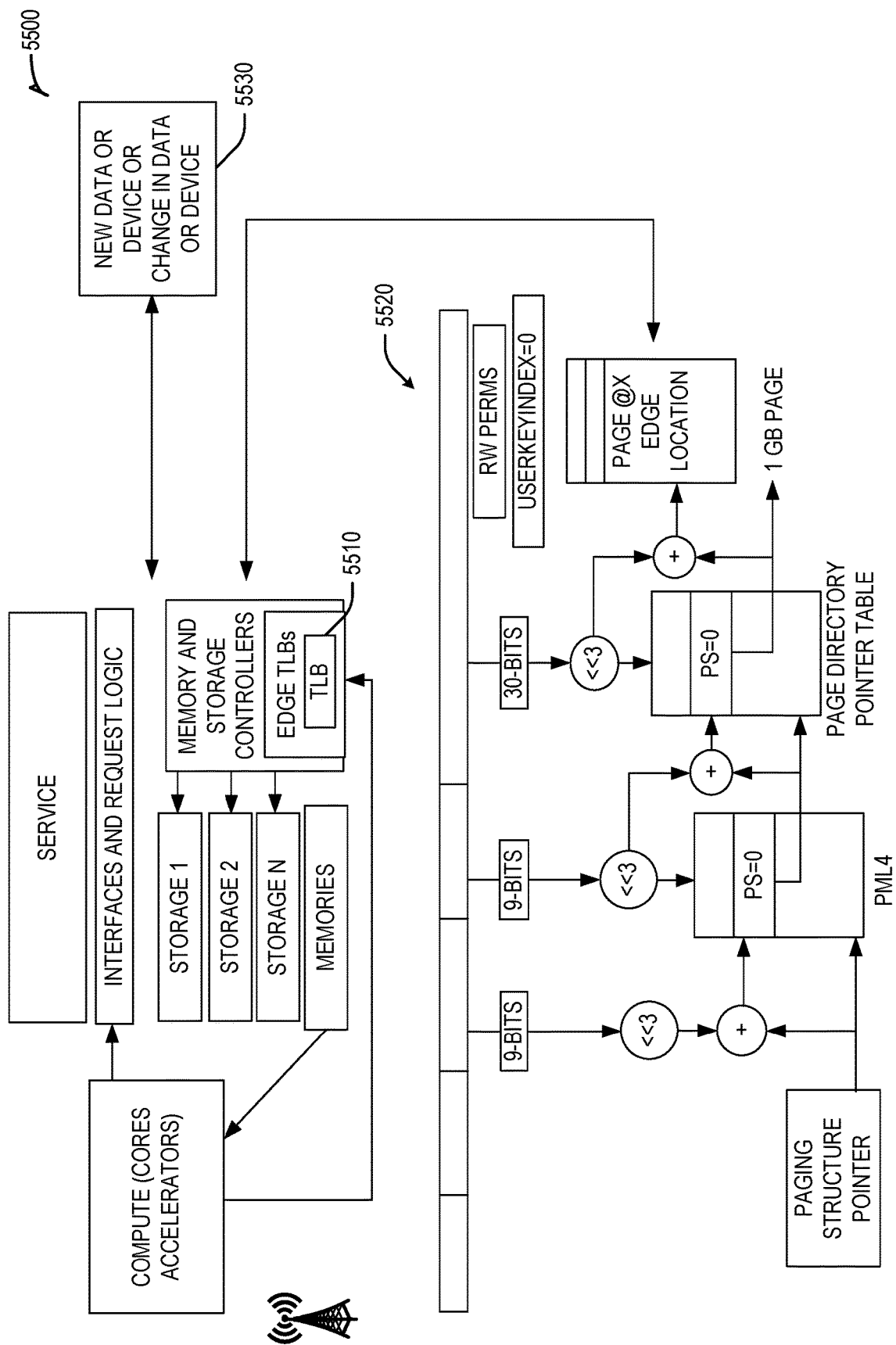
FIG. 55 illustrates a system diagram for implementing an edge service page table.

FIG. 55 illustrates a system 5500 for implementing an edge service page table. In some examples, the edge service page table may be used with the edge cloud 5010 to manage memory pages 5520 across different edge nodes and services of the edge cloud 5010 (e.g., including devices 5530). Such memory pages may be of varying or set sizes (e.g., 1 GB). For example, the compute device 5800 or the edge computing device 5850 may store data, services, or other resources for use by edge devices in the edge cloud 5010, and the data, services, or other resources may be managed using a system-wide ("global") service page table. The global service page table may be stored on the compute device 5800 or the edge computing device 5850 and at other locations in the edge cloud 5010 (or, at a compute resource such as the edge resource node 5240, such as implemented in a distributed database accessible to the core data center 5250). In an example, the global service page table may be stored at a device of the core data center 5250 or a device of the edge cloud 5010 (e.g., a server of a cloud data center).

Page tables are used at platform or CPU level to identify the rights of applications to access to certain memory pages. A page table (or similar structure) may be used in the edge context to track what edge resources or services are accessible to a given user or tenant. Each edge location may have a tree-based structure with the following hierarchy. The root of the tree==>list of services==>list of providers==>list for tenants or devices that have privileges to execute services. In further examples, the list of providers can include configuration options for hardening the workload that are available to the provider. (For example, VM, secure (e.g., SGX) enclave, VM+Enclave, Container, Container+Enclave, VMM, VMM+Enclave, OS, FPGA, FPGA+AFU, etc). Further, the workload combinations that include Intel software guard extensions (SGX) or like technologies (e.g., other trusted execution or trusted computing technologies applicable to x86, ARM, or other architectures) could use the hardened security environment to check and enforce the expected combination. Various adaptation or modification of the trusted execution, CPU, or platform hardware may be utilized to enable management of the address spaces.

In an example, the tree for tracking the pages may be a virtual tree that is managed by a hardware entity (e.g., a FPGA). When a tenant wants to execute a Service A from a given Edge Service Provider the tenant may navigate through the tree hierarchy until reaching the leaf that contains the permissions that the given tenant resource, device, storage, unit of compute, or unit of comms/network is located. In an example, there is a service that is a front end to the tenant resource, which may include the resource (e.g., it may include a type of metadata, such as available SLA etc.). In the case of a translation lookaside buffer (TLB) lookup miss in any of the three layers, (similar to processes for PT), a page walk may be performed to target the increasingly centralized repository (such as with the central office or core of the network) to retrieve the particular permissions of that service for that user.

In an example, resource allocations may be performed as well. Using the page table as an example, having a page table may include three things: (1) a differentiation between legitimate and illegitimate addresses (e.g., validity fault vs. segmentation error), (2) an access control (e.g., R/W and other bits like PKEYs), and (3) a materialization or generation of resources available when needed (e.g., handling a fault). All three have analogs in the resource management side, for example, (1) a service may be denied certain resources and allowed potential access to others, (2) a service may be given varying fractions of a resource it may indeed have access to, so the navigation of this multilevel walk can also be a control point, and (3) a service may only be given resources when it actually needs them.

This approach differs from a centralized directory approach (such as LDAP) in that tenant access privileges may be cached hierarchically according to a scheme that places a root cache at a core data center and multiple copies at the base-station or on-premise edge nodes as well as points in between.

The tenant SLA/SLO and orchestration context may be used to proactively warm the caches based on expected location, collaborations, or workloads. Frequent hits to the cache keep the cached content 'warm' for subsequent requests.

The endpoint device, host, or service may participate in the caching scheme using local storage resources. For example, local access requests need not leave the local platform (which may involve network latency). In an example, access context may be cached within the set of resources allocated to a particular tenant. For example, if the platform supports memory encryption (e.g., Intel® MKTME™), the encryption user key resource may be used to contain keys otherwise cached by the TLB caches. Other tenant-specific resource isolation schemes may be applied a per-platform or per-service basis. For example, persistent storage, function acceleration, CPU allocation, memory partitioning, virtualization, peripheral affinity, or IoT device network partitioning may have tenant-specific partitioning capabilities.

Changes to access policy, such as revocation of a key or adding permissions to access an additional resource are potentially susceptible to privilege escalations or denial of service due to cached context becoming stale. The system 5500 uses a publish-subscribe or an information centric networking (ICN) configuration to allow updates to the resource to be applied uniformly to all cached copies simultaneously based on the policy that caches become subscribers to the tenant specific context topic. In an example, warm caches subscribe with high QoS requirements to ensure timely updates for resource access requests that occur locally.

When new data or a new device is added to the edge data-lake, a particular access restriction to edge services may be applied. This information may be multicasted to the edge or edges participating in the same data-lake of data or devices. Changes on existing data or devices may be multicasted to another edge or other edges sharing the data or devices. In an example, a particular edge location (e.g., @X location in system 5500) may be assigned to data or a function hosted within a particular edge device. The Edge TLB 5510 may check whether a corresponding service has rights to access the device or data or location within the edge device.

Moreover, in some embodiments, the compute-in-storage functionality described throughout this disclosure may be leveraged throughout system 5500 in order to reduce latency associated with data storage, retrieval, and computation.

FIG. 56 illustrates an implementation of edge global service page table 5610. The edge global service page table 5610 illustrates virtual addresses and corresponding physical addresses. The physical addresses of edge global service page table 5610 may include an edge device and a physical address in memory on that particular edge device.

The edge global service page table 5610 includes both local and remote memory addresses. When the edge global service page table 5610 indicates that the memory address is not local (e.g., to the edge device operating a service or hosting the tenant), the edge global service page table 5610 may send a read to a remote network interface to obtain remote memory access at the remote device. In response to the remote memory access being granted, the device may be given a location of the physical address or write access. In further examples, if a remote node is down, the system may include a replica of that service to implement resiliency (based on the data included in the page table), as the request is sent to the other replica, otherwise an error is generated to the SW stack.

In an example, other attributes may be considered during remote access, such as security requirements by the device. In this example, sending back to the original platform may require sending in a secured manner. Another example attribute may require adding extra data to the request, such as referring to authentication information in the remote memory (e.g., when the remote memory data is secure). An access policy may have metadata with a characteristic that indicates how much bandwidth to allocate or how much latency is needed. When the remote data is returned to the local node, those characteristics may be required.

In a further example, a method for implementing an edge global service page table may be implemented according to the following operations (e.g., such as implemented on or by node or device 5800, 5840, or 5850). The method includes a first operation to maintain an edge global service page table configured to map virtual addresses to physical addresses on a plurality of edge nodes. The method includes a second operation to receive a request for access to a virtual memory address maintained in the edge global service page table. In an example the virtual memory address corresponds to an edge service. The method includes a third operation to identify a physical address and an edge node associated with the virtual memory address. In an example, the edge node is a remote edge node from a local node initiating the request. The method concludes with an operation to provide access to a resource corresponding to the physical address on the edge node. In an example, the resource may include data stored at the physical address on the edge node, a service operating at the physical address on the edge node, or a location of the physical address on the edge node.

A first example (Example F1) for implementing an edge service page table is a device, comprising: processing circuitry; and memory including instructions embodied thereon, wherein the instructions, when executed by the processing circuitry, configure the processing circuitry to perform operations for managing resources on edge devices comprising: maintaining an edge global service page table configured to map virtual addresses to physical addresses on a plurality of edge nodes; receiving a request for access to a resource at a virtual memory address maintained in the edge global service page table; identifying a physical address and a corresponding edge node associated with the virtual memory address; providing access to the resource stored at the physical address.

In a second example (Example F2), the subject matter of Example F1 includes, providing access to the resource by sending information including the physical address and the corresponding edge node to a requesting device or service.

In a third example (Example F3), the subject matter of Examples F1-F2 includes, providing access to the resource by facilitating a copy or transfer of the resource to a requesting edge node from the corresponding edge node.

In a fourth example (Example F4), the subject matter of Examples F1-F3 includes, prior to providing access to the resource, the instructions configure the processing circuitry to perform an operation comprising determining whether a requesting device has authorization to access the resource by checking the edge global service page table.

In a fifth example (Example F5), the subject matter of Examples F1-F4 includes, wherein the device is an edge node of the plurality of edge nodes, and wherein the edge global service page table is stored locally on the edge node.

In a sixth example (Example F6), the subject matter of Examples F1-F5 includes, wherein providing access to the resource includes sending a read to a remote network interface to obtain remote memory access at the corresponding edge node.

In a seventh example (Example F7), the subject matter of Examples F1-F6 includes, wherein providing access to the resource includes respecting a security requirement of the resource, the corresponding edge node, or a requesting device.

In various settings, Examples F1-F7 (and other aspects of a global page table) may be observed or monitored as a result of, defined application programming interfaces, or interface specifications; uses of protocols or definitions to invoke or modify the page table; and other uses and implementations of page table across multiple devices within an edge computing environment. Examples F1-F7 and other aspects of this global page configuration may also be observed or implemented as a result of service operations and service functions (e.g., to share pages and data structures in FaaS, or EaaS settings). Additionally, the methods of examples F1-F7 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples F1-F7 (and other features of global page configuration and use) may be combined with any of the other Examples herein to configure an edge cluster or edge cloud system, as coordinated or designed by a system orchestrator or architect.

Data Aggregation Policy Examples

Edge cloud infrastructures may be used to store data from multiple sources. The data may be collected and optionally combined at an edge device. Sharing data resources in edge locations may give rise to tenant or user privacy issues. The following example systems and methods address these and other issues in the data supply chain of an edge computing system (e.g., edge cloud 5010, and the edge computing system configurations described and depicted throughout this disclosure), particularly those related to privacy by allowing for aggregation of data. Data aggregation or processing at an edge device is useful for conserving power at low power devices (e.g., IoT devices) or for providing computing for sensors without compute power or without compute capabilities.

The following examples are relevant to aggregating many types of data at an edge device. Devices, such as IoT devices, cars, drones, mobile phones, sensors, and the like produce data, often for particular purposes. This data may be useful beyond its immediate purpose, but collection, maintenance, and evaluation of the data may be difficult on the devices.

For instance, a mobile device (e.g., autonomous car, drone, phone, etc.) may collect a lot of sensor data but may have limited compute power to process the sensor data. The mobile device may collect the data for a specific task (e.g., to keep the car on the road). The data may then become useless to the mobile device, such as after a task has been fulfilled (e.g., when the car has passed a crossing, it may delete sensor data about the crossing). The edge processing node (e.g., base station, small cell etc.) has more compute power and may receive data from multiple devices, including these mobile devices.

An edge device may combine sensor data from multiple devices. For example, the edge device may receive data from a plurality of devices of a similar type (e.g., a car) and aggregate that data. In another example, different devices may provide data that is aggregated at the edge device. For example, an edge device may use aggregated data to create a 3D model of an area by combining video shootings from multiple cameras (e.g., in different cars or drones). The aggregation of data may avoid issues with individual device data (e.g., when one car observes a slippage on a wheel, it may be an error of measurement). Using aggregated data, for example, several cars may observe a slippage at the same location, which indicates that the road is slippery at that location.

Figure 57:
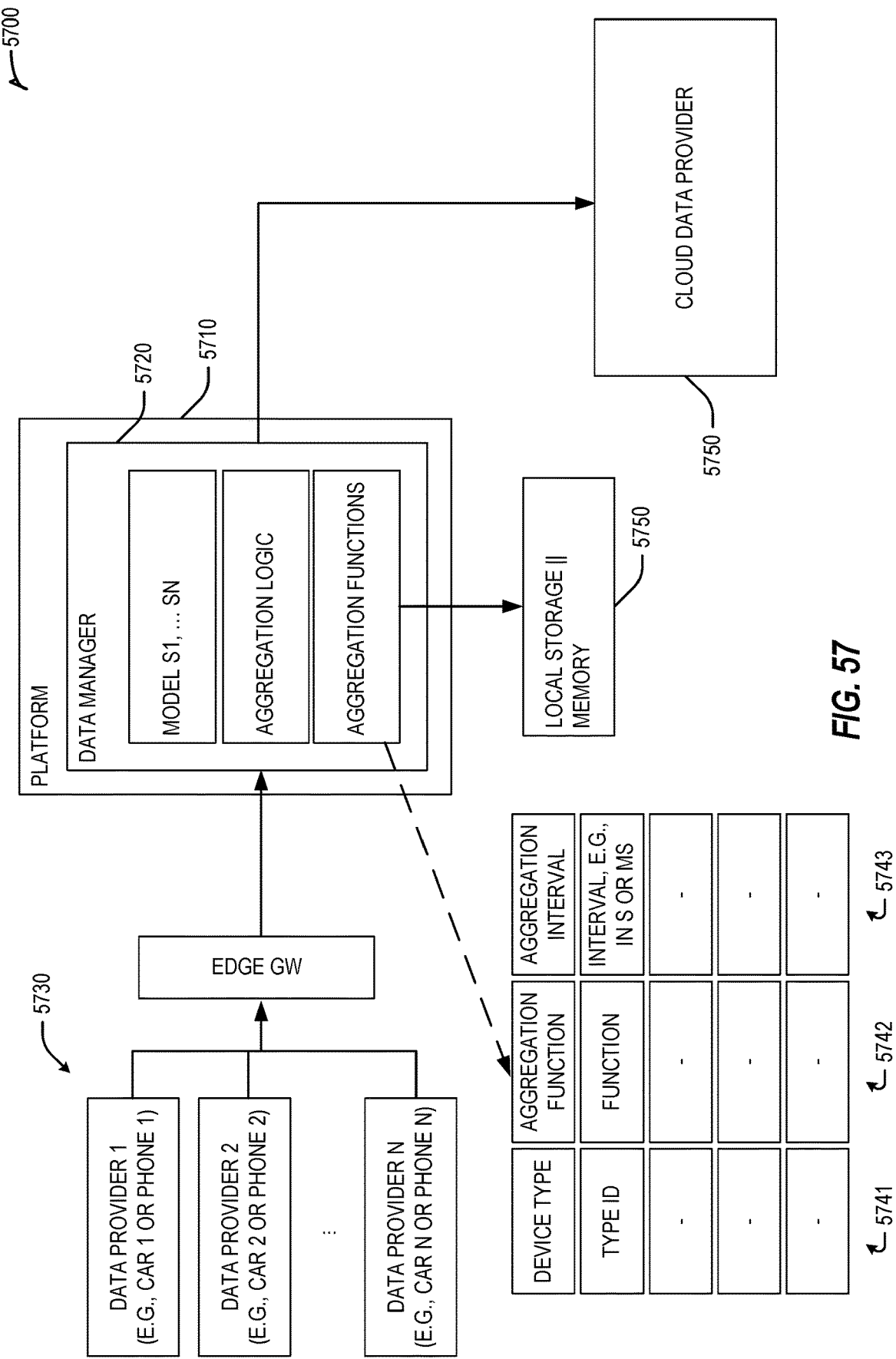
FIG. 57 illustrates a system diagram of an architecture for aggregating data at an edge device.

FIG. 57 illustrates a diagram of a system 5700 including an architecture for aggregating data at an edge device in accordance with some examples.

The system 5700 includes different elements of an edge architecture used to aggregate data from data provider devices 5730. The system 5700 includes a platform 5710 having instructions (e.g., implementing algorithms, logic, etc.) responsible for storing and registering aggregation functions, for example within a data manager component 5720. The registration interface allows for registration of a transformation function. A transformation function may include a type of device 5741 or sensor to which the function applies (e.g., a sensor type may include a temperature measured at a car).

The system 5700 may include the aggregation function itself 5742. For example, given a list of data sets from the edge device, the aggregation function 5742 may perform a computation and generate a single value to be stored or sent to the cloud data provider 5750.

The system 5700 may include an interval of aggregation 5743. This interval 5743 indicates how many units of time the aggregator has available to store data for that device type id before performing the computation (e.g., over a time interval, such as a second, a minute, etc.). In another example, the interval of aggregation may include a number of times data is received instead of or in addition to a time unit.

The system 5700 includes an interface that is used by the devices 5730 to send data to the aggregator. The aggregation logic may be responsible to implement interfaces (e.g., the interface used by the devices to send data to the aggregator or the interface with the cloud data provider). Aggregation functions can be local storage memory enforcement points where a local storage memory 5750 contains or provides a security policy for protecting/obfuscating privacy sensitive content using aggregation. (Thus, even if the user did not request aggregation, the local storage memory 5750 can apply aggregation to protect privacy). Moreover, in some embodiments, the local storage memory 5750 may leverage the compute-in-storage functionality described throughout this disclosure in order to reduce latency associated with data storage, retrieval, and computation.

The computing context (e.g., context such as sensor type, historical trend data of the same source or comparable sources, data source comparison values, or other values that may indicate a sense of trust) may be used to determine trust of the data received. For example, data that is supplied by a sensor that is "close" to the data being sensed may be more reliable or trustworthy than data from a sensor less "close." Being "close" in this context may be a physical property, or may be a connectedness property (e.g., whether the sensor is verified to a system producing the data that is being measured by the sensor). The "closeness" to the function interpreting the data may also be a consideration in trustworthiness. The relative "closeness" of locality implies the data is more trustable than if it arrived from some place with "far" locality. In further examples, the concept of closeness may be expanded such that the distance is dependent on the type of provider (e.g., providers associated with a first organization have the distance computed with a first metric, such as 1 mile=1 mile, whereas providers associated with a second organization have the distance computed with a second metric, such as 1 mile=2 miles).

The edge device may evaluate data locality as part of a trust test. When the data is kept but is communicated back to remote nodes, the data may be treated as being less trusted. When local computation results in aggregation (e.g., for telemetry) the node may regard it as being of high integrity value. In this example, a peer node may lower its value based on its own locality test and trust semantics (e.g., trustworthiness of the first node).

In a further example, a method for aggregating data at an edge device may include the following operations (e.g., implemented by systems and devices in edge cloud 5010, such as implemented on or by node or device 5800, 5840, or 5850).

The method includes a first operation to receive, at an edge node, data from a plurality of mobile devices.

The method includes a second operation to aggregate the received data using aggregation logic of the edge node. In an example, the data may be aggregated over an interval, such as a time interval, until a specified amount of data is received (e.g., a number of transmissions or packets), or until data from a specified number of devices is received.

The method includes a third operation to generate a value based on the aggregated data and an aggregation function at the edge node.

The method includes a fourth operation to send the value to a cloud device. In an example, the value may be used to verify later received data. In another example, the value may be used to create a detailed map of an area. In yet another example, the value may be used to verify functioning of a mobile device. In still another example, the value may be used to generate usage data, provide feedback, or in security settings.

The method includes a fifth operation to determine a trustworthiness level of the received data. The trustworthiness may be output along with the value. In an example, aggregation of the data may include factoring in the trustworthiness of the received data, for example the value may be determined based on the trustworthiness.

A further example method (Example H1) for implementing and using a multi-edge data aggregation policy is a method performed using processing circuitry (e.g., of node or device 5800, 5840, or 5850), the method comprising: receiving, at an edge node, data from a plurality of mobile devices; aggregating the received data using aggregation logic of the edge node; generating a value based on the aggregated data and an aggregation function at the edge node; and sending the value to a cloud device.

In a second example (Example H2), the subject matter of Example H1 includes, aggregating the received data by aggregating the received data over an interval.

In a third example (Example H3), the subject matter of Example H2 includes, a configuration where the interval includes a time interval, a specified amount of data to be received, or a specified number of devices from which to receive the data.

In a fourth example (Example H4), the subject matter of Examples H1-H3 includes, a configuration where the value is used to verify later received data.

In a fifth example (Example H5), the subject matter of Examples H1-H4 includes, a configuration where the value is used to create a detailed map of an area.

In a sixth example (Example H6), the subject matter of Examples H1-H5 includes, a configuration where the value is used to verify functioning of a mobile device.

In a seventh example (Example H7), the subject matter of Examples H1-H6 includes, a configuration where the value is used to generate usage data, provide feedback, or in security settings.

In an eighth example (Example H8), the subject matter of Examples H1-H7 includes, determining a trustworthiness level of the received data.

In a ninth example (Example H9), the subject matter of Example H8 includes, outputting the value by outputting the trustworthiness level.

In a tenth example (Example H10), the subject matter of Examples H1-H9 includes, aggregating the received data by using the trustworthiness of the received data.

In various settings, Examples H1-H10 (and other aspects of a data aggregation policy) may be observed or monitored as a result of, defined application programming interfaces, or interface specifications; uses of protocols or definitions to invoke, receive, or control resource operations; and other uses and implementations of policies, logic, and maps (including as communicated via data transfers) within an edge computing environment. The data aggregation policy as expressed in Examples H1-H10 may also be implemented after or as part of operations conducted within a service (e.g., implemented or accomplished as part of FaaS or EaaS). Additionally, the methods of examples H1-H10 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples H1-H10 (and other features of data aggregation) may be combined with any of the other Examples herein to configure an edge cluster or edge cloud system, as coordinated or designed by a system orchestrator or architect.

Example Computing Devices

In further examples, any of the compute nodes or devices discussed with reference to the present edge computing systems and environment may be fulfilled based on the components depicted in FIGS. 58A and 58B. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 58A:
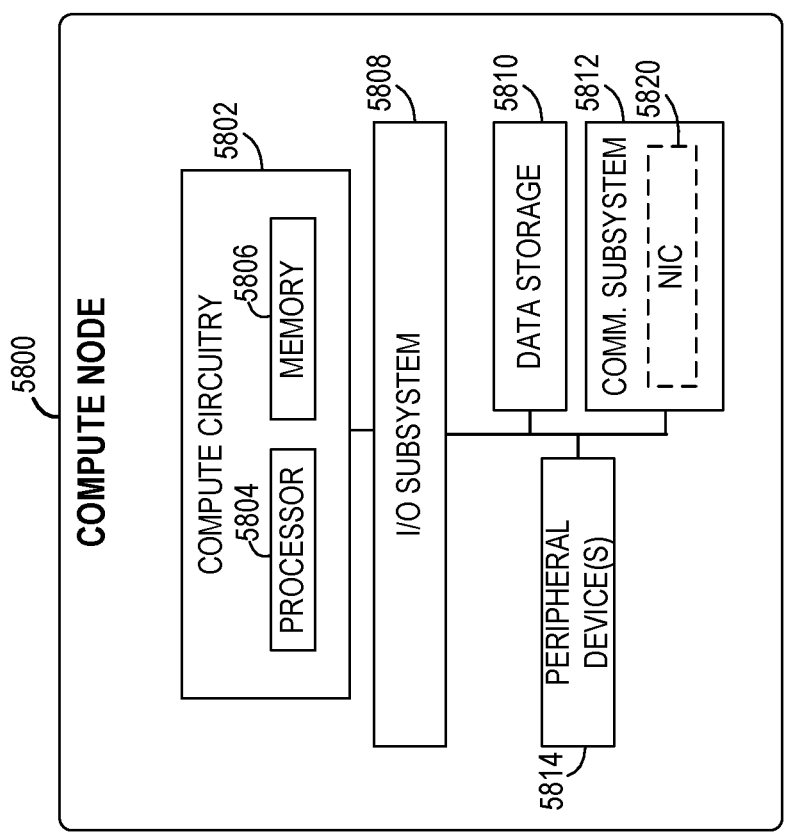
FIG. 58A illustrates an overview of example components for a compute node.

In the simplified example depicted in FIG. 58A, an edge compute node 5800 includes a compute engine (also referred to herein as "compute circuitry") 5802, an input/output (I/O) subsystem 5808, data storage 5810, a communication circuitry subsystem 5812, and, optionally, one or more peripheral devices 5814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 5800 may be embodied as any type of engine, device, or collection of devices capable of performing various compute functions. In some examples, the compute node 5800 may be embodied as a single device such as an integrated circuit, an embedded system, a field-programmable gate array (FPGA), a system-on-a-chip (SOC), or other integrated system or device. In the illustrative example, the compute node 5800 includes or is embodied as a processor 5804 and a memory 5806. The processor 5804 may be embodied as any type of processor capable of performing the functions described herein (e.g., executing an application). For example, the processor 5804 may be embodied as a multi-core processor(s), a microcontroller, or other processor or processing/controlling circuit. In some examples, the processor 5804 may be embodied as, include, or be coupled to an FPGA, an application specific integrated circuit (ASIC), reconfigurable hardware or hardware circuitry, or other specialized hardware to facilitate performance of the functions described herein.

The main memory 5806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 5806 may be integrated into the processor 5804. The main memory 5806 may store various software and data used during operation such as one or more applications, data operated on by the application(s), libraries, and drivers.

The compute circuitry 5802 is communicatively coupled to other components of the compute node 5800 via the I/O subsystem 5808, which may be embodied as circuitry and/or components to facilitate input/output operations with the compute circuitry 5802 (e.g., with the processor 5804 and/or the main memory 5806) and other components of the compute circuitry 5802. For example, the I/O subsystem 5808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 5808 may form a portion of a system-on-a-chip (SoC) and be incorporated, along with one or more of the processor 5804, the main memory 5806, and other components of the compute circuitry 5802, into the compute circuitry 5802.

The one or more illustrative data storage devices 5810 may be embodied as any type of devices configured for short-term or long-term storage of data such as, for example, memory devices and circuits, memory cards, hard disk drives, solid-state drives, or other data storage devices. Individual data storage devices 5810 may include a system partition that stores data and firmware code for the data storage device 5810. Individual data storage devices 5810 may also include one or more operating system partitions that store data files and executables for operating systems depending on, for example, the type of compute node 5800. Moreover, in some embodiments, the data storage device 5810 may leverage the compute-in-storage functionality described throughout this disclosure in order to reduce latency associated with data storage, retrieval, and computation.

The communication circuitry 5812 may be embodied as any communication circuit, device, or collection thereof, capable of enabling communications over a network between the compute circuitry 5802 and another compute device (e.g., an edge gateway node 5412 of the edge computing system 5400). The communication circuitry 5812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 5812 includes a network interface controller (NIC) 5820, which may also be referred to as a host fabric interface (HFI). The NIC 5820 may be embodied as one or more add-in-boards, daughter cards, network interface cards, controller chips, chipsets, or other devices that may be used by the compute node 5800 to connect with another compute device (e.g., an edge gateway node 5412). In some examples, the NIC 5820 may be embodied as part of a system-on-a-chip (SoC) that includes one or more processors, or included on a multichip package that also contains one or more processors. In some examples, the NIC 5820 may include a local processor (not shown) and/or a local memory (not shown) that are both local to the NIC 5820. In such examples, the local processor of the NIC 5820 may be capable of performing one or more of the functions of the compute circuitry 5802 described herein. Additionally, or alternatively, in such examples, the local memory of the NIC 5820 may be integrated into one or more components of the client compute node at the board level, socket level, chip level, and/or other levels.

Additionally, in some examples, a respective compute node 5800 may include one or more peripheral devices 5814. Such peripheral devices 5814 may include any type of peripheral device found in a compute device or server such as audio input devices, a display, other input/output devices, interface devices, and/or other peripheral devices, depending on the particular type of the compute node 5800. In further examples, the compute node 5800 may be embodied by a respective edge compute node in an edge computing system (e.g., client compute node 5402, edge gateway node 5412, edge aggregation node 5422) or like forms of appliances, computers, subsystems, circuitry, or other components.

Figure 58B:
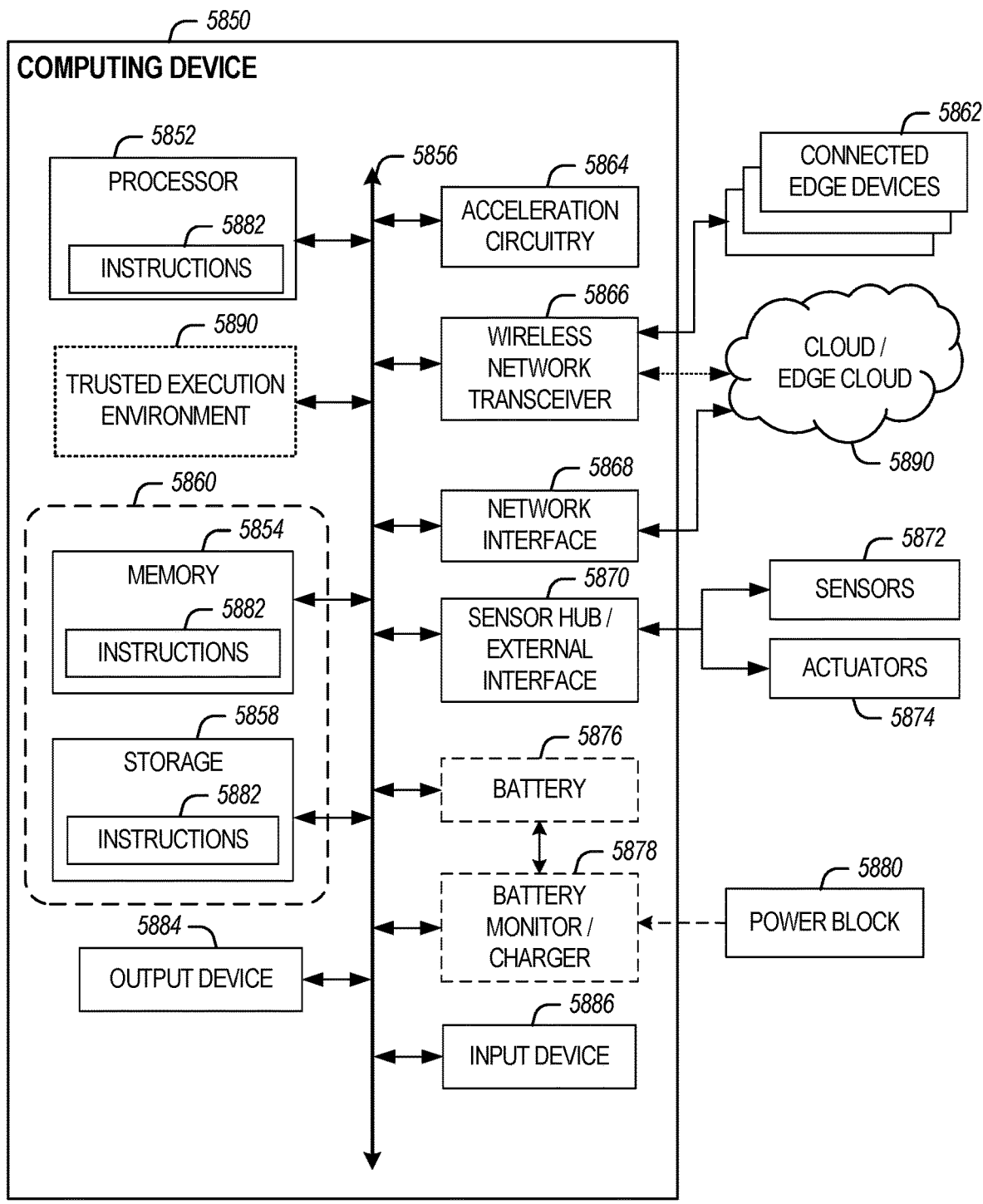
FIG. 58B illustrates a further overview of example components within a computing device.

In a more detailed example, FIG. 58B illustrates a block diagram of an example of components that may be present in an edge computing node 5850 for implementing the techniques (e.g., operations, processes, methods, and methodologies) described herein. This edge computing node 5850 provides a closer view of the respective components of node 5800 when implemented as or as part of a computing device (e.g., as a mobile device, a base station, server, gateway, etc.). The edge computing node 5850 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 5850, or as components otherwise incorporated within a chassis of a larger system.

The edge computing device 5850 may include processing circuitry in the form of a processor 5852, which may be a microprocessor, a multi-core processor, a multithreaded processor, an ultra-low voltage processor, an embedded processor, or other known processing elements. The processor 5852 may be a part of a system on a chip (SoC) in which the processor 5852 and other components are formed into a single integrated circuit, or a single package, such as the Edison™ or Galileo™ SoC boards from Intel Corporation, Santa Clara, California. As an example, the processor 5852 may include an Intel® Architecture Core™ based processor, such as a Quark™, an Atom™, an i3, an i5, an i7, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 5852 may communicate with a system memory 5854 over an interconnect 5856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 5858 may also couple to the processor 5852 via the interconnect 5856. In an example, the storage 5858 may be implemented via a solid-state disk drive (SSDD). Other devices that may be used for the storage 5858 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 5858 may be on-die memory or registers associated with the processor 5852. However, in some examples, the storage 5858 may be implemented using a micro hard disk drive (HDD). Further, any number of new technologies may be used for the storage 5858 in addition to, or instead of, the technologies described, such resistance change memories, phase change memories, holographic memories, or chemical memories, among others.

Moreover, in some embodiments, storage 5858 may leverage the compute-in-storage functionality described throughout this disclosure in order to reduce latency associated with data storage, retrieval, and computation. For example, storage 5858 may leverage an associated controller, processor (e.g., 5852), and/or accelerator (e.g., acceleration circuitry 5864) to perform certain compute tasks on data stored on storage 5858.

The components may communicate over the interconnect 5856. The interconnect 5856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 5856 may be a proprietary bus, for example, used in an SoC based system. Other bus systems may be included, such as an I2C interface, an SPI interface, point to point interfaces, and a power bus, among others.

The interconnect 5856 may couple the processor 5852 to a transceiver 5866, for communications with the connected edge devices 5862. The transceiver 5866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 5862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 5866 (or multiple transceivers) may communicate using multiple standards or radios for communications at a different range. For example, the edge computing node 5850 may communicate with close devices, e.g., within about 10 meters, using a local transceiver based on BLE, or another low power radio, to save power. More distant connected edge devices 5862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 5866 (e.g., a radio transceiver) may be included to communicate with devices or services in the edge cloud 5890 via local or wide area network protocols. The wireless network transceiver 5866 may be an LPWA transceiver that follows the IEEE 802.15.4, or IEEE 802.15.4g standards, among others. The edge computing node 5850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 5866, as described herein. For example, the transceiver 5866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 5866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 5868 may be included to provide a wired communication to nodes of the edge cloud 5890 or to other devices, such as the connected edge devices 5862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 5868 may be included to enable connecting to a second network, for example, a first NIC 5868 providing communications to the cloud over Ethernet, and a second NIC 5868 providing communications to other devices over another type of network.

Given the variety of types of applicable communications from the device to another component or network, applicable communications circuitry used by the device may include or be embodied by any one or more of components 5864, 5866, 5868, or 5870. Accordingly, in various examples, applicable means for communicating (e.g., receiving, transmitting, etc.) may be embodied by such communications circuitry.

The edge computing node 5850 may include or be coupled to acceleration circuitry 5864, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 5856 may couple the processor 5852 to a sensor hub or external interface 5870 that is used to connect additional devices or subsystems. The devices may include sensors 5872, such as accelerometers, level sensors, flow sensors, optical light sensors, camera sensors, temperature sensors, global navigation system (e.g., GPS) sensors, pressure sensors, barometric pressure sensors, and the like. The hub or interface 5870 further may be used to connect the edge computing node 5850 to actuators 5874, such as power switches, valve actuators, an audible sound generator, a visual warning device, and the like.

In some optional examples, various input/output (I/O) devices may be present within or connected to, the edge computing node 5850. For example, a display or other output device 5884 may be included to show information, such as sensor readings or actuator position. An input device 5886, such as a touch screen or keypad may be included to accept input. An output device 5884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 5850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 5876 may power the edge computing node 5850, although, in examples in which the edge computing node 5850 is mounted in a fixed location, it may have a power supply coupled to an electrical grid, or the battery may be used as a backup or for temporary capabilities. The battery 5876 may be a lithium ion battery, or a metal-air battery, such as a zinc-air battery, an aluminum-air battery, a lithium-air battery, and the like.

A battery monitor/charger 5878 may be included in the edge computing node 5850 to track the state of charge (SoCh) of the battery 5876, if included. The battery monitor/charger 5878 may be used to monitor other parameters of the battery 5876 to provide failure predictions, such as the state of health (SoH) and the state of function (SoF) of the battery 5876. The battery monitor/charger 5878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 5878 may communicate the information on the battery 5876 to the processor 5852 over the interconnect 5856. The battery monitor/charger 5878 may also include an analog-to-digital (ADC) converter that enables the processor 5852 to directly monitor the voltage of the battery 5876 or the current flow from the battery 5876. The battery parameters may be used to determine actions that the edge computing node 5850 may perform, such as transmission frequency, mesh network operation, sensing frequency, and the like.

A power block 5880, or other power supply coupled to a grid, may be coupled with the battery monitor/charger 5878 to charge the battery 5876. In some examples, the power block 5880 may be replaced with a wireless power receiver to obtain the power wirelessly, for example, through a loop antenna in the edge computing node 5850. A wireless battery charging circuit, such as an LTC4020 chip from Linear Technologies of Milpitas, California, among others, may be included in the battery monitor/charger 5878. The specific charging circuits may be selected based on the size of the battery 5876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 5858 may include instructions 5882 in the form of software, firmware, or hardware commands to implement the techniques described herein. Although such instructions 5882 are shown as code blocks included in the memory 5854 and the storage 5858, it may be understood that any of the code blocks may be replaced with hardwired circuits, for example, built into an application specific integrated circuit (ASIC).

In an example, the instructions 5882 provided via the memory 5854, the storage 5858, or the processor 5852 may be embodied as a non-transitory, machine-readable medium 5860 including code to direct the processor 5852 to perform electronic operations in the edge computing node 5850. The processor 5852 may access the non-transitory, machine-readable medium 5860 over the interconnect 5856. For instance, the non-transitory, machine-readable medium 5860 may be embodied by devices described for the storage 5858 or may include specific storage units such as optical disks, flash drives, or any number of other hardware devices. The non-transitory, machine-readable medium 5860 may include instructions to direct the processor 5852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 58C:
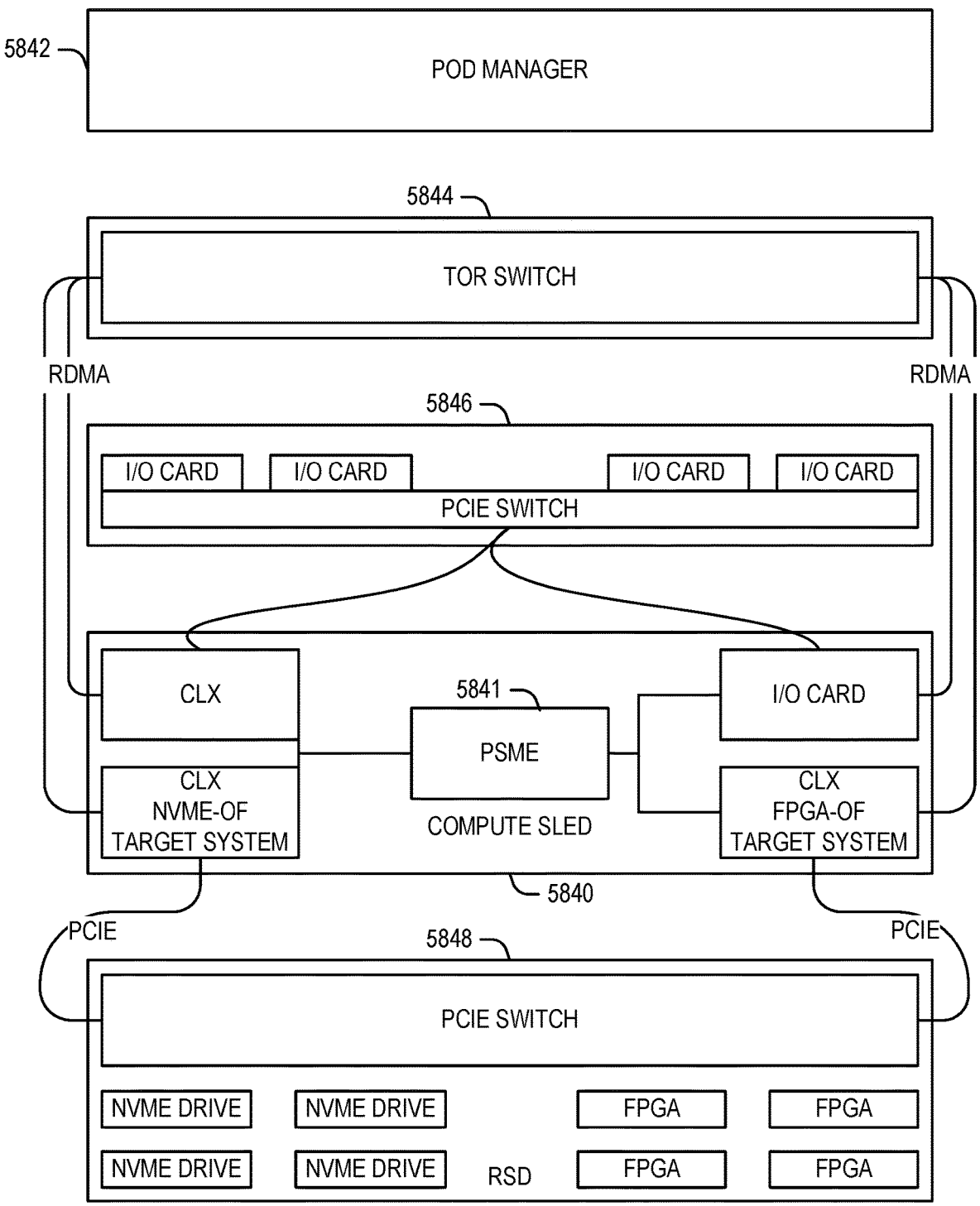
FIG. 58C illustrates an overview of example components within a configurable server rack.

FIG. 58C illustrates Rack Scale Design (RSD) components that may be included a part of a server or other discrete compute node in an edge platform architecture. This arrangement provides a closer view of the configurable processing components of node 5800 or device 5850 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible network functions. This architecture enables scaling network interfaces according to the expected data rate or network load for a particular virtual network function (VNF). This architecture also enables flexibility to map different network cards to compute nodes depending on the type of network processing happening at a given node.

The illustrated RSD architecture includes a point of delivery (POD) Manager 5842. The POD Manager 5842 is responsible of managing the resources—including compute and disaggregated resources—within a POD (e.g., one or more racks). The POD Manager 5842 exposes interfaces to an orchestrator in order to create, manage, or destroy composed nodes. Managing a composed node includes the feature of scaling up or down the amount of pooled resources 5848 connected to a particular compute sled 5840. The POD Manager 5842 typically runs on a node controller. The POD Manager 5842 is responsible for discovery of resources in the POD, configuring and managing the resources, and composing a logical server. In an example, the POD Manager 5842 is an optional separate component and will not be required in-rack. However, in an example, to be "RSD conformant" a Rack is manageable by a certified POD Manager.

The following are some example attributes of a POD Manager 5842. For example, a rack may include a set of compute sleds 5840 used to execute edge services and other related system software stacks (e.g., such as orchestration or other system services). One type of compute sled 5840 may be a Pooled Resources Sled. This compute sled 5840 may manage a set of disaggregated resources. Here, a compute sled 5840 may include a pooled System Management Engine software (PSME) 5841. The PSME 5841 provides a management interface to manage the modules or blades at a drawer level. In an example, a rack contains one or more logical PSME(s). For example, each drawer may have a PSME or server drawers may share a PSME, or a PSME may run on a top-of-rack (TOR) 5844 switch or on a separate host. In an example, the PSME 5841 supports the RSD APIs.

In an example, the compute sled 5840 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 5846 providing access to the target resources (FPGA or NVME in the RSD 5848).

Various RSD edge-composed node flavors may be used in the compute sled 5840 to run edge services. Services running on those nodes may use client software libraries or drivers to provide transparent access to the disaggregated FPGAS and NVME in the RSD 5848. In a further example, the rack includes one or more PCIE switches connecting the compute sleds 5840 to a set of disaggregated resources (e.g., RSD 5848).

The block diagrams of FIGS. 58A, 58B, and 58C are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 58A, 58B, and 58C may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLE IMPLEMENTATIONS

The following examples pertain to embodiments described throughout this disclosure.

One or more embodiments may include a system (e.g., systems 100, 400 of FIGS. 1, 4), comprising: a host processor (e.g., processors 106, 402); and a storage system comprising one or more storage devices (e.g., block storage devices 104, 452), wherein the one or more storage devices each comprise: a non-volatile memory to store data (e.g., NVM 120, 456); and a compute offload controller to perform compute tasks on the data based on compute offload commands from the host processor (e.g., compute offload controllers 122, 454).

In one example embodiment of a system (e.g., systems 100, 400, 1100 of FIGS. 1, 4, 11): the one or more storage devices comprises a plurality of storage devices (e.g., block storage devices 104 and 452, storage nodes/targets of system 1100); and the host processor (e.g., processors 106 402, host processor of system 1100) is to: receive a request to perform a compute task on a data object stored on the storage system, wherein the data object is replicated on each storage device of the plurality of storage devices; identify a plurality of chunks of the data object to be processed in parallel on the storage system, wherein the compute task is to be performed on the plurality of chunks by the plurality of storage devices; and send a plurality of compute offload commands to the plurality of storage devices, wherein each compute offload command is to instruct a corresponding storage device to perform the compute task on a corresponding chunk of the plurality of chunks.

In one example embodiment of a system (e.g., systems 100, 400, 1100 of FIGS. 1, 4, 11): the one or more storage devices comprises a plurality of storage devices (e.g., block storage devices 104 and 452, storage nodes/targets of system 1100); and the host processor (e.g., processors 106 and 402, host processor of system 1100) is to: receive a request to perform a compute task on a data object stored on the storage system, wherein the data object is striped across the plurality of storage devices; identify a plurality of shards of the data object on the plurality of storage devices, wherein each shard comprises a contiguous portion of the data object stored on one of the plurality of storage devices; and send a plurality of compute offload commands to the plurality of storage devices, wherein each compute offload command is to instruct a corresponding storage device to perform the compute task on a corresponding shard stored on the corresponding storage device (e.g., a storage node/target of system 1100).

In one example embodiment of a system (e.g., systems 100, 400, 2600, 2800 of FIGS. 1, 4, 26, 28): the one or more storage devices comprises a plurality of storage devices (e.g., block storage devices 104 and 452, storage nodes/targets of systems 2600, 2800); and the host processor (e.g., processors 106 and 402, host processor of systems 2600, 2800) is to: receive a request to perform a compute task on a data object stored on the storage system, wherein the data object is erasure coded across the plurality of storage devices; determine that the storage system is operating in a degraded mode, wherein the degraded mode indicates that the plurality of storage devices comprises a set of available storage devices and a set of unavailable storage devices; identify a set of available chunks of the data object on the set of available storage devices; identify a set of unavailable chunks of the data object on the set of unavailable storage devices; partition the set of available storage devices into a set of normal mode storage devices and a set of degraded mode storage devices; send a first set of compute offload commands to the set of normal mode storage devices, wherein the first set of compute offload commands is to instruct the set of normal mode storage devices to perform the compute task on the set of available chunks; and send a second set of compute offload commands to the set of degraded mode storage devices, wherein the second set of compute offload commands is to instruct the set of degraded mode storage devices to reconstruct the set of unavailable chunks and perform the compute task on a corresponding set of reconstructed chunks.

In one example embodiment of a system (e.g., systems 100, 400 of FIGS. 1, 4): the one or more storage devices (e.g., block storage devices 104, 452) comprises a plurality of storage devices (e.g., storage nodes/targets of system 1100); and the host processor (e.g., processors 106 and 402, host processor of system 1100) is to: receive a request to write a set of image objects to the storage system; partition the set of image objects into a plurality of chunks, wherein each chunk of the plurality of chunks comprises one or more image objects from the set of image objects, and wherein the plurality of chunks is padded such that each image object from the set of image objects is aligned within boundaries of a corresponding chunk of the plurality of chunks; write the plurality of chunks to the storage system, wherein each chunk is to be written to a corresponding storage device of the plurality of storage devices; receive a request to perform a visual compute task on the set of image objects; and send a plurality of compute offload commands to the plurality of storage devices, wherein each compute offload command is to instruct a corresponding storage device to perform the visual compute task on a corresponding subset of image objects from the set of image objects, wherein the corresponding subset of image objects is stored on the corresponding storage device.

In one example embodiment of a system (e.g., systems 100, 400, 3000 of FIGS. 1, 4, 30), the host processor (e.g., processors 106, 402) is to: receive a request to perform a plurality of chained compute tasks on a data object stored on the storage system (e.g., block storage target of system 3000), wherein the data object is stored on a corresponding storage device (e.g., block storage target of system 3000) of the one or more storage devices; send a chained compute offload command to the corresponding storage device, wherein the chained compute offload command is to instruct the corresponding storage device to perform the plurality of chained compute tasks on the data object; and receive a result of the chained compute offload command from the corresponding storage device.

In one example embodiment of a system (e.g., systems 100, 400, 3600 of FIGS. 1, 4, 36), the host processor (e.g., processors 106, 402, host machine of system 3600) is to: receive a request to perform a data ageing compute task on a data object stored on the storage system (e.g., storage machine of system 3600), wherein the data object is stored on a corresponding storage device (e.g., block storage target of system 3600) of the one or more storage devices; send a data ageing compute offload command to the corresponding storage device, wherein the data ageing compute offload command is to instruct the corresponding storage device to perform the data ageing compute task on the data object; and receive a result of the data ageing compute offload command from the corresponding storage device.

In one example embodiment of a system (e.g., systems 100, 400 of FIGS. 1, 4), the host processor (e.g., processors 106, 402) is to: receive a request to perform a cyclic redundancy check (CRC) verification on a data object stored on the storage system (e.g., block storage devices 104, 452), wherein the data object is stored on a corresponding storage device of the one or more storage devices (e.g., block storage devices 104, 452); send a CRC compute offload command to the corresponding storage device, wherein the CRC compute offload command is to instruct the corresponding storage device to perform the CRC verification on the data object; and receive a result of the CRC compute offload command from the corresponding storage device.

In one example embodiment of a system (e.g., systems 100, 400, 4400 of FIGS. 1, 4, 44), the one or more storage devices comprises a NAND storage device (e.g., NVM 120, 456, storage target of system 4400), wherein the NAND storage device is to: receive a write command from the host processor (e.g., processors 106, 402), wherein the write command is to instruct the NAND storage device to perform a write operation to write a data object to the NAND storage device; identify a plurality of input/output (I/O) features associated with the write operation, wherein the plurality of I/O features is to indicate a timestamp, a type of data, and an application name; predict a lifetime of the data object based on a machine learning model, wherein the machine learning model is trained to predict the lifetime of the data object based on the plurality of I/O features; select a corresponding block on the NAND storage device for storing the data object, wherein the corresponding block is selected from a plurality of blocks on the NAND storage device based on the lifetime of the data object; and write the data object to the corresponding block on the NAND storage device.

In one example embodiment of a system (e.g., systems 100, 400 of FIGS. 1, 4): the storage system further comprises a cache; and the host processor (e.g., processors 106, 402) is to: identify a cache eviction policy for a set of data classes, wherein the cache eviction policy indicates a priority in which each data class of the set of data classes is to be evicted from the cache; identify a set of cache allocation policies to evaluate based on the cache eviction policy, wherein each cache allocation policy is to allocate a different subset of the set of data classes to the cache; evaluate a performance of the cache for a first subset of cache allocation policies from the set of cache allocation policies, wherein a first set of performance indicators is obtained for the first subset of cache allocation policies based on evaluating the performance of the cache; evaluate a plurality of curve fitting models on the first set of performance indicators; identify an optimal curve fitting model for the first set of performance indicators, wherein the optimal curve fitting model is identified from the plurality of curve fitting models evaluated on the first set of performance indicators; predict the performance of the cache for a second subset of cache allocation policies from the set of cache allocation policies, wherein a second set of performance indicators is predicted for the second subset of cache allocation policies based on the optimal curve fitting model for the first set of performance indicators; select an optimal cache allocation policy from the set of cache allocation policies, wherein the optimal cache allocation policy is selected based on the first set of performance indicators and the second set of performance indicators; and configure the cache based on the cache eviction policy and the optimal cache allocation policy.

One or more embodiments may include a storage device (e.g., block storage devices 104, 452), comprising: a non-volatile memory (e.g., NVM 120, 456) to store data; and a compute offload controller (e.g., compute offload controllers 122, 454) to perform compute tasks on the data based on compute offload commands from a host processor (e.g., processors 106, 402).

One or more embodiments may include at least one non-transitory machine-readable storage medium (e.g., storage medium 502) having instructions stored thereon (e.g., instructions 504), wherein the instructions, when executed on a machine (e.g., systems 100, 400), cause the machine to: receive, via a compute offload controller (e.g., compute offload controllers 122, 454) of a storage device (e.g., block storage devices 104, 452), compute offload commands from a host processor (e.g., processors 106, 402); and perform, via the compute offload controller, compute tasks on data based on the compute offload commands from the host processor, wherein the data is stored on a non-volatile memory (e.g., NVM 120, 456) of the storage device.

One or more embodiments may include a method, comprising: receiving, via a compute offload controller (e.g., compute offload controllers 122, 454) of a storage device (e.g., block storage devices 104, 452), compute offload commands from a host processor (e.g., processors 106, 402); and performing, via the compute offload controller, compute tasks on data based on the compute offload commands from the host processor, wherein the data is stored on a non-volatile memory (e.g., NVM 120, 456) of the storage device.

What is claimed is:

1. A storage device, comprising:
a non-volatile storage medium; and
processing circuitry to:
receive, via interface circuitry, a chained compute offload command from a host computing device, wherein the chained compute offload command instructs the storage device to perform a plurality of chained compute operations on an input data object stored on the non-volatile storage medium, wherein the chained compute operations include different types of compute operations;
read the input data object from the non-volatile storage medium;
perform the plurality of chained compute operations on the input data object, wherein an output data object is computed based on performing the plurality of chained compute operations; and
return the output data object as an output of the chained compute offload command.

2. The storage device of claim 1, wherein the chained compute offload command comprises:
an input parameter indicating a first location of the input data object on the non-volatile storage medium;
an operation chain parameter indicating the chained compute operations to be performed on the input data object and an order in which the chained compute operations are to be performed; and
an operation arguments parameter indicating one or more arguments for the respective chained compute operations.

3. The storage device of claim 2, wherein the chained compute offload command further comprises:
an output parameter indicating how the output data object is to be returned.

4. The storage device of claim 3, wherein:
the output parameter indicates that the output data object is to be written to the non-volatile storage medium; and
the processing circuitry to return the output data object as the output of the chained compute offload command is further to:
write the output data object to a second location on the non-volatile storage medium; and
send, via the interface circuitry, an address of the second location to the host computing device.

5. The storage device of claim 4, wherein the second location comprises a pre-allocated output buffer on the non-volatile storage medium.

6. The storage device of claim 3, wherein:
the output parameter indicates that the output data object is to be written to a second location on the non-volatile storage medium; and
the processing circuitry to return the output data object as the output of the chained compute offload command is further to:
write the output data object to the second location on the non-volatile storage medium.

7. The storage device of claim 3, wherein:
the output parameter indicates that the output data object is to be sent to the host computing device; and
the processing circuitry to return the output data object as the output of the chained compute offload command is further to:
send, via the interface circuitry, the output data object to the host computing device.

8. The storage device of claim 2, wherein the processing circuitry to perform the plurality of chained compute operations on the input data object is further to:
perform the plurality of chained compute operations based on the order indicated by the operation chain parameter and the one or more arguments indicated by the operation arguments parameter;
compute a plurality of intermediate outputs of the plurality of chained compute operations, wherein each intermediate output of a particular chained compute operation is input to a corresponding subsequent chained compute operation based on the order indicated by the operation chain parameter; and
compute the output data object based on the plurality of intermediate outputs.

9. The storage device of claim 8, wherein the processing circuitry to compute the plurality of intermediate outputs of the plurality of chained compute operations is further to:
write at least a subset of the plurality of intermediate outputs to a buffer pool on the non-volatile storage medium; and
return an address of each intermediate output in the buffer pool to the corresponding subsequent chained compute operation.

10. The storage device of claim 1, wherein:
- the non-volatile storage medium comprises a non-volatile memory; and
- the storage device is a block storage device, wherein the block storage device is to provide block-based storage on the non-volatile memory.

11. At least one non-transitory machine-readable medium having instructions stored thereon, wherein the instructions, when executed on processing circuitry of a storage device, cause the processing circuitry to:
- receive, via interface circuitry, a chained compute offload command from a host computing device, wherein the chained compute offload command instructs the storage device to perform a plurality of chained compute operations on input data stored on a non-volatile storage medium of the storage device, wherein the chained compute operations include different types of compute operations;
- read the input data from the non-volatile storage medium;
- perform the plurality of chained compute operations on the input data, wherein output data is computed based on performing the plurality of chained compute operations; and
- return the output data as an output of the chained compute offload command.

12. The at least one non-transitory machine-readable medium of claim 11, wherein the chained compute offload command comprises:
- an input parameter indicating a first location of the input data on the non-volatile storage medium;
- an operation chain parameter indicating the chained compute operations to be performed on the input data and an order in which the chained compute operations are to be performed; and
- an operation arguments parameter indicating one or more arguments for the respective chained compute operations.

13. The at least one non-transitory machine-readable medium of claim 12, wherein the chained compute offload command further comprises:
- an output parameter indicating how the output data is to be returned.

14. The at least one non-transitory machine-readable medium of claim 13, wherein:
- the output parameter indicates that the output data is to be written to the non-volatile storage medium; and
- the instructions that cause the processing circuitry to return the output data as the output of the chained compute offload command further cause the processing circuitry to:
  - write the output data to a second location on the non-volatile storage medium; and
  - send, via the interface circuitry, an address of the second location to the host computing device.

15. The at least one non-transitory machine-readable medium of claim 14, wherein the second location comprises a pre-allocated output buffer on the non-volatile storage medium.

16. The at least one non-transitory machine-readable medium of claim 13, wherein:
- the output parameter indicates that the output data is to be written to a second location on the non-volatile storage medium; and
- the instructions that cause the processing circuitry to return the output data as the output of the chained compute offload command further cause the processing circuitry to:
  - write the output data to the second location on the non-volatile storage medium.

17. The at least one non-transitory machine-readable medium of claim 13, wherein:
- the output parameter indicates that the output data is to be sent to the host computing device; and
- the instructions that cause the processing circuitry to return the output data as the output of the chained compute offload command further cause the processing circuitry to:
  - send, via the interface circuitry, the output data to the host computing device.

18. The at least one non-transitory machine-readable medium of claim 12, wherein the instructions that cause the processing circuitry to perform the plurality of chained compute operations on the input data further cause the processing circuitry to:
- perform the plurality of chained compute operations based on the order indicated by the operation chain parameter and the one or more arguments indicated by the operation arguments parameter;
- compute a plurality of intermediate outputs of the plurality of chained compute operations, wherein each intermediate output of a particular chained compute operation is input to a corresponding subsequent chained compute operation based on the order indicated by the operation chain parameter; and
- compute the output data based on the plurality of intermediate outputs.

19. The at least one non-transitory machine-readable medium of claim 18, wherein the instructions that cause the processing circuitry to compute the plurality of intermediate outputs of the plurality of chained compute operations further cause the processing circuitry to:
- write at least a subset of the plurality of intermediate outputs to a buffer pool on the non-volatile storage medium; and
- return an address of each intermediate output in the buffer pool to the corresponding subsequent chained compute operation.

20. A method performed by processing circuitry of a storage device, the method comprising:
- receiving a chained compute offload command from a host computing device, wherein the chained compute offload command instructs the storage device to perform a plurality of chained compute operations on an input data object stored on a non-volatile storage medium of the storage device, wherein the chained compute operations include different types of compute operations;
- reading the input data object from the non-volatile storage medium;
- performing the plurality of chained compute operations on the input data object, wherein an output data object is computed based on performing the plurality of chained compute operations; and
- returning the output data object as an output of the chained compute offload command.

21. The method of claim 20, wherein the chained compute offload command comprises:
- an input parameter indicating a first location of the input data object on the non-volatile storage medium;
- an operation chain parameter indicating the chained compute operations to be performed on the input data object and an order in which the chained compute operations are to be performed; and an operation arguments parameter indicating one or more arguments for the respective chained compute operations.

22. The method of claim 21, wherein performing the plurality of chained compute operations on the input data object comprises:
performing the plurality of chained compute operations based on the order indicated by the operation chain parameter and the one or more arguments indicated by the operation arguments parameter;
computing a plurality of intermediate outputs of the plurality of chained compute operations, wherein each intermediate output of a particular chained compute operation is input to a corresponding subsequent chained compute operation based on the order indicated by the operation chain parameter; and
computing the output data object based on the plurality of intermediate outputs.

23. A system, comprising:
interface circuitry to communicatively couple a host processor and a storage device;
the host processor, wherein the host processor is to send, via the interface circuitry, a chained compute offload command to the storage device, wherein the chained compute offload command instructs the storage device to perform a plurality of chained compute operations on an input data object stored on the storage device, wherein the chained compute operations include different types of compute operations; and
the storage device, wherein the storage device comprises a non-volatile storage medium and compute offload circuitry, wherein the compute offload circuitry is to:
receive, via the interface circuitry, the chained compute offload command from the host processor;
read the input data object from the non-volatile storage medium;
perform the plurality of chained compute operations on the input data object, wherein an output data object is computed based on performing the plurality of chained compute operations; and
return the output data object as an output of the chained compute offload command.

24. The system of claim 23, wherein the chained compute offload command comprises:
an input parameter indicating a first location of the input data object on the non-volatile storage medium;
an operation chain parameter indicating the chained compute operations to be performed on the input data object and an order in which the chained compute operations are to be performed; and
an operation arguments parameter indicating one or more arguments for the respective chained compute operations.

25. The system of claim 24, wherein the compute offload circuitry to perform the plurality of chained compute operations on the input data object is further to:
perform the plurality of chained compute operations based on the order indicated by the operation chain parameter and the one or more arguments indicated by the operation arguments parameter;
compute a plurality of intermediate outputs of the plurality of chained compute operations, wherein each intermediate output of a particular chained compute operation is input to a corresponding subsequent chained compute operation based on the order indicated by the operation chain parameter; and
compute the output data object based on the plurality of intermediate outputs.

26. The at least one non-transitory machine-readable medium of claim 11, wherein:
the input data comprises an input data object; and
the output data comprises an output data object.

27. The storage device of claim 1, wherein the chained compute offload command comprises one or more parameters, wherein the one or more parameters indicate:
a location of the input data object on the non-volatile storage medium;
the chained compute operations to be performed on the input data object; and
an order in which the chained compute operations are to be performed.

28. The storage device of claim 1, wherein the plurality of chained compute operations are to transform the input data object into the output data object.

* * * * *